United States Patent [19]

Egusa et al.

[11] Patent Number: 5,237,405
[45] Date of Patent: Aug. 17, 1993

[54] IMAGE MOTION VECTOR DETECTING DEVICE AND SWING CORRECTING DEVICE

[75] Inventors: Yo Egusa, Kyoto; Hiroshi Akahori, Hirakata; Atsushi Morimura, Nara, all of Japan

[73] Assignee: Matsushita Electric Industrial Co., Ltd., Kadoma, Japan

[21] Appl. No.: 700,519

[22] Filed: May 15, 1991

[30] Foreign Application Priority Data

| May 21, 1990 | [JP] | Japan | 2-130674 |
| May 21, 1990 | [JP] | Japan | 2-130675 |
| Nov. 14, 1990 | [JP] | Japan | 2-309476 |
| Nov. 14, 1990 | [JP] | Japan | 2-309477 |

[51] Int. Cl.$^5$ .................. H04N 7/18; H04N 7/12
[52] U.S. Cl. ........................ 358/105; 358/136
[58] Field of Search ............ 358/105, 136, 135

[56] References Cited

U.S. PATENT DOCUMENTS

| 4,307,420 | 12/1981 | Ninomiya et al. | 358/105 |
| 4,668,986 | 5/1987 | Furukawa | 358/105 |
| 4,691,230 | 9/1987 | Kaneko et al. | 358/105 |
| 4,862,259 | 8/1989 | Gillard et al. | 358/105 |
| 4,912,770 | 3/1990 | Seto et al. | 358/105 |
| 5,025,495 | 6/1991 | Avis | 358/140 |

*Primary Examiner*—John K. Peng
*Attorney, Agent, or Firm*—Beveridge, DeGrandi, Weilacher & Young

[57] ABSTRACT

An image motion vector detecting device has a part for determining correlation values in specific deviation in each detecting region of disposed plural detecting regions in a screen, a part for determining a time variation value of the correlation values, a part for determining a motion vector in each detecting region from the correlation values, a part for judging a reliability of the motion vector in each detecting region by using the correlation values and the time variation value, and a part for determining a motion vector of an entire screen by using the motion vector of each region on the basis of the judged reliability.

10 Claims, 85 Drawing Sheets

FIG. 7 (PRIOR ART)
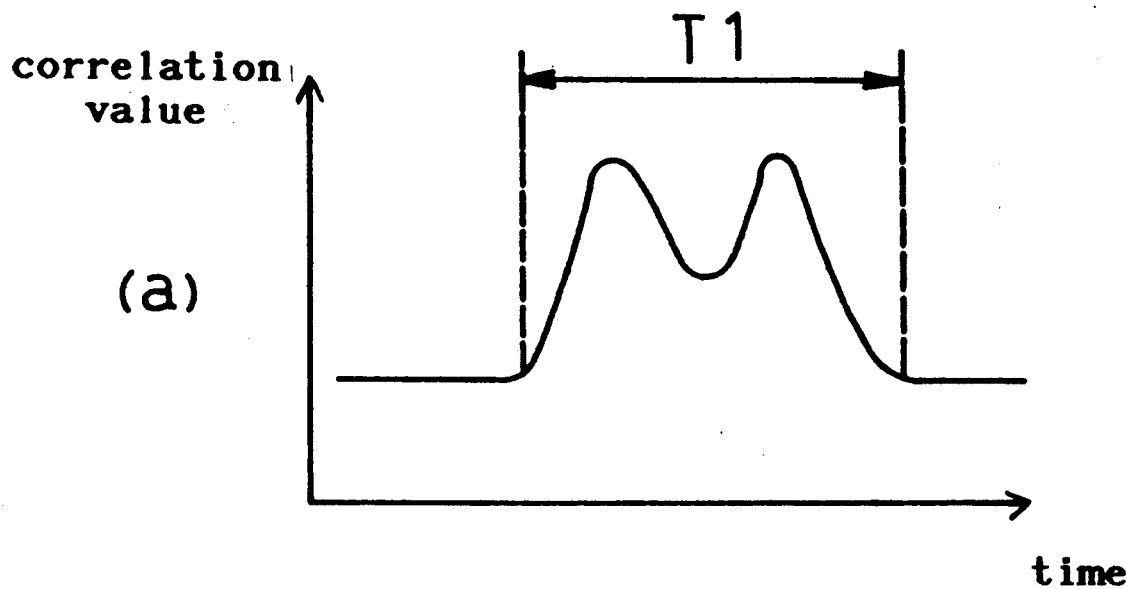
(a)
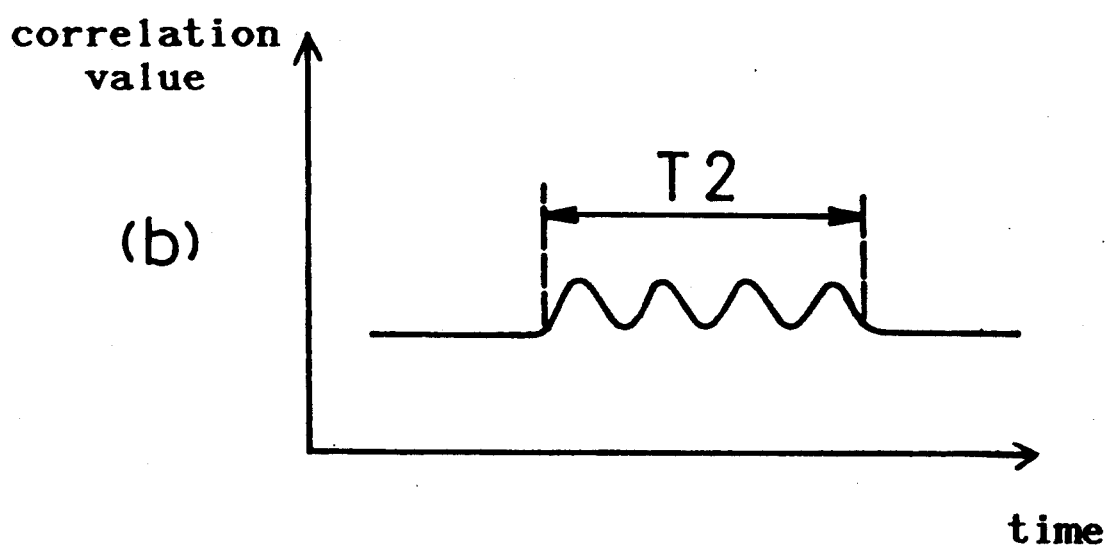
(b)

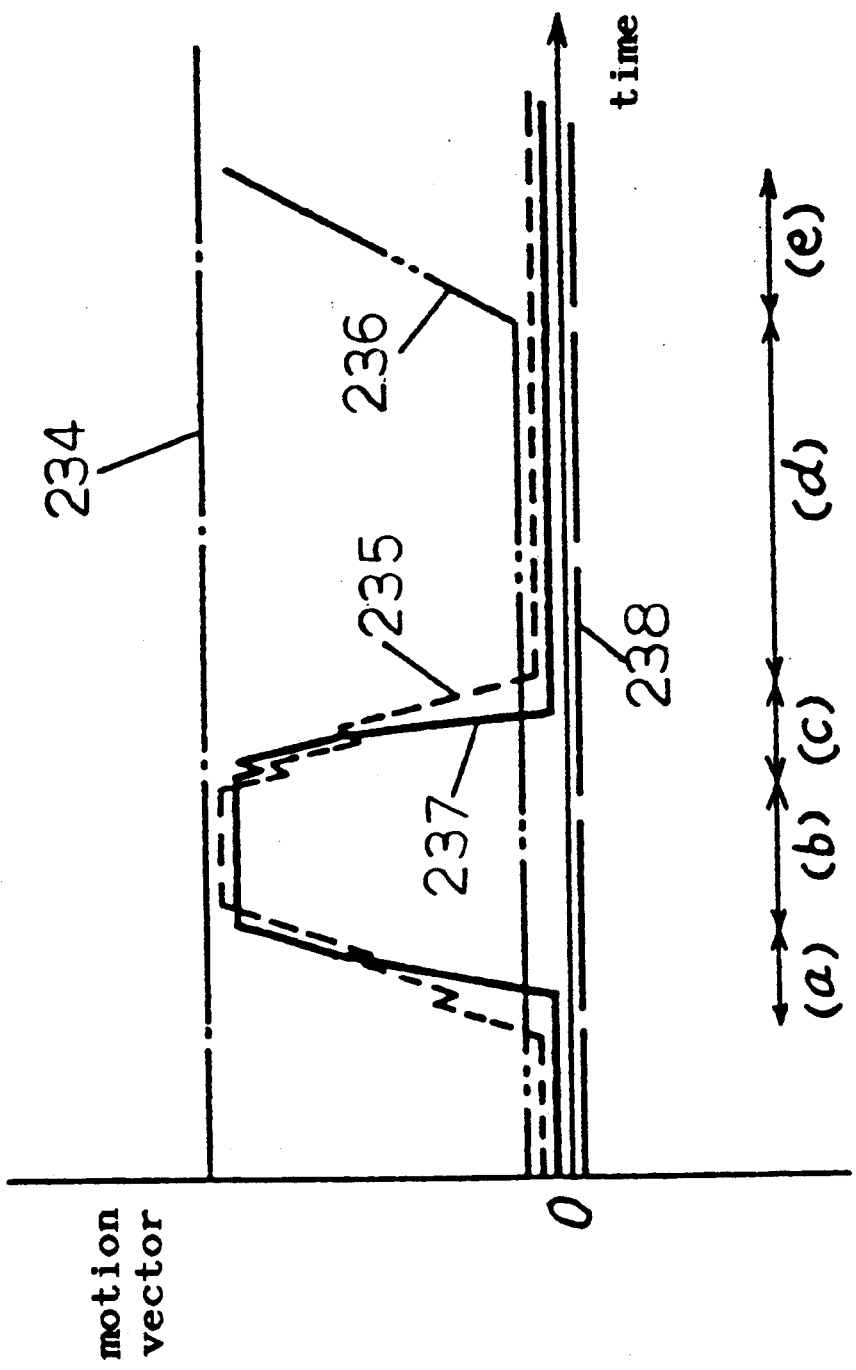

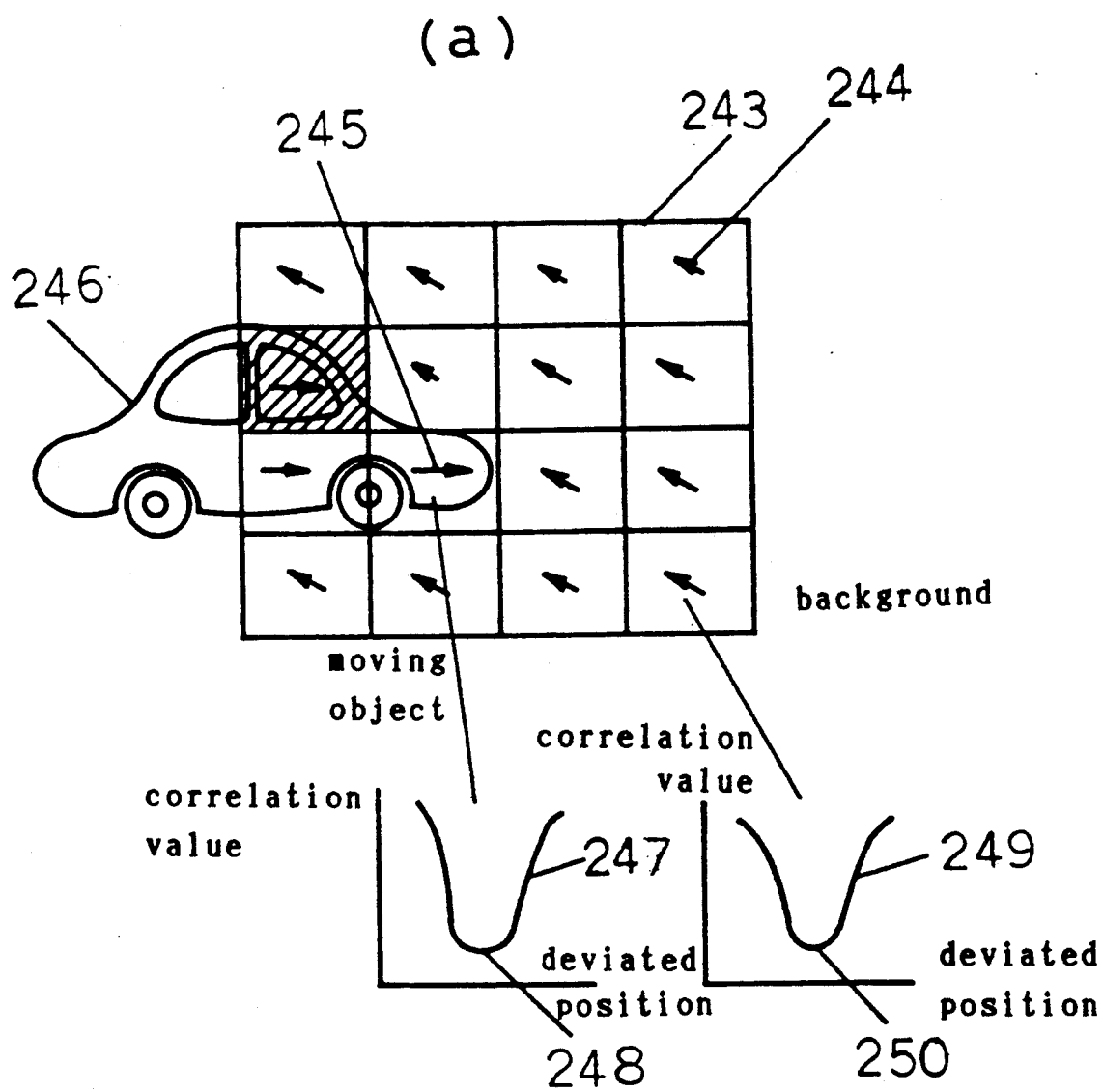

(b)

F I G . 1 2
(a)
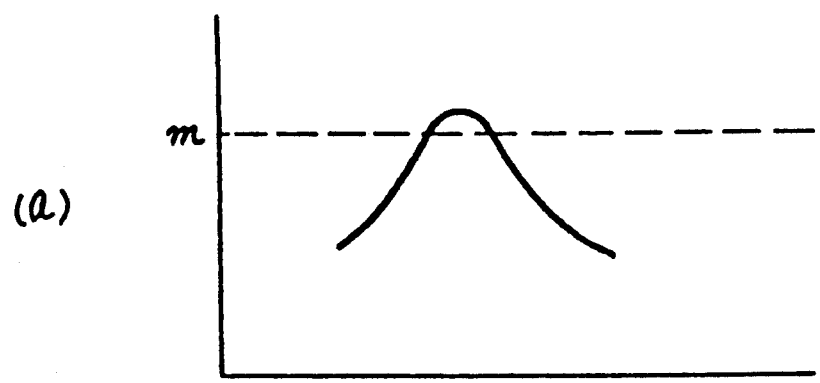
(b)
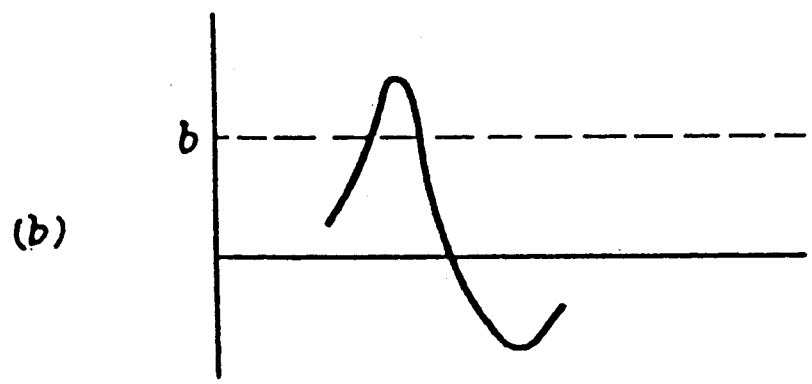

FIG. 13
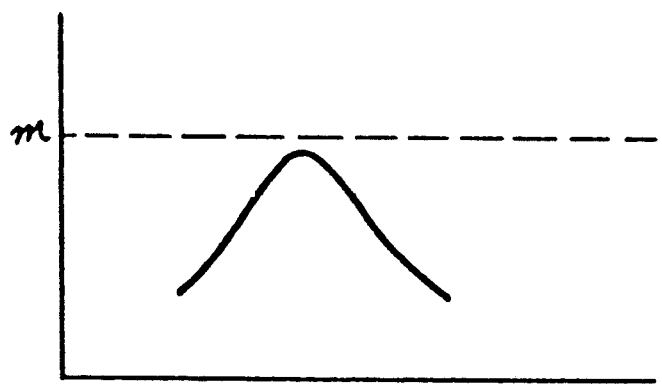
(a)
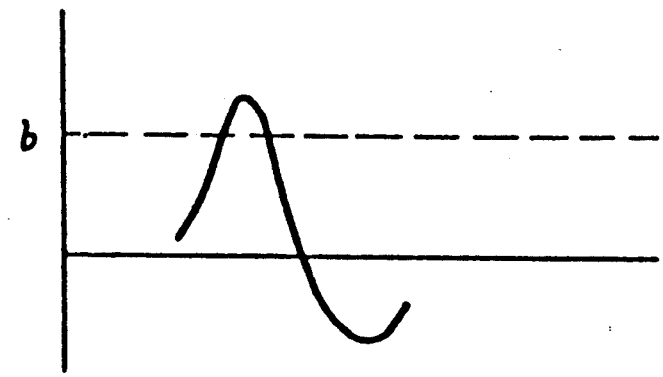
(b)

FIG. 51
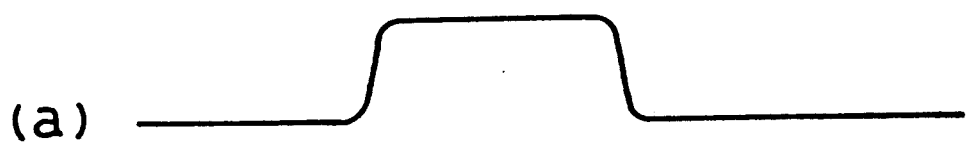
(a)
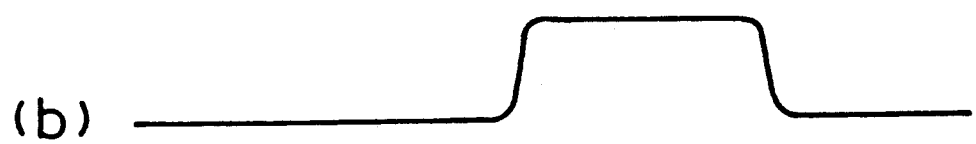
(b)
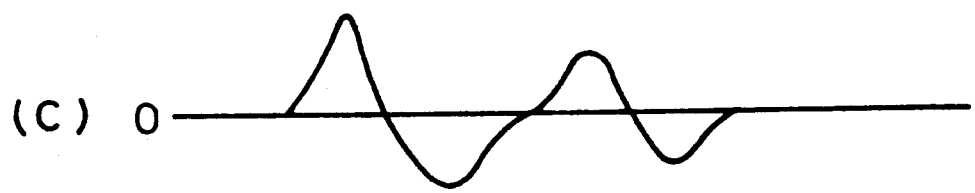
(c)
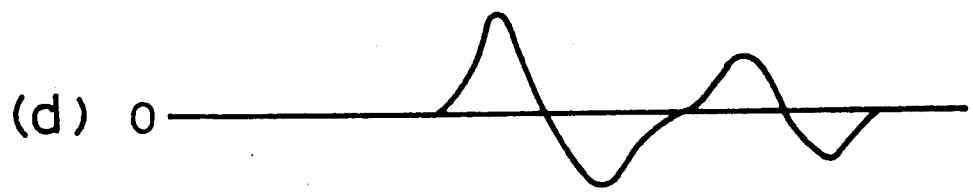
(d)
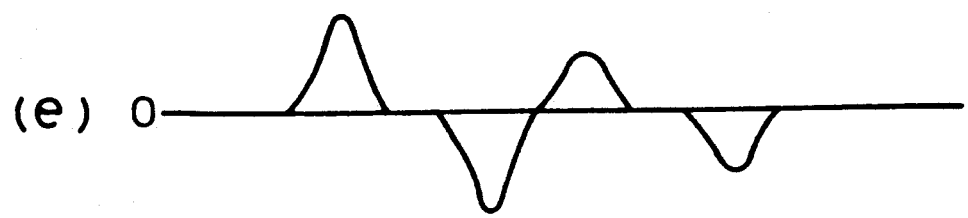
(e)

FIG. 66
(a)
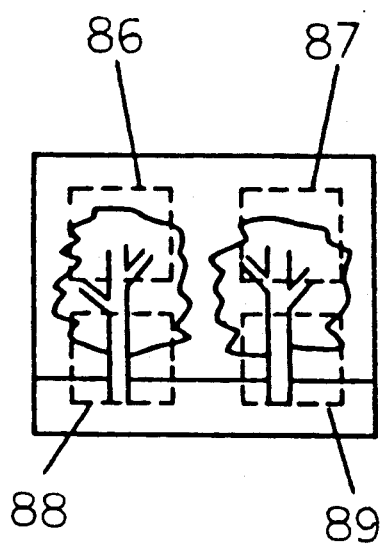
(b)
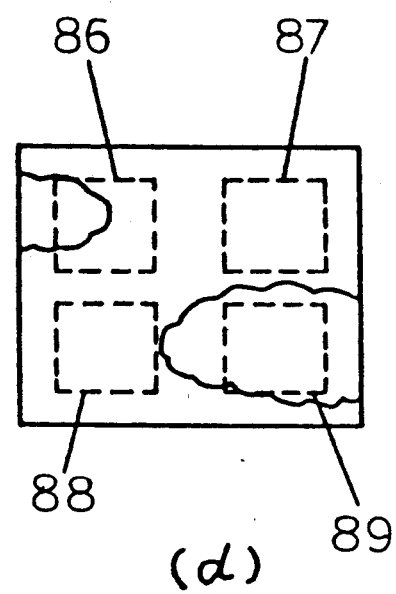
(c)
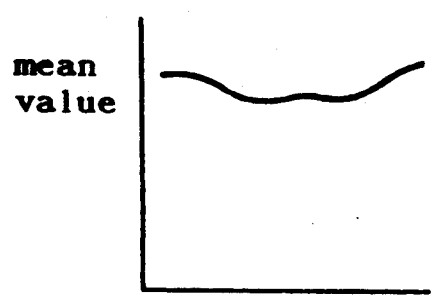
(d)
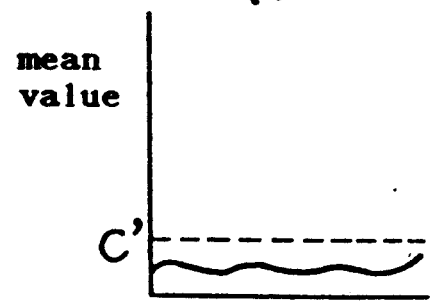

FIG. 72
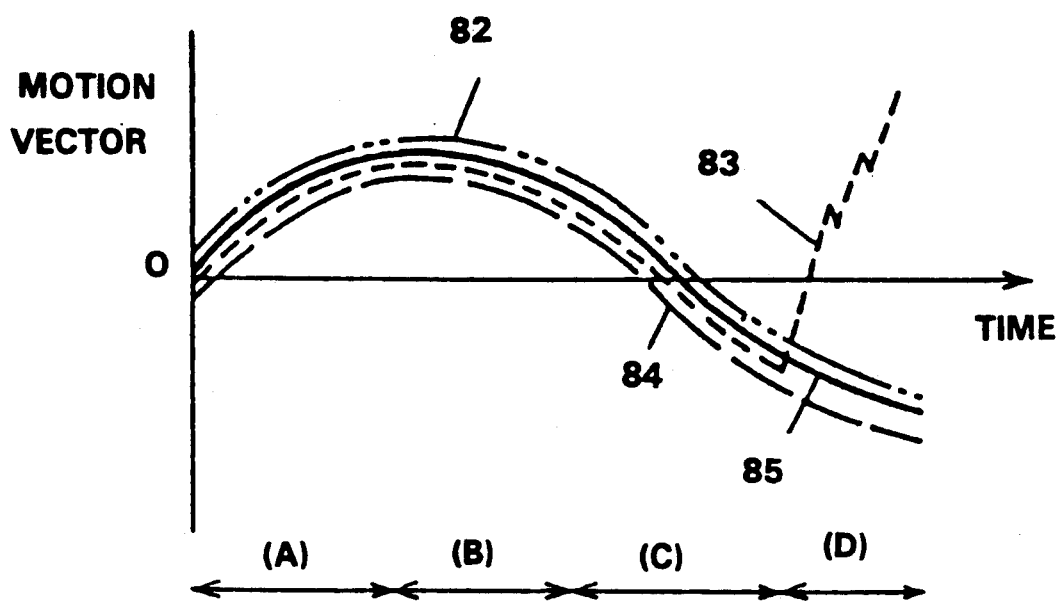
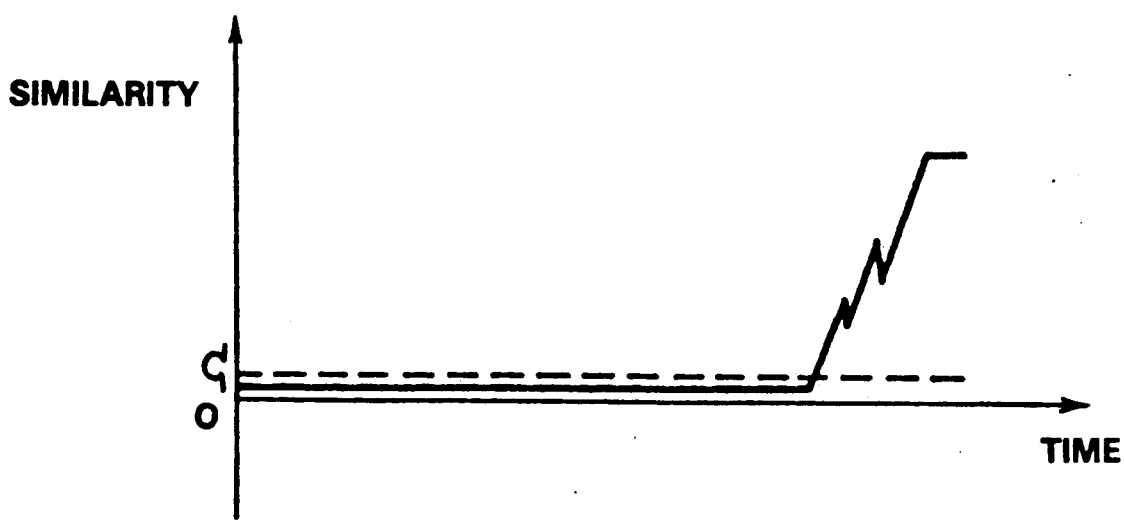

(b)

(a)

FIG. 77
(a) 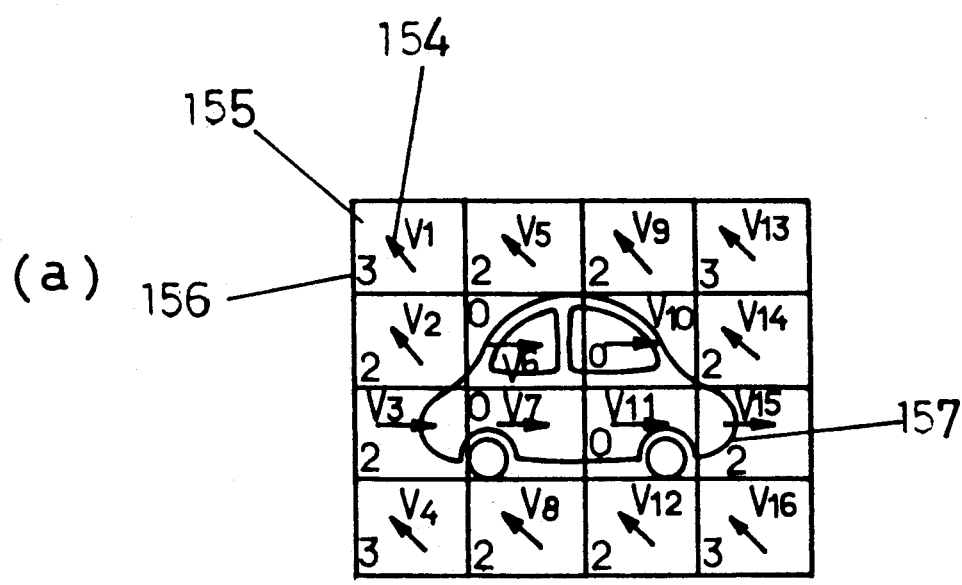
(b) 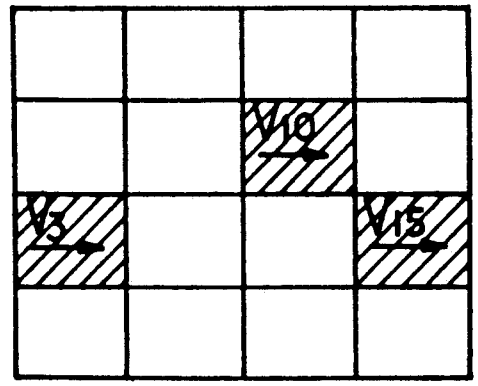
shaded area: not reliable

F I G. 8 0
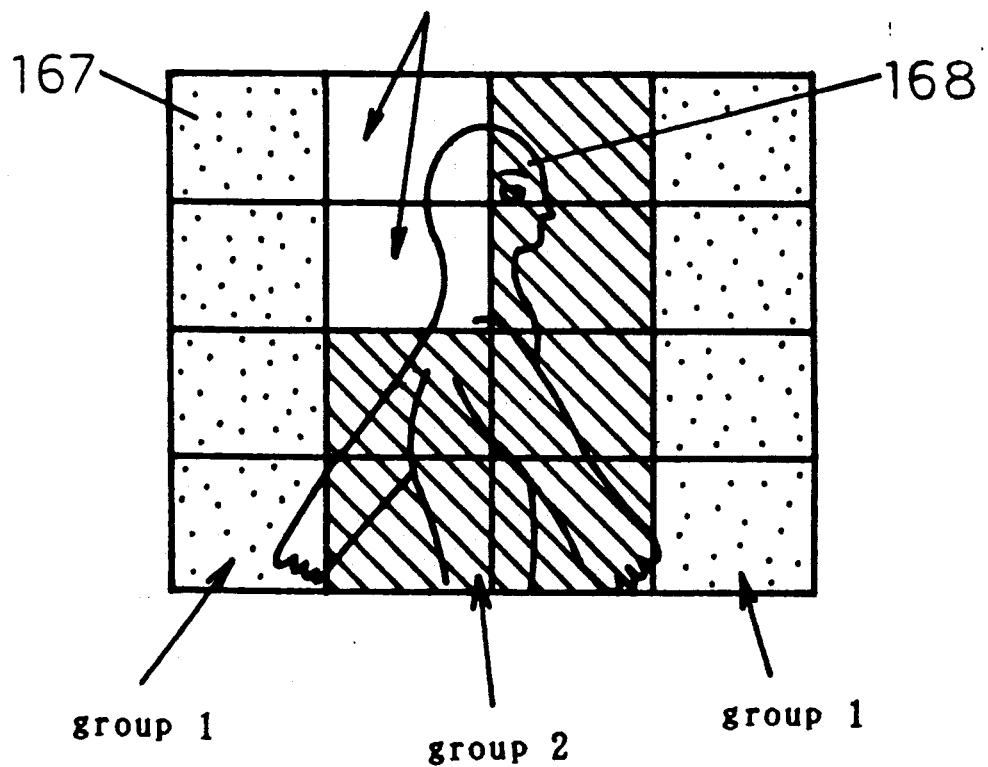

shaded area: not reliable

IMAGE MOTION VECTOR DETECTING DEVICE AND SWING CORRECTING DEVICE

BACKGROUND OF THE INVENTION

1. Field of the Invention

The present invention relates to a device for detecting the motion vector of an entire picture due to shake or swing of a video camera, in particular, by an image signal, and a device for correcting unnecessary swing of the entire picture due to shake or swing of the video camera.

2. Description of the Prior Art

A conventional image motion vector detecting device is disclosed, for example, in the Japanese Laid-open Patent Sho. 61-269475.

FIG. 1 is a block diagram of an image swing correcting device applying the conventional motion vector detecting device, in which numeral 201 is an image signal input terminal, 202 is a vector detecting circuit in each detecting region, 203 is a correlation value detecting part, 204 is a vector detecting circuit of each region combining the vector detecting circuit 202 and correlation value detecting circuit 203, 205 is a vector reliability judging means, 206 is a motion vector determining means, and 207 is a swing correcting means.

In this and conventional image motion vector detecting device, in the first place, an image signal continuous for at least two fields in time is fed into the input terminal 201. In the vector detecting circuit 202 of each detecting region, as shown in FIG. 2, four vector detecting regions 209, 210, 211, 212 are preliminarily determined in a screen 219, and each detecting region is divided into multiple subregions 215 having a representative point 217 (the number of vector detecting regions may be four or more). Concerning the representative point of each subregion, the difference from the signal of a position 218 deviated by the quantity of a specific range (i,j): imin<i<imax, jmin<j<jmax between two fields is determined as the correlation value, and the sum of the subregions is obtained. The correlation value is calculated as follows.

$$\text{Correlation value} = \sum_{k=1}^{n} |\Delta L|(i,j)$$

where $|\Delta L|$ (i,j):

the absolute value of the difference of the signal between the coordinates (i,j) and a representative point n: number of subregions in one detecting region Detecting the deviation (i',j') for giving the minimum value of the correlation value, it is taken as a vector 213 of each detecting region. The correlation value detecting part 203 determines the minimum, mean and maximum of the correlation values, and delivers them, together with the motion vector value, to the vector reliability judging means 205 and motion vector determining means 206. A detailed composition of the vector reliability judging means 205 is shown in FIG. 3. In the reliability judging means 205 the minimum, mean and maximum of the correlation values are fed into a comparator 220, and are compared with the predetermined set value Ref(the threshold level of judging condition). In the comparator 220, for example, if the mean is lower than the set value, it is judged that the reliability is lacking (reliability=0), and otherwise the reliability is confirmed (reliability=1). In the motion vector determining means 206, the mean of the vectors in the region judged to be reliable from the minimum, mean and maximum of correlation values of each region is delivered as being determined as the motion vector of the entire screen. FIG. 4 starts with step 221, and step 222 corresponds to step 204 in FIG. 1, step 223 to step 205 in FIG. 1, and step 206 to step 224 in FIG. 1, and a motion vector is delivered at step 225.

The swing correcting means 208 possesses an image signal storing means of one field or more, and by controlling the reading positions of these signals, when an image with a large fluctuation is fed as shown in 226, 227 in FIG. 5, the screen of the image is moved parallel from 229 to 226 in the direction 231 of correcting the fluctuation, on the basis of the motion vector 230 entered from the motion vector determining means 206, with respect to the input image signals of the n−1-th field, the n-th field, and then enlargement of the screen or other operation is manipulated by interpolation or the like, thereby delivering image signals 232, 233 in a size of one screen less in fluctuation.

In the example explained above, the reliability of the vector is judged by the minimum, mean and maximum of the correlation values, but other methods are also known to judge the reliability, for example, by the difference between the minimum of the correlation values and its peripheral point value, that is, the inclination of the periphery of the minimum point, or by the value of the minimum alone, or by the state of the correlation values.

In the hitherto motion vector detecting device composed as described herein, the reliability is judged anyway by the present state of the correlation values such as the minimum, mean and maximum. However, since the correlation value at each time is unstable due to noise or the like, the reliability cannot be correctly judged by the correlation value at each time alone.

Besides, as in the prior art, when judging on the binary basis (0 or 1) to determined the reliability by a predetermined threshold level, if the reliability judgment in a certain range of the threshold level of the judging condition is ambiguous, in other words, if there is an uncertain region of reliability judgement in a width of w1, w2 with respect to the threshold levels of condition 1, condition 2 as shown in FIG. 6, the following case may be considered. Suppose there are two sets of data D1, D2 as shown in FIG. 6. Both D1 and D2 were obtained in the same condition, but were unstable due to noise or the like, and were obtained as different data. By nature, these two are the same data, and are positioned at a very close distance, but in the ambiguous region as for condition 2, and hence D1 is judged to be reliable, and D2 not reliable. As for condition 1, however, the data D1, D2 belong obviously to the reliable region. In this case, therefore, it is correct to judge that both D1 and D2 are reliable, but actually D2 is misjudged to be not reliable.

Due to such cause, the motion vector detecting device of the conventional constitution often misunderstood that a moving object entered the screen, although it was not actually, moving or detected a vector added with the motion of a moving object when the moving object entered the screen. Therefore, the swing correcting device often malfunctioned as the screen was corrected in a wrong direction from the direction intended by the operator as the correction was interrupted or a vector was added when the motion of the moving object was detected.

In the conventional constitution of the motion vector detecting device, moreover, the motion vector detecting device often malfunctioned when a moving object entered the screen because the motion vector of the entire screen was judged from the result of the determination of the reliability in each region. That is, when detection of a moving object is done independently in each region, a sufficient detecting performance of a moving object cannot be obtained.

This point is described in detail below. FIG. 7(a) shows the time course variations of the correlation values when a moving object enters the screen, and FIG. 7(b), when vibrations of a specific period are applied to a camera. The period indicated by T1 in FIG. 7(a) is the period when the moving object is present, and the period indicated by T2 in FIG. 7(b) is the time of applying vibrations to the camera. To distinguish the motion due to the moving object and the motion due to camera swing, the level of the correlation value is noticed. In the case of the moving object, the correlation value increases largely due to invasion of the moving object, but the fluctuation of the correlation value is small in the case of camera swing. Accordingly, when the correlation value is larger than a certain level, it is regarded to be due to the moving object, and the reliability is judged to be absent. Depending on the circumstances, however, the correlation varies very little due to moving object or the correlation varies very much due to camera swing, and then it is difficult to correctly judge the two in each region.

Incidentally, when a moving object enters the screen, the motion vector added when the motion of the moving object is detected, is described in detail below. In this case, the swing correcting device often malfunctions by correcting the screen in a wrong direction from the direction intended by the operator.

Referring now to the drawings, this is explained more specifically. As shown in FIG. 64, while the video camera is stopped still, suppose a moving object 52 passes through the screen. First, as shown in interval (a) in FIG. 64, when the background and the moving object coexist within a certain detecting region 48, this detecting region 48 is judged to be not reliable by the state of correlation value 53. On the other hand, the still background in a detecting region 49 is desired to be judged reliable by reliability judging means, but depending on the screen appearance of the background, it may be misjudged to be not reliable as the correlation value 54.

Next, as shown in interval (b) in FIG. 64, when occupying the majority of the detecting region 48, the motion vector expressing the motion of the moving object is detected from that detecting region, and a smaller value 55 than the specified value is indicated by the correlation value 53, and the reliability judging means judges reliable. Besides, the background of the detecting region 49 is still judged to be not reliable, and as a result, the motion of the moving object is employed as the motion vector of the entire screen, and when the swing is corrected on the basis of this, the still background is moved, which results in an unnatural image (the operation of the detecting regions 50, 51 is same as that of 48, 49, respectively, and is not explained herein.).

FIG. 8 shows the vector of each detecting region and the motion vector of the entire image at this time. A vector 234 corresponds to the vector of the moving object of 52 of FIG. 64, a vector 235 to the vector of the detecting region of 48 of FIG. 64, a vector 236 to the vector of the detecting region of 49 of FIG. 64, a vector 237 to the motion vector of the entire screen, and a vector 238 to the vector of the background. Intervals (a) to (e) in FIG. 8 correspond to intervals (a) to (e) in FIG. 64. The motion vector detected in intervals (a) to (e) in FIG. 64 is as shown by 237 in FIG. 8, and when the swing is corrected on the basis of this vector, an abnormal correction occurs suddenly in the state of interval (b) in FIG. 8. Furthermore, the vector due to the camera swing may be added to all vectors in FIG. 8, and an abnormal correction may occur due to the same reason.

In the conventional motion vector detecting device, still more, when the screen is swinging and it is being corrected, the reliability judging means suddenly judges not reliable depending on the screen appearance, and 0 vector is often delivered from the vector determining means. As a result, the swing correcting device does not function, and the screen shows a swinging, hard-to-see image.

Practical examples are described below by reference to FIGS. 71 and 9. FIG. 71 shows the screen before correction expressing the camera swing, detecting regions 75, 77, their correlation value 80, detecting regions 76, 78 and their correlation value 81 (the action of the detecting regions 77, 78 is same as that of 75, 76, respectively, and is not explained.). Numeral 79 is an obstacle. To begin with, in intervals (a) and (c) in FIG. 71, depending on the state of the correlation values 80, 81, the reliability is affirmatively judged in the detecting regions 75, 76, and swing may be corrected normally. In interval (b) in FIG. 71, however, depending on the state of the correlation values 80, 81, the detecting regions 75, 76 are suddenly judged to be not reliable, and the motion vector of the entire screen becomes 0 by the vector determining means, and the swing correction is stopped. Finally, as shown in interval (d) in FIG. 71, when both background and moving object are present in a certain detecting region 75, depending on the state of the correlation value 80, the detecting region 75 is judged to be not reliable. On the other hand, the background of the detecting region 76 is judged to be reliable by the reliability judging means, and the motion of the background is employed, and only the screen swing is corrected, and a normal motion is achieved.

FIG. 9 shows the motion vector of the intervals in FIG. 71. In FIG. 9, numeral 241 is a motion vector of the camera, which swings vertically about 0 vector. Numeral 240 is a vector detected from a detecting region 75, and a motion vector 241 due to camera swing, a motion vector of the moving object 79 in FIG. 71 or other wrong vector is detected. Numeral 239 is a vector detected from a detecting region 76, and a motion vector 241 due to camera swing is detected. A vector 242 is a motion vector of the entire screen delivered from a vector determining means 206 in FIG. 1. The intervals (a) to (d) in FIG. 71 correspond to the intervals (a) to (d) in FIG. 81. Same as in FIG. 71, in interval (b), the vectors 239, 240 in the detecting regions become 0, and the motion vector 242 of the entire screen is also 0. As a result, suddenly, the swing is not corrected, and the screen shows a swinging, hard-to-see image.

In the case of multiple vector detecting regions, malfunction of vector detection when a moving objects enters the screen is explained below.

As shown in FIG. 10(a), (b), suppose a moving object (a car) 246 passes through the screen while the video camera is swinging. Numeral 243 is a detecting region, 244 is a motion vector of the background, and 245 is a motion vector of a moving object. The background is judged to be reliable by the reliability judging means, and the correlation value 249 shows a smaller value 250 than the specified value. While the background and moving object coexist, since the correlation value 252 does not possess the specified minimum value, the detecting region is judged to be not reliable (the shaded area in FIG. 10). When the motion of the moving object has occupied the majority of the detecting region, the motion vector 245 expressing the motion of the moving object is detected from that detecting region, and the correlation value 247 shows a smaller value 248 than the specified value, and the reliability is affirmatively judged by the reliability judging means. As a result, both the motion of the moving object and the motion of the background are employed as the motion vectors of the entire screen, and when the swing is corrected accordingly, since the motion of the moving object is contained, an unnatural image is produced.

SUMMARY OF THE INVENTION

To solve the above problems, the invention presents the following constitution.

An image motion vector detecting device of the present invention comprises;

means for determining correlation values in specific deviation in each detecting region of the disposed plural detecting regions in a screen, means for determining a time variation value of the correlation values, means for determining a motion vector in each detecting region from the correlation values, means for judging a reliability of motion vector in each detecting region by using the correlation values and the time variation value, and means for determining a motion vector of an entire screen by using the motion vector of each region on the basis of the judged reliability.

An image motion detecting device of the present invention comprises;

means for determining a motion vector in each detecting region of disposed plural detecting regions in a screen, judging means for determining a judgement result having a meaning from true to false, from each one of two or more pieces of reliability judgement information which is obtained by using correlation values in the each detecting region, judgment value converting means for converting the judgment result having a meaning from true to false into binary judgment value of true or false, and means for determining a motion vector of an entire screen by using the motion vector of each region on the basis of the binary judgment value of each detecting region.

An image motion vector detecting device of the present invention comprises;

means for determining a motion vector in each detecting region of disposed plural detecting regions in a screen, judging means for determining a judgment result having a meaning from true to false by a reliability judgment information which is obtained by using correlation values in the each detecting region, and means for determining a motion vector of an entire screen by using the motion vector of each region on the basis of the judgment result having a meaning from true to false.

An image motion vector detecting device of the present invention comprises;

means for determining a motion vector in each detecting region of disposed plural detecting regions in a screen, means for determining a correlation of motion vectors among the detecting regions, means for judging a reliability of the motion vector in each detecting region by using the correlation values, means for changing a judgment condition of the reliability judging means by a correlation value of motion vectors among detecting regions, and means for determining a motion vector of an entire screen by using the motion vector of each region on the basis of the reliability judgment.

An image motion vector detecting device of the present invention comprises;

means for determining a correlation value in a specific deviation in each detecting region of disposed plural detecting regions in a screen, means for determining a difference of correlation values between right and left, or upper and lower detecting regions in a screen, means for determining a motion vector in each detecting region on the basis of the correlation values, means for judging a reliability of the motion vector in each detecting region on the basis of the correlation value in each detecting region, and means for determining a motion vector of an entire screen by using the motion vector of each detecting region on the basis of the difference of the correlation values between regions and the judgment of reliability.

An image motion vector detecting device of the present invention comprises;

means for determining a correlation value in a specific deviation of each detecting region of disposed plural detecting regions in a screen, means for determining a difference of correlation value between right and left, or upper and lower detecting regions in a screen, means for determining a motion vector in each detecting region on the basis of the correlation values, means for judging a reliability of a motion vector in each detecting region on the basis of the correlation value in each detecting region and the difference of correlation values between regions, and means for determining a motion vector of an entire screen by using the motion vector of each detecting region on the basis of the judgement of the reliability.

An image motion vector detecting device of the present invention comprises;

means for determining a correlation value in a specific deviation in each detecting region of disposed plural detecting regions in a screen, means for determining a time variation value of correlation values, means for determining a difference of the time variation values of the correlation values between right and left, or upper and lower detecting regions in a screen, means for determining a motion vector in each detecting region on the basis of the correlation values, means for judging a reliability of the motion vector in each detecting region on the basis of the correlation value in each detecting region and the time variation value of the correlation values, and means for determining a motion vector of an entire screen by using the motion vector of each detecting region on the basis of the judgement of reliability and the difference in time variation value of correlation values between regions.

An image motion vector detecting device of the present invention comprises;

means for determining a correlation value in a specific deviation in each detecting region of disposed plural detecting regions in a screen, means for determining a time variation value of the correlation values, means for determining a difference of the time variation values of correlation values between right and left or upper or lower detecting regions in a screen, means for determining a motion vector in each detecting region from the correlation values, means for judging a reliability of the motion vector in each detecting region on the basis of the correlation values of detecting regions, the time variation values of correlation values, and the difference of time variation values of correlation values between regions, and means for determining a motion vector of an entire screen by using the motion vector of each detecting region on the basis of the reliability.

An image motion vector detecting device of the present invention comprises;

means for determining a correlation value in a specific deviation in each detecting region of disposed plural detecting regions in a screen, means for determining a motion vector in each detecting region by the correlation values, reliability judging means for judging a reliability of the motion vector of the detecting region by a value of the motion vector or the correlation value of their combination, still state judging means for judging a still state of the motion vector of each detecting region by using the motion vector, means for leading out a final judgment result from the still state judging means and the reliability judging means, and means for determining a motion vector of an entire screen from the motion vector of each detecting region on the basis of the obtained final judgment result.

In the image motion vector detecting device of the present invention;

the still state judging means judges that the motion vector is standing still when there are at least two or more motion vectors led out in the time series within a specific range.

An image motion vector detecting device of the present invention comprises;

means for determining a correlation value in a specific deviation in each detecting region of disposed plural detecting regions in a screen, means for determining a motion vector in each detecting region by the correlation values, reliability judging means for judging a reliability of the motion vector of each detecting region by the value of motion vector or the correlation value or their combination, minimum judging means for judging a motion vector having a relatively small value among the motion vectors of detecting regions, means for leading out a final judgment result from the minimum judging means and the reliability judging means, and means for determining a motion vector of an entire screen from the motion vector of each detecting region on the basis of the obtained final judgment result.

In the image motion vector detecting device of the present invention;

the minimum judging means judges only one minimum value among the motion vectors of the detecting regions.

An image motion vector detecting device of the present invention comprises;

means for determining a correlation value in a specific deviation in each detecting region of disposed plural detecting regions in a screen, means for determining a motion vector in each detecting region from the correlation values, state judging means for judging a state of motion vector of each detecting region by the value of motion vector or the correlation value or their combination, similarity judging means for judging a similarity of motion vectors of the detecting regions, means for leading out a final judgment result from the similarity judging means and the state judging means, and means for determining a motion vector of an entire screen from the motion vector of each detecting region on the basis of the obtained final judgment result.

In the image motion vector detecting device;

the state judging means is a reliability judging means for judging a reliability of the motion vectors in detecting regions by the motion vector value or the correlation value or their combination.

An image motion vector detecting device of the present invention comprises; means for determining a correlation values in a specific deviation of each detecting region of disposed plural detecting regions in a screen, means for determining a motion vector in each detecting region from the correlation values, and weighting processing means for determining a motion vector of an entire screen from the motion vectors and weight coefficients set in the each detecting region.

An image motion vector detecting device of the present invention comprises;

means for determining a correlation value in a specific deviation in each detecting region of disposed plural detecting regions in a screen, means for determining a motion vector in each detecting region from the correlation values, reliability judging means for judging a reliability of the motion vector of the detecting regions by the motion vector value or the correlation value or their combination, and weighting processing means for determining a motion vector of an entire screen from weight coefficients set in each detecting region and the motion vector of the detecting region, judged to be reliable by the reliability judging means.

An image motion vector detecting device of the present invention comprises;

means for determining a correlation value in a specific deviation in each detecting region of disposed plural detecting regions in a screen, means for determining a motion vector in each detecting region by the correlation values, classifying means for classifying the motion vectors into groups on the basis of a magnitude or direction or their differential value, camera shake group judging means for selecting a group for determining a motion vector of an entire screen from groups classified by the classifying means, and means for determining a motion vector of the entire screen from the motion vector of the group selected by the camera shake group judging means.

An image motion vector detecting device of the present invention comprises;

means for determining a correlation value in a specific deviation in each detecting region of disposed plural detecting regions in a screen, means for determining a motion vector in each detecting region from the correlation values, reliability judging means for judging a reliability of a motion vector of the detecting region by the motion vector value or the correlation value or their combination, classifying means for classifying the motion vectors of the detecting regions judged to be reliable by the reliability judging means into groups on the basis of a magnitude, direction or their differential value, camera shake group judging means for selecting a group for determining a motion vector of an entire screen from a group classified by the classifying means, and means for determining a motion vector of the entire screen from the motion vector of the group selected by the camera shake group judging means.

An image swing correcting device of the present invention comprises;

image signal memory means or CCD for at least one field, said above-mentioned image motion vector detecting device, and reading position of the image signal memory means or CCD being controlled on the basis of a motion vector detected by the image motion vector detecting device.

The invention, having the constitution as described herein, judges the reliability of the vector in each detecting means by using not only the state of the correlation value in each detecting region, but also the time-course variation of the correlation value, Therefore, if the absolute value of the correlation value at a certain time is fluctuated by the noise and the reliability cannot be judged correctly, the judgment may be compensated by paying attention to the time-course variations.

In each detecting region, moreover, by determining an intermediate judgment result from true to false from each one of plural sets of reliability judgment information, and obtaining one judgment value from plural intermediate reliability judgment results, the final judgment value of each detecting region is extracted. Thus by judging intermediately from true to false, the ambiguity of the threshold level of the judging condition is expressed, and a correct judgment is attained if any one of plural judgment regions is ambiguous.

Besides, by determining the correlation of motion vectors of detecting regions, and varying the judging condition of the reliability depending on the value of the correlation of the motion vectors of the detecting regions, the reliability may be judged flexibly depending on the circumstances.

In addition, by judging whether a moving object has invaded the region in each detecting region on the basis of the correlation value and the time-course variations of the correlation value, and by finding the correlation value between regions or the difference in time-course variations of the correlation value, the moving object is detected, and the motion vector of the entire screen is determined. Furthermore, on the basis of the determined motion vector of the entire screen, by controlling a reading position of the image signal memory means or CCD, swing of the screen is corrected.

Incidentally, when the presence of a motion vector standing still in the motion vector in each detecting region is judged by the still judging means, since that motin vector expreses the still background, regardless of the result of the reliability judgment, the motion vector of the entire screen is determined by using this still vector.

As a result of the judgment of reliability, if the reliability is negatively judged at least in one detecting region, the motion vector of a relatively small value judged by the minimum judging means is regarded as the still background, and it is taken as the motion vector of the entire screen, by priority to the judgment result of reliability.

If the similarity is judged to be present in the motion vector of each detecting region by the similarity judging means, it means that the entire screen is swinging in the same direction, and the screen drift should be corrected, and when there is no similarity, it is highly possible that an obstacle is present in the screen, and the detecting region having the obstacle should not be used in the correction operation.

A weight coefficient is set in each detecting region. In particular, the center of the screen denotes the motion of the subject, and it is expected that the motion of the camera shake is dominant at the end portion of the screen. Hence, the weight coefficient is increased at the end portion of the screen. On the basis of this weight coefficient, when the weighted mean of the motion vectors is calculated, a motion vector similar to the camera shake vector may be obtained by a simple calculation.

Furthermore, when the detecting region judged to be free from reliability by the reliability judging means shows the motion vector of the subject, and when the weighted mean is calculated by using only the motion vectors in the detecting regions judged to be reliable, the correction performance of camera shake is further enhanced.

As mentioned in relation to the problems that the invention is to solve, in the detecting region judged to be reliable by the reliability judging means, the motion of the camera shake and the motion of the subject coexist. Furthermore, the motion of the subject may not be always uniform. Accordingly, on the basis of the direction or magnitude, the motion vector in each detecting region is classified (clustered) into plural groups. When one of the groups is used as the motion vector of the camera shake, it is expected similarly that the motion vector approximating the camera shake vector may be extracted.

Furthermore, in the detecting region judged to be not reliable by the reliability judging means, since the motion vector of the subject is appearing, the correction performance of the camera shake may be further enhanced by clustering into groups by using only the motion vector in the detecting regions judged to be reliable.

BRIEF DESCRIPTION OF THE DRAWINGS

FIGS. 2, 5, 80, 8 and 9 are views for explaining the operation of the conventional swing correction.

FIGS. 7a and 7b show the correlation value as a function of time.

FIG. 12, and FIG. 13 are diagrams for explaining the operation of the motion vector detecting device of the first embodiment.

FIG. 51 is a diagram for explaining the operation of the motion vector detecting device in the twenty-seventh embodiment of the present invention.

FIG. 66 is a diagram for showing the relation between the content of the screen and the mean value.

FIG. 72 includes diagrams showing the operation of motion vector and similarity.

FIGS. 77(a) is a diagram showing the invasion of the moving object (automobile) into the detecting region, (b) is a diagram showing the detecting region judged to be not reliable by the reliability judging means.

FIG. 80 is a diagram showing the clustered detecting regions.

DESCRIPTION OF THE PREFERRED EMBODIMENTS OF THE INVENTION

Figure 11:
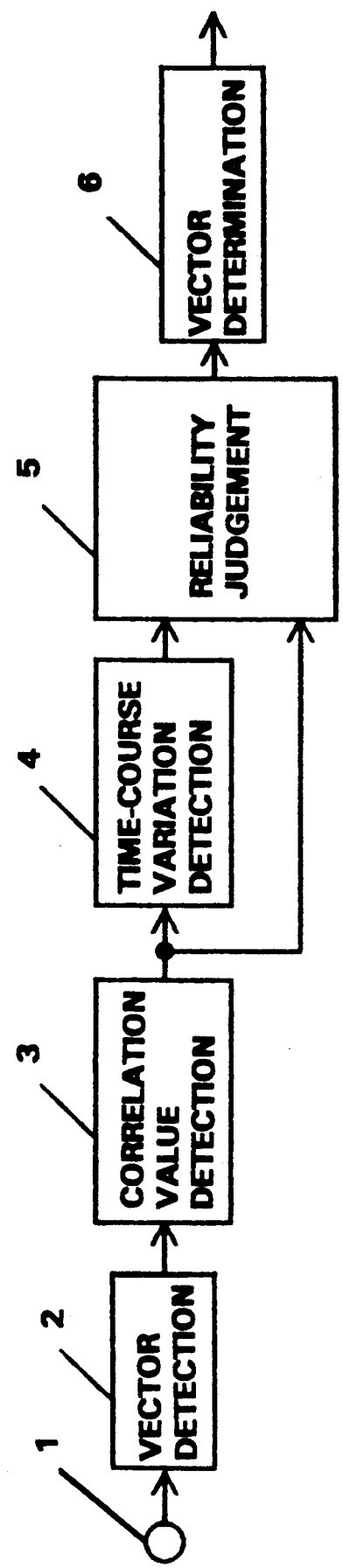
FIG. 11 is a block diagram of an image motion vector detecting device in a first embodiment of the present invention.

FIG. 11 is a block diagram of a motion vector detecting device in a first embodiment of the present invention, in which numeral 1 is an image signal input terminal, 2 is a vector detecting circuit of each detecting region, 3 is a correlation value detecting part, 4 is a time-course variation detecting part of correlation value, 5 is reliability judging means of vector, and 6 is motion vector detecting means.

In the image motion vector detecting device in the first embodiment, first of all, an image signal continuous in time for at least two fields is entered in the input terminal 1. In the vector detecting circuit 2 of each detecting region, preliminarily, as shown in 209, 210, 211, 212 in FIG. 74, four vector detecting regions are determined in the screen, and concerning the detecting regions between two fields, the difference of position signals deviated by the quantity in specified range(i, j): imin<i<imax, jmin<j<jmax, that is, is determined as the correlation value $\Sigma|\Delta L|(i,j)$, and the deviation(i',j') for giving the minimum value of that value is detected, and it is obtained as the motion vector of each region. In the correlation value detecting part 3, the minimum, mean and maximum of the correlation values are obtained. In the time-course variation detecting part 4 of the correlation values, the time differential value after averaging the correlation values, or the difference value is determined. The reliability judging circuit means 5 of vectors judges the reliability in each region from the correlation value entered from the correlation value detecting part 3 and the time-course variation value of the correlation values entered from the time-course variation detecting part 4 of the correlation value, and delivers the result of judgment and the motion vector of each region to the motion vector determining means 6. The motion vector determining means 6 determines the intermediate value of the motion vector of each region judged to be reliable (the value positioned in the middle when arranged in the sequence of magnitude, in the case of the quantity in an even number, the mean of two values close to the middle position) as the motion vector of the entire screen, and delivers.

Figure 2:
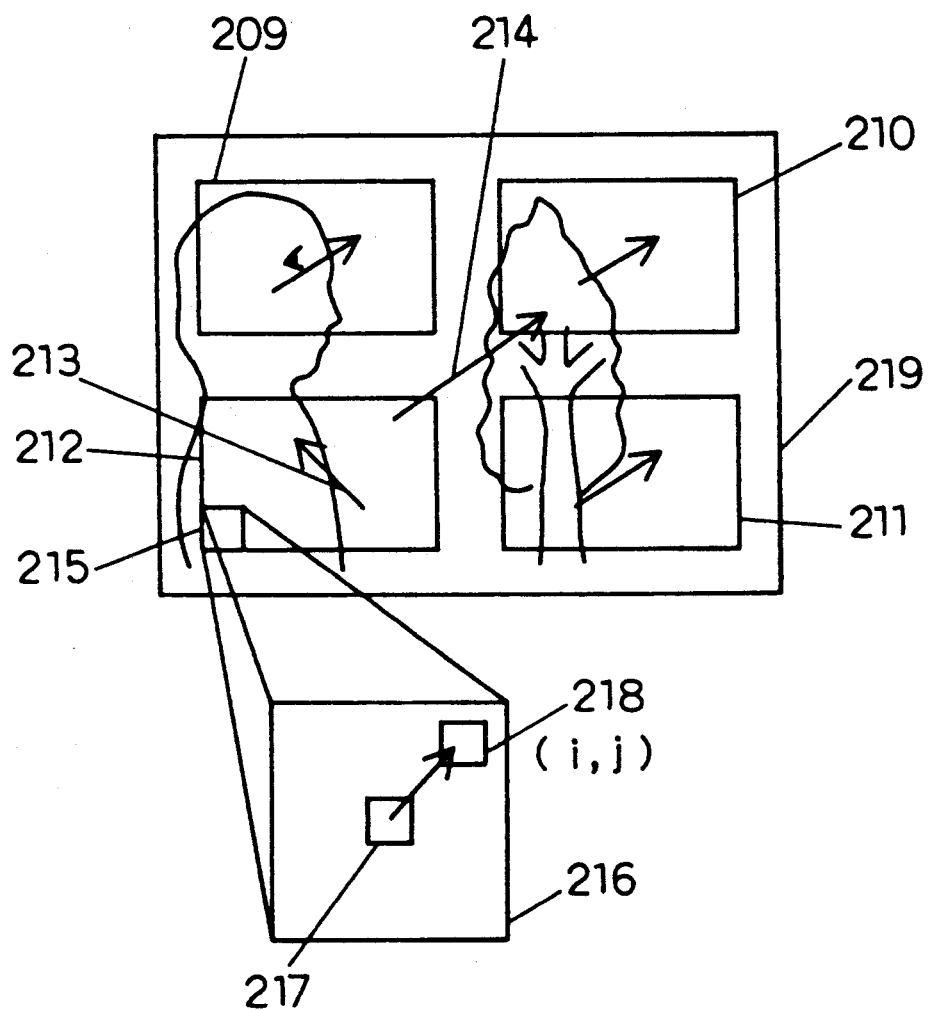
Figure 3:
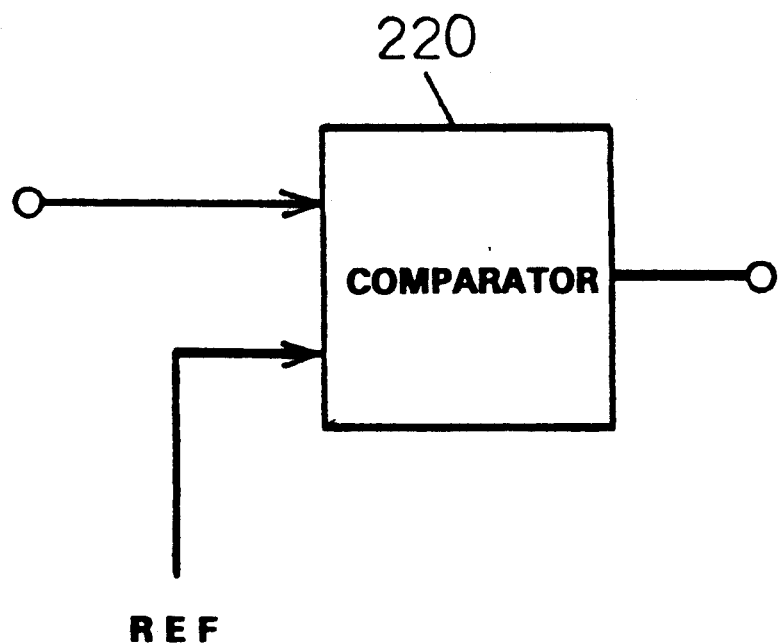
FIG. 3 is a detailed structural diagram of reliability judging means in the conventional art.
Figure 4:
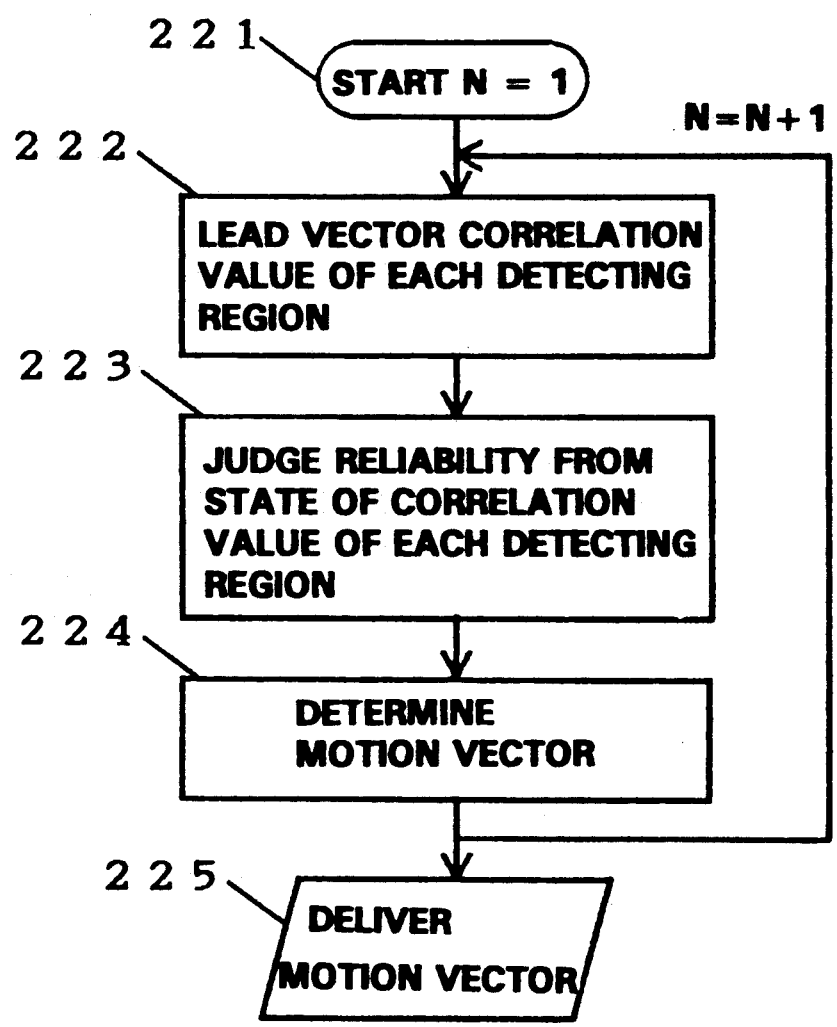
FIG. 4 is a flow chart for explaining the operation of the conventional motion vector detecting device.

What is different from the conventional motion vector detecting device is that the reliability of the motion vector of each detecting region is judged not only by the state of the present correlation value in each detecting region, but also by the time-course variation value of the correlation value. This point is described in further detail. As shown in FIG. 2, when a moving object such as a person enters the vector detecting region, the time-course changes of the correlation value are shown in FIG. 12 and FIG. 13. In both FIG. 12 and FIG. 13, (a) is the minimum of the correlation value, and (b) denotes the time-course variation (differential value) of the minimum of the correlation value. At this time, as the judging level of the reliability, supposing the minimum to be level m, and the time-course change of the minimum to be level b, the reliability is negative if at least one of them is greater than the judgement level. FIG. 12 and FIG. 3 are photographs of almost the same scene, and the moving object has crossed before the camera in both, and the minimum is near the judgment level. In (a), the minimum is over the level m, and the invasion of the moving object detected and the reliability is negatively confirmed. On the other hand, in (b) the minimum is less than level m, and the invasion of the moving object cannot be detected by the minimum alone, but the differential value of the minimum is over level b, and therefore invasion of the moving object can be detected.

Thus, according to the embodiment, when judging the reliability of the motion vector in each detecting region, it is possible to correctly judge the reliability by detecting not only the state of the present correlation values of the detecting regions, but also the time-course variations of the correlation values, even if one of them is fluctuated by noise or the like.

Figure 14:
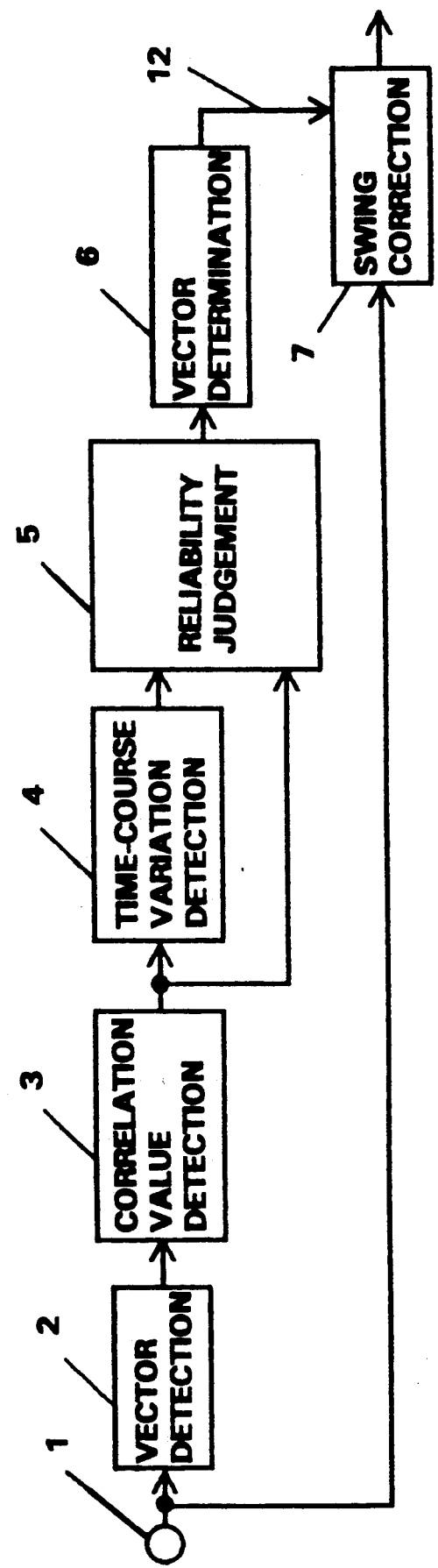
FIG. 14 is a block diagram of a swing correcting device in a second embodiment of the present invention.

A block diagram of a swing detecting device in a second embodiment of the present invention is shown in FIG. 14. The same parts as in FIG. 11 are identified with same reference numbers, and repeated explanation is omitted. In FIG. 14, numeral 7 is the swing correcting means.

In the second embodiment, the blocks of the image motion vector detecting device are the same in operation as the first embodiment.

Figure 5:
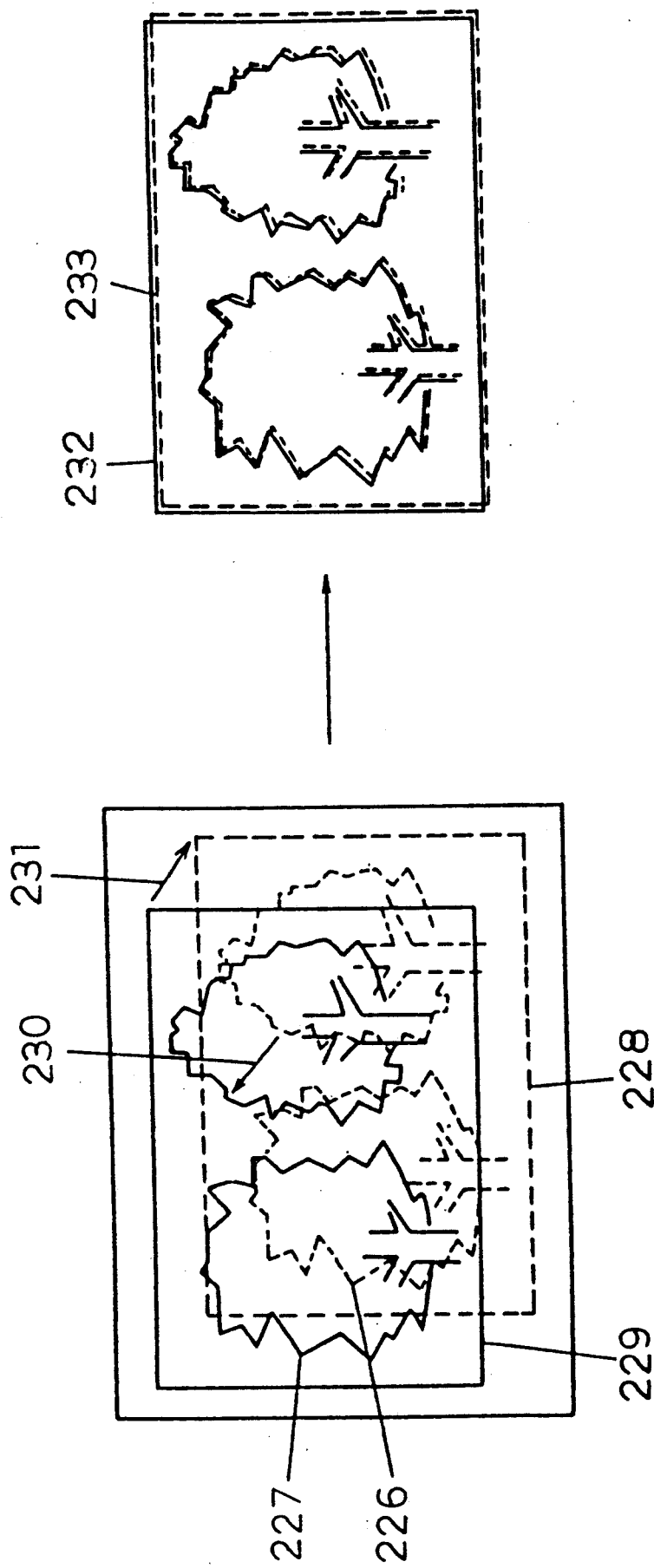

The swing correcting means 7, when an image of a large fluctuation enters as shown in 226, 227 in FIG. 5, moves the image parallel from 229 to 229 in the direction 231 of correcting the motion, on the basis of the motion vector 230 entered from the motion vector determining means 6, as to the input image signals of the (n−1)-th field 226, and the n-th field 227, and expands the screen by interpolation or the like, and delivers image signals 232, 233 in a size of one screen small in swing.

Thus, according to the embodiment, when judging the reliability of the motion vector of each detecting region, by using not only the state of the present correlation values in the detecting regions but also the time-course fluctuation values of correlation values, the reliability may be judged correctly even if one of the values is fluctuating due to noise or the like, and even if a moving object occupying the majority or whole of the screen passes through the screen, malfunctions to correct the screen in a different direction from the intended direction of the operator due to interruption of correction do not occur. Meanwhile, the number of detecting regions in the screen of the first and second embodiments is four, but it is not limitative.

Figure 15:
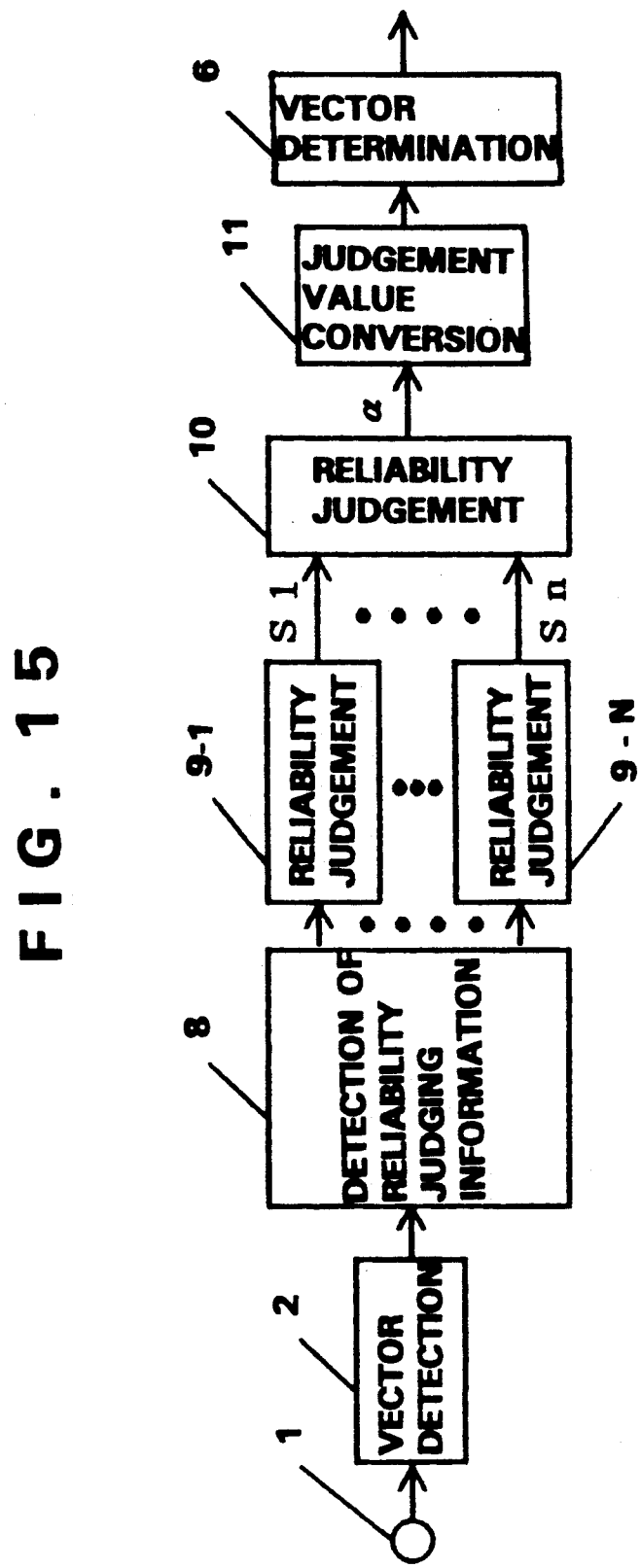
FIG. 15 is a block diagram of a motion vector detecting device in a third embodiment of the present invention.

A motion vector detecting device in a third embodiment of the present invention is described below. The configuration of the motion vector detecting device in the third embodiment is shown in FIG. 15. Those parts the same as in FIG. 11 are identified with same reference numbers and are not explained. In FIG. 15, numeral 8 is a reliability judging information detecting part, 9-1, . . . , 9-n are first judging means for determining the judgment value of ternary or higher value taking the values in interval [0, 1], 10 is second judging means for determining the judgment value of the ternary or higher value taking the values in the interval [0, 1] from the judgment values of plural ternary or higher values by the first judging means 9-1, 9-2, . . . , 9-n, and 11 is judgment value converting means for converting the judgment value by the second judging means 10 into a binary judgment value of {0, 1}. In this embodiment, as the result of the judgment having the meaning between true to false value, the judgment value of ternary or higher value taking the value in the interval of [0, 1] is used, which is a characteristic point.

In the image motion vector detecting device of the third embodiment, the method of extracting the correlation value with the motion vector of each region is same as in the first embodiment and is omitted herein. The reliability judgment information detecting part 8 functions as the time-course variation detection part 4 of the correlation value and the correlation value detection part 3 in FIG. 13, and as the plural sets of information of reliability judgment, the minimum, mean maximum of the correlation values, and the time differential value of the correlation values or the difference as the time-course variation of the correlation values, are obtained. In the first judging means 9-1 to 9-n, the reliability of each region is judged by the ternary or higher value taking the values in the interval [0, 1], with respect to each information from the plural sets of information about the correlation value entered from the reliability judgment information detecting part 8. The second judging means 10 determines one judgment value taking the values in the interval [0, 1] in each region by averaging or multiplying the plural judgment values obtained by the first judging means 9-1 to 9-n. The judgment value converting means 11 converts the judgment value taking the values in the interval [0, 1] obtained by the second judging means 10 into a binary value of {0, 1} from a specific level boundary, and the result of the judgment is delivered to the motion vector determining means 6, together with the motion vector in each region. The motion vector determining means 6 delivers the intermediate value of the motion vectors from the regions judged to be reliable, as the motion vector of the screen.

Figure 16:
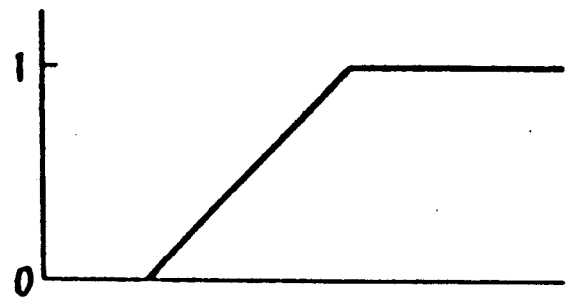
FIG. 16, FIG. 17 and FIG. 18 are diagrams showing the function of judgement values.
Figure 17:
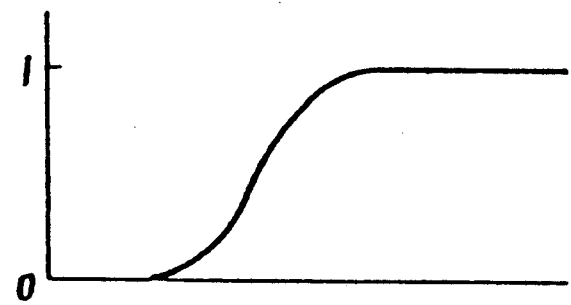
Figure 18:
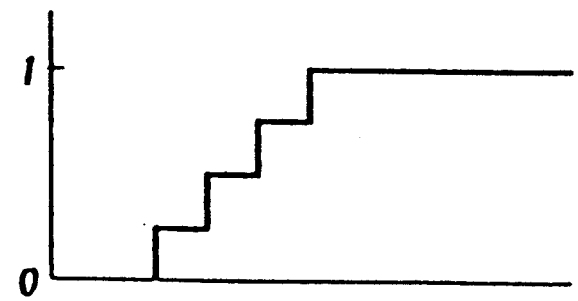

The deduction of the judgment result of each region different from the conventional motion vector detecting device is described in further detail below. First, the method of determining the ternary or higher judgment value taking the values in the interval [0, 1] by the first judging means 9-1 to 9-n is described. To determine the value of judgment of ternary or higher values taking the values in the interval [0, 1], the function of the judgment value is set as shown in FIG. 16. In FIG. 16, the axis of the abscissa denotes the value of correlation, and the axis of ordinate represents the judgment value from 0 to 1 corresponding to the correlation value. The function of the judgment value is not limited in the shape, and an example of another function is shown in FIG. 17. In FIG. 16 and FIG. 17, the judgment values have the function to deliver continuous values from 0 to 1, but a function delivering discrete value of ternary or higher value may be used as shown in FIG. 18. By using the function of such judgment value, in the first judging means 9-1 to 9-n, the judgment value of ternary or higher value taking the values in the interval [0, 1] is determined. Next, in the second judging means 10, from plural judgment values, the method of determining one judgment value having the value in the interval [0, 1] is explained below. Suppose, in the first judging means 9-1 to 9-n, the judgment values having n values in the interval [0, 1] from s1 to sn are obtained. To obtain one judgment value $a$ from them, the following averaging calculation is employed.

$$a = (s1 + \cdots + sn)/n$$

Or each judgment value is weighed with a1 to an, and one judgment value is determined in the weighted mean calculation shown below.

$$a = (a1*s1 + \cdots + an*sn)/(a1 + \cdots + an)$$

Or, as shown below, the product of n judgment values s1 to sn is supposed to be $a$.

$$a = s1* \cdots *sn$$

Figure 19:
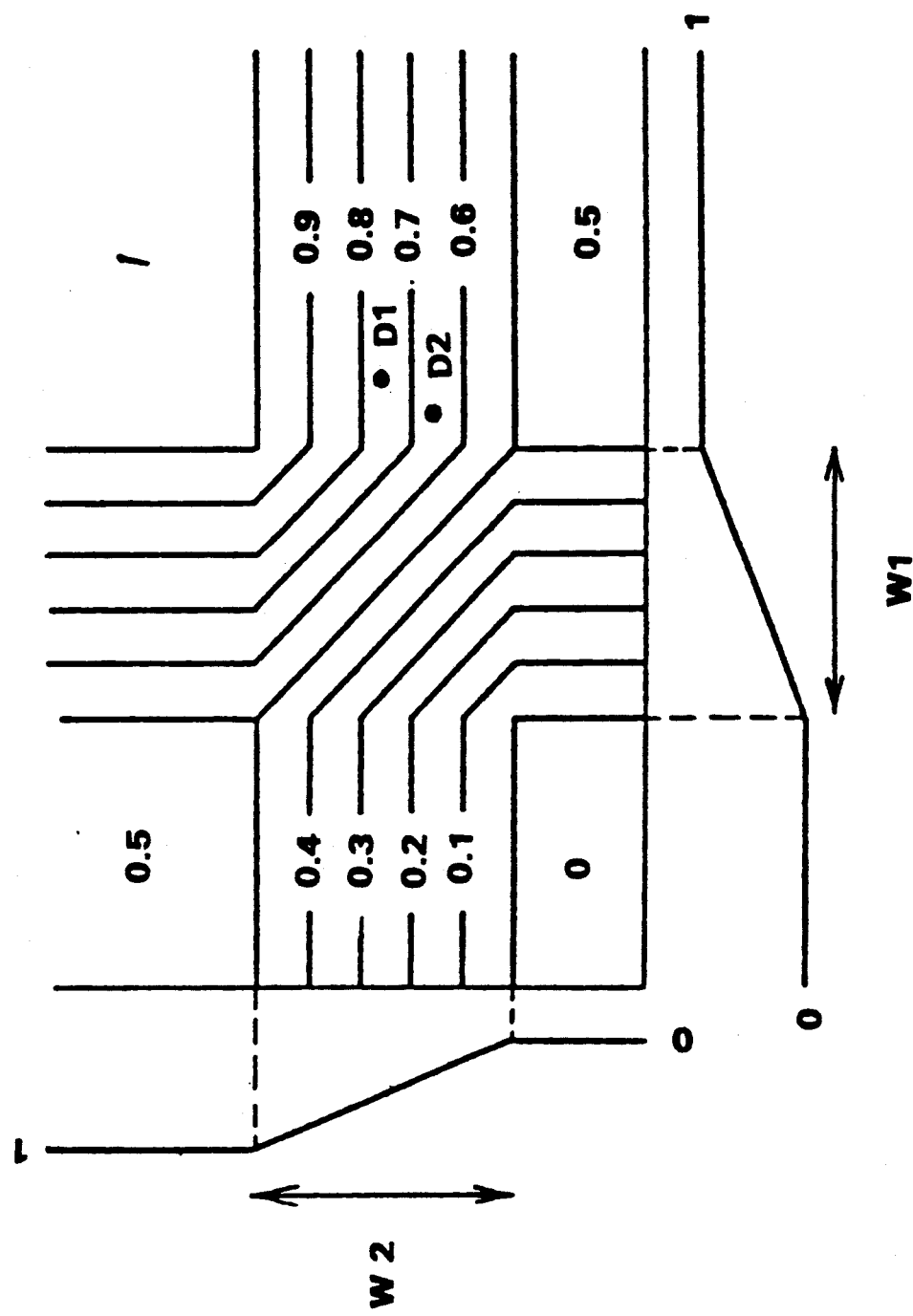
FIG. 19 is a diagram showing a contour line of judgment values.

FIG. 19 shows the contour line of the judgment value $a$ when two correlation values are used in the judgment. In FIG. 19, the function of the judgment value is trapezoidal as shown in FIG. 16, and the mean calculation is employed for deducing $a$.

Figure 10:
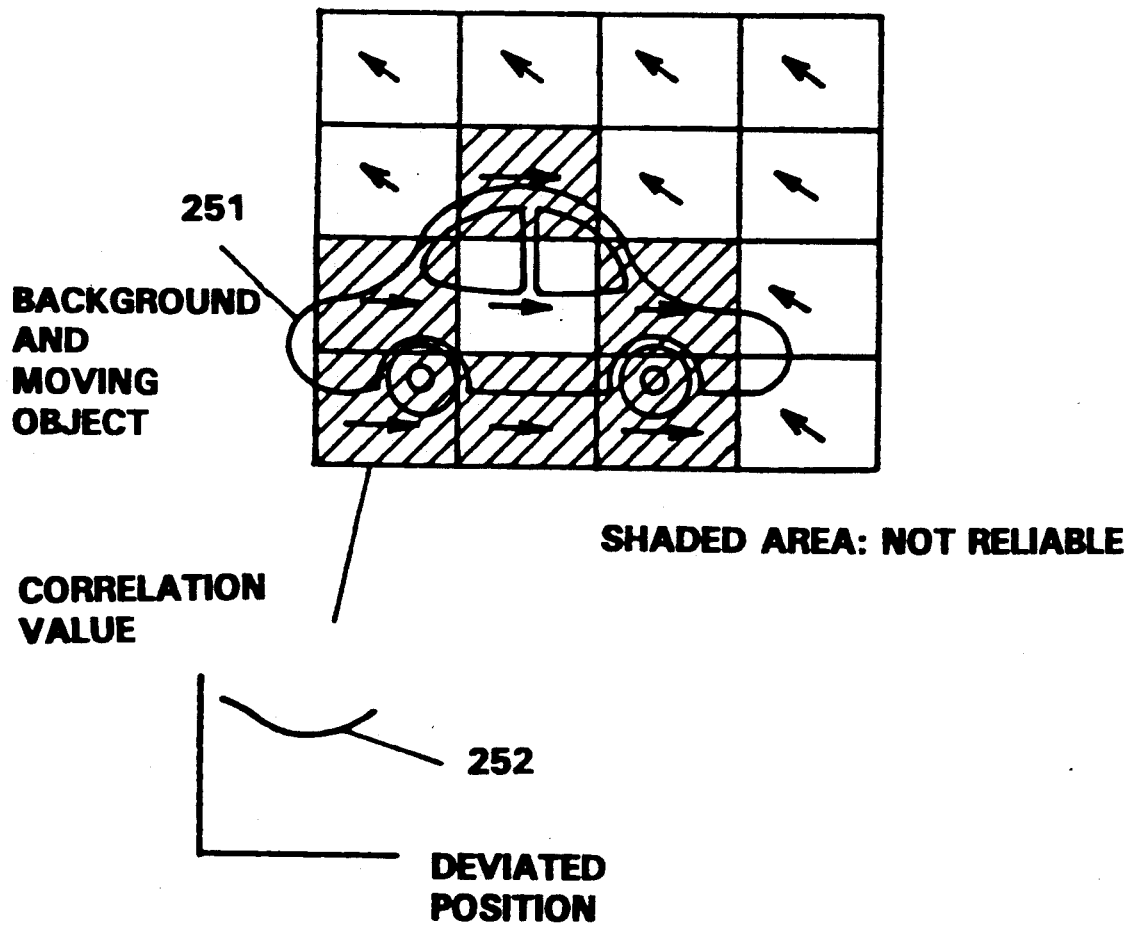
FIG. 10 is a diagram for explaining the operation of the reliability judgment of a conventional motion vector detecting device.

Next is explained the method of converting finally to the binary judgment value of {0, 1} from the ternary or higher judgment value $a$ taking the value in the interval [0, 1] determined in any one of the above methods. The judgment value converting means 11 compares the ternary or higher judgment value having the value in the interval [0, 1] obtained by the second judging means 10 with the specified converting level, and converts to the binary judgment value of {0, 1}, specifically 1 when the judgment value is greater than the specified converting level, and 0 when smaller than the specified converting level. FIG. 10 shows the result of converting from the ternary or higher judgment value $a$ having the value in the interval [0, 1] shown in FIG. 19, to the binary judgment value of {0, 1} at the converting level 0.5. In the diagram, the shaded area denotes 1, and the other region is 0.

Thus, in the method of deducing the judgment result in the embodiment, the ternary or higher judgment value having the value in the interval [0, 1] is obtained from each one of plural sets of reliability judgment information in each detecting region, and by determining one ternary or higher judgment value from plural ternary or higher judgment values, the binary judgment value of each detecting region is finally obtained. As a result, the ambiguity of the threshold level in the interval [0, 1] is expressed, and if one of the plural judgment results be ambiguous, correct judgment is obtained.

Figure 6:
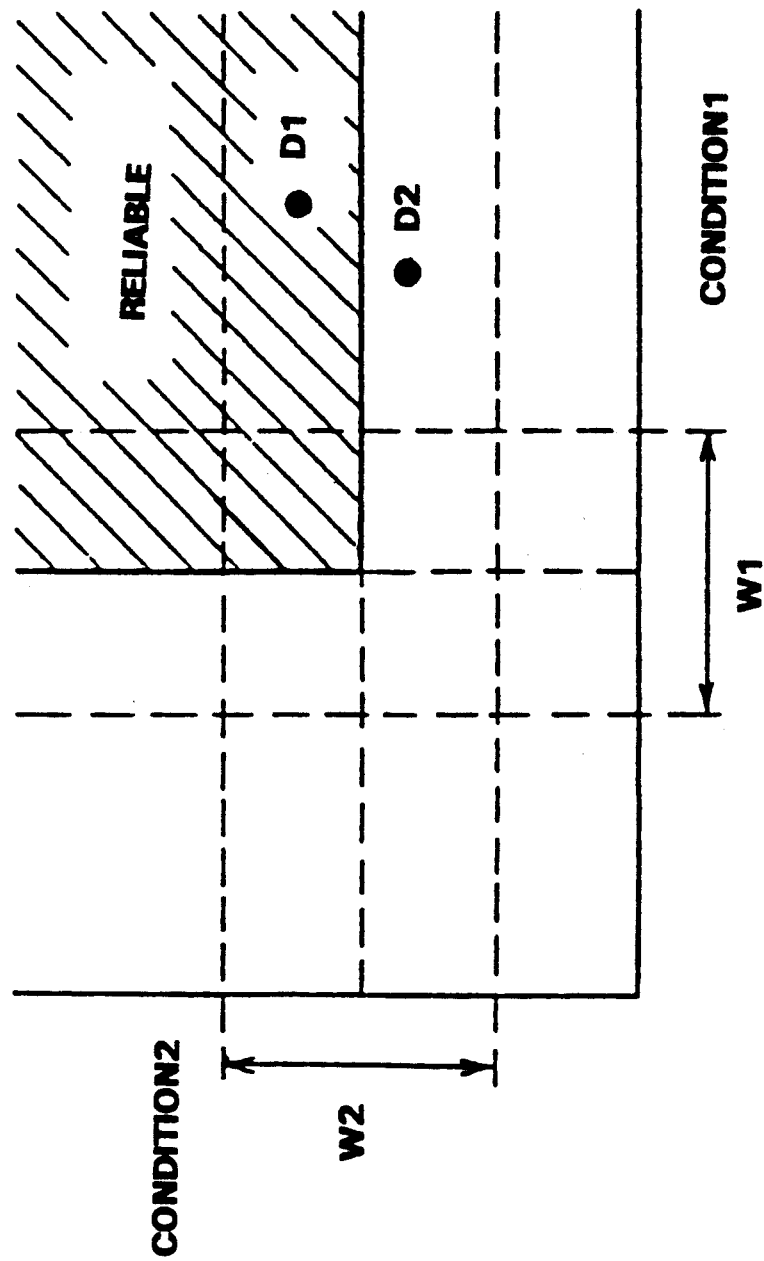
FIG. 6 is a diagram for explaining the ambiguity in a specific condition in the conventional art.
Figure 9:
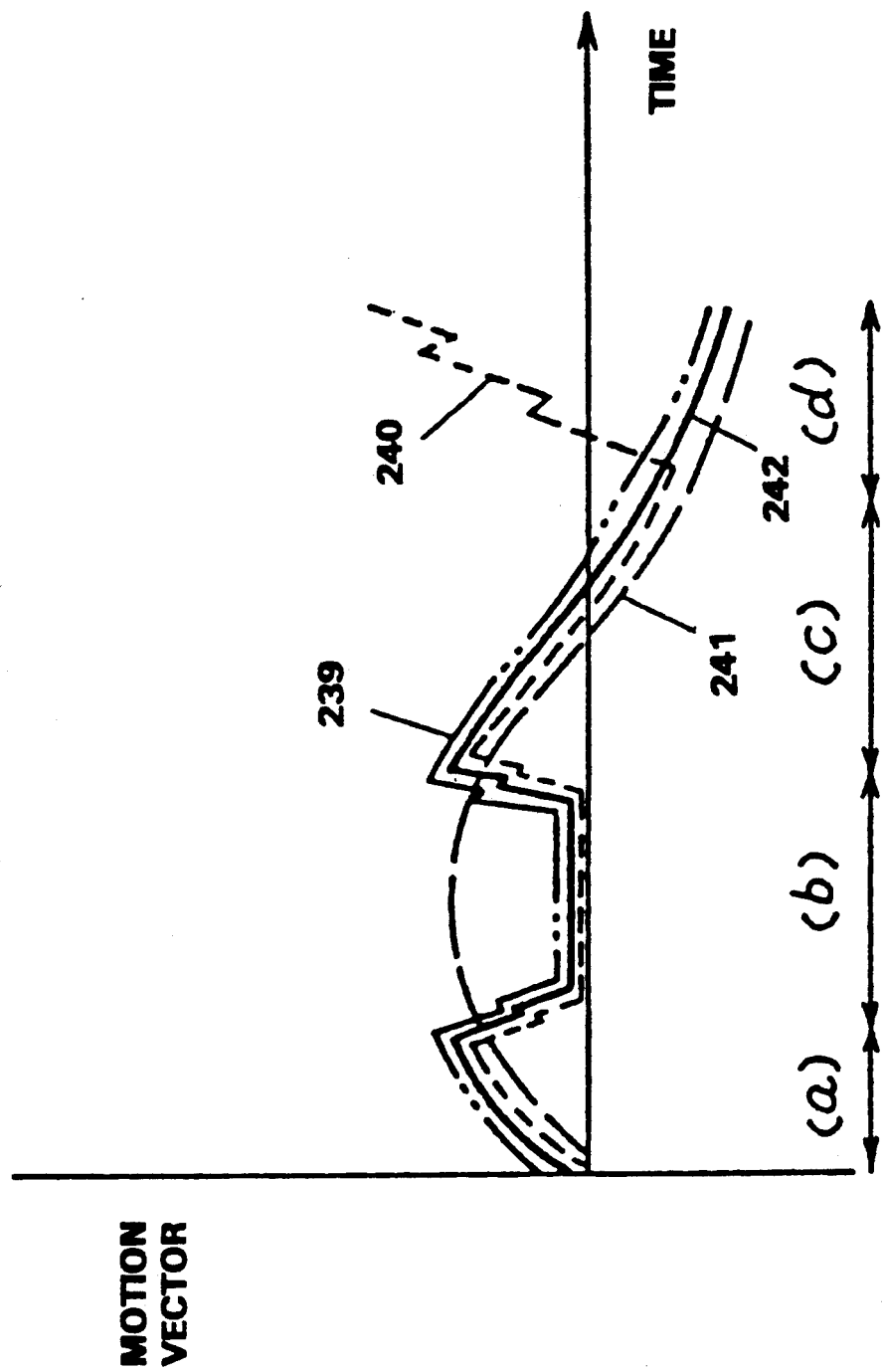
Figure 20:
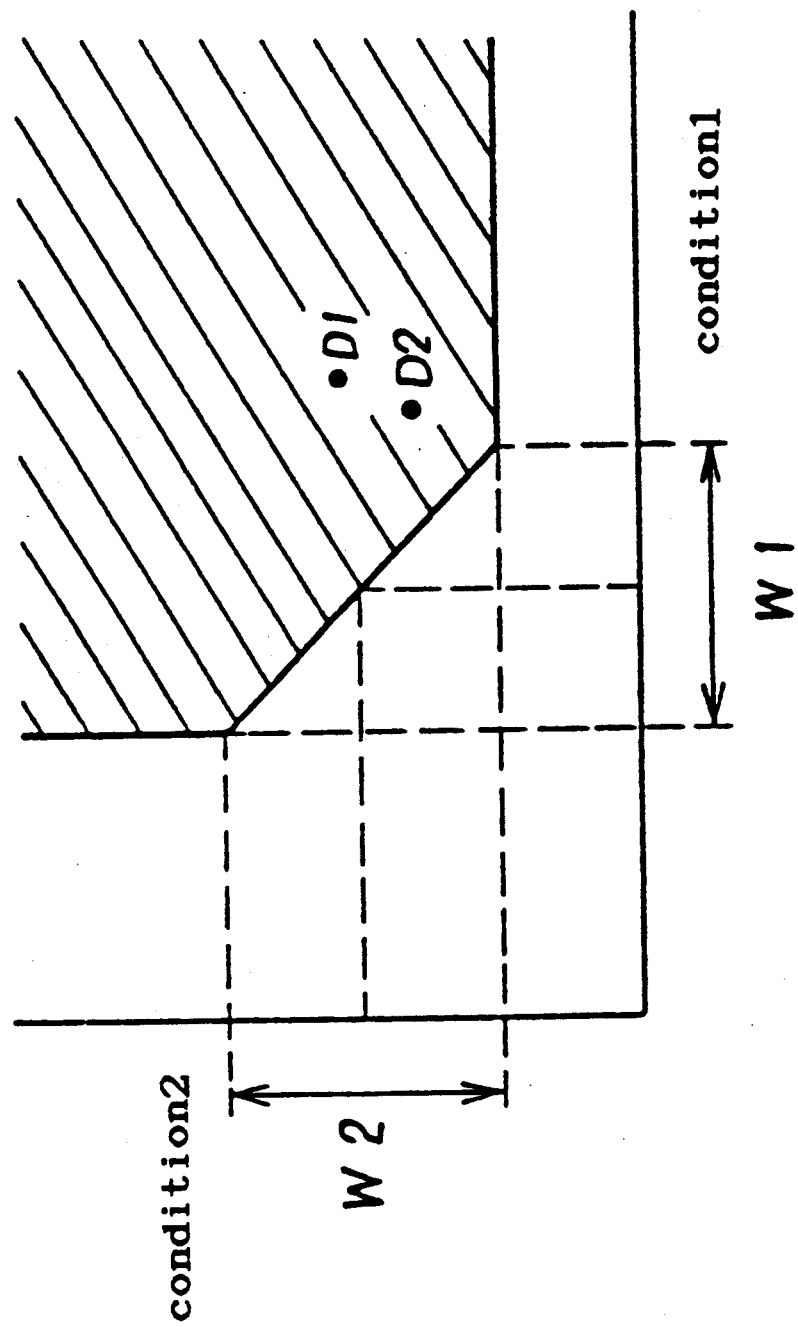
FIG. 20 is a diagram showing results of conversion of judgment values.

This point is described in detail by referring to the data D1, D2 in FIG. 6 mentioned in relation to the problems that the invention is to solve. The data D1, D2 are obtained in the same conditions and are essentially identical, but in the prior art, it is an ambiguous judging region for condition 2, and only the binary judgment value of {0, 1} can be handled, and therefore D1 is judged to be reliable (judgment value=1), and D2 not reliable (=0). In this embodiment, on the other hand, since the judgment value can be handled in the interval [0, 1], and the judgment values of D1 and D2 are, as shown in FIG. 19, obtained as mutually close judgment values as $a$ (D1)=0.76, $a$ (D2)=0.68, and the final judgment result is both reliable as shown in FIG. 20. Thus, in this embodiment, even the data fluctuating due to noise may be judged correctly.

In the embodiment, meanwhile, all judgment values are explained by standardizing in the interval [0, 1], but this is not limitative, and for example, it may be in the interval [0, 10] or [−50, 50], and it is the characteristic of this embodiment to employ the ternary or higher value, instead of the binary value, in the judgment value.

Figure 21:
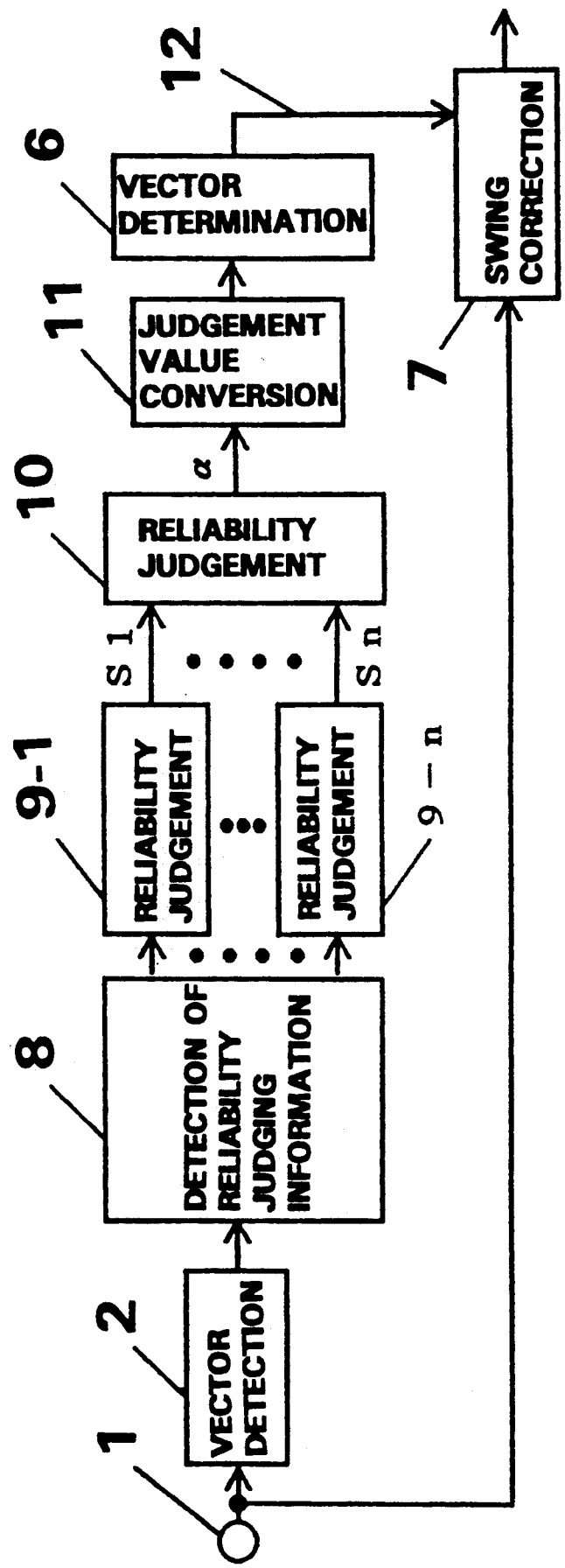
FIG. 21 is a block diagram of a swing correcting device in a fourth embodiment of the present invention.

A block diagram of a swing correcting device in a fourth embodiment of the present invention is described in FIG. 21. Those parts the same in FIG. 14 as in FIG. 15 are identified with the same reference numbers, and explanations are omitted.

In the fourth embodiment, the blocks of the image motion vector detecting device the same in operation as in the third embodiment, and are not explained herein.

The swing correcting means 7, when receiving the image with large fluctuation as shown in 226, 227 in FIG. 5, moves the constitution of the image parallel from 229 to 228 in the direction 231 for correcting the motion, on the basis of the motion vector 230 entered from the motion vector determining means 6, with respect to the input image signal of the (n−1)-th field 226, the n-th field 227, and enlarges or manipulates the constitution by interpolation or the like, and delivers the image signals 232, 233 in the size of one constitution small in swing.

Thus, according to the embodiment, when judging the reliability of the motion vector in each detecting region, the ternary or higher judgment value in the interval [0, 1] is determined from each one of the plural sets of reliability judgment information in each detecting region, and by obtaining one ternary or higher judgment value from plural ternary or higher judgment values, the final binary judgment value in each detecting region is obtained. Consequently, even if one of the plural sets of judgment information is fluctuating due to noise or the like, the reliability can be judged correctly, and if a moving object occupying the majority or whole of the screen passes through the screen, a malfunction of correcting in a wrong direction from the direction intended by the operator due to interruption of the correction is avoided. Meanwhile, in the third and fourth embodiments, the number of detecting regions in the screen may be four or an other number.

Figure 22:
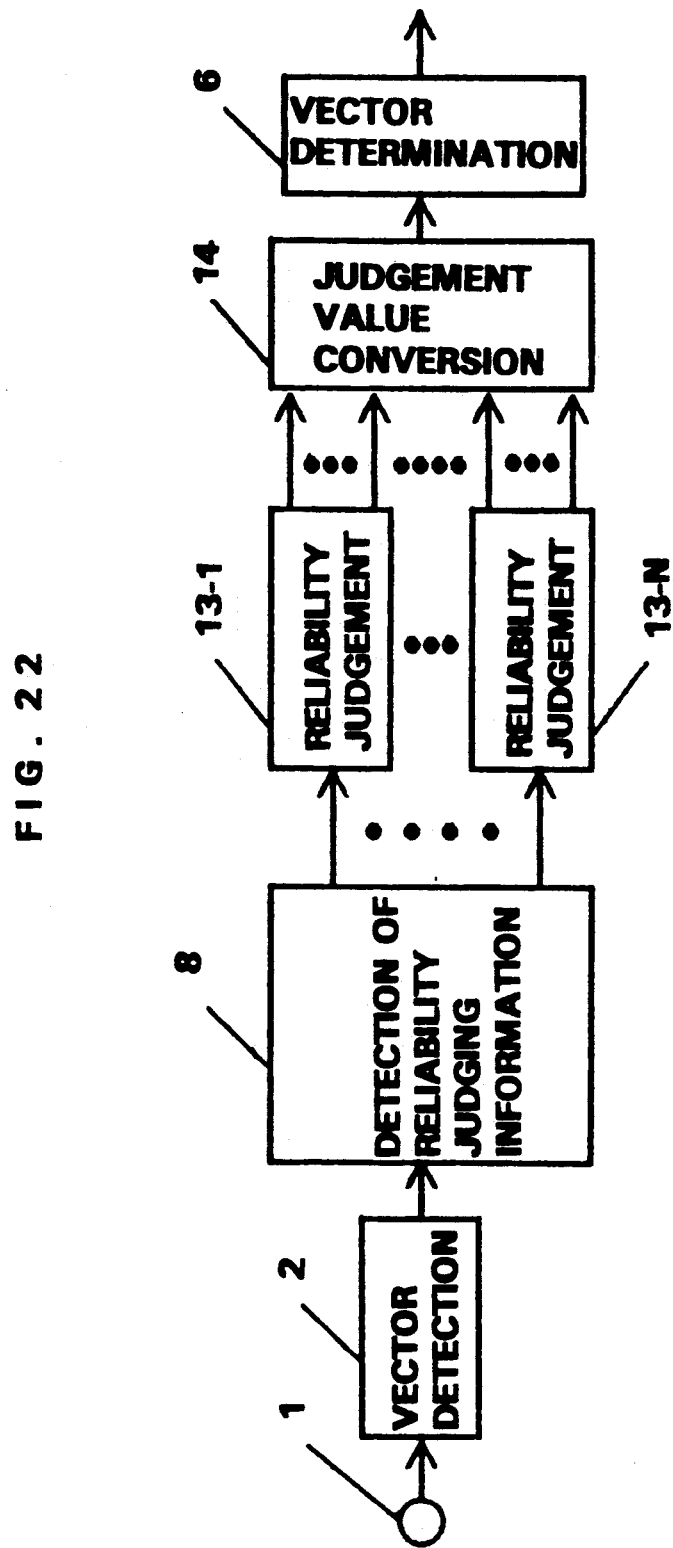
FIG. 22 is a block diagram of an image motion vector detecting device in a fifth embodiment of the present invention.

The motion vector detecting device in a fifth embodiment of the present invention is described below. The configuration of the motion vector detecting device of the fifth embodiment is shown in FIG. 22. Those parts the same as in FIG. 15 are identified with the same reference numbers, and explanations are omitted. In FIG. 22, numerals 13-1, . . . , 13-n are judging means for judging the binary judgment value of {0, 1} in every divided judgment interval, and 14 is judgment value converting means for converting from the plural judgment results by the judging means into one binary judgment value of {0, 1}. In this embodiment, it is characteristic that the binary judgment value of {0, 1} is used in every divided judging interval as the judgment result having the meaning between true and false values.

In the image motion vector detecting device of the fifth embodiment, the method of obtaining the motion vector of each region and the reliability judgment information is same as in the third embodiment and is the not explained herein. In the judging means 13-1 to 13-n, the reliability of each region is judged for each information from the plural sets of information of the correlation value entered from the reliability judgment information detecting part 8. In each judgment interval divided with respect to each judgment information in every region, the binary judgment of {0, 1} is effected. The judgment value converting means 14 converts from the binary judgment value of {0, 1} in the plural judgment intervals obtained in each region into one binary judgment value of {0, 1}, and the result of judgment is delivered to the motion vector judging means 6 together with the motion vector in each region. The motion vector judging means 6 delivers the intermediate value of the motion vector from the region judged to be reliable, as the motion vector of the screen.

Figure 23:
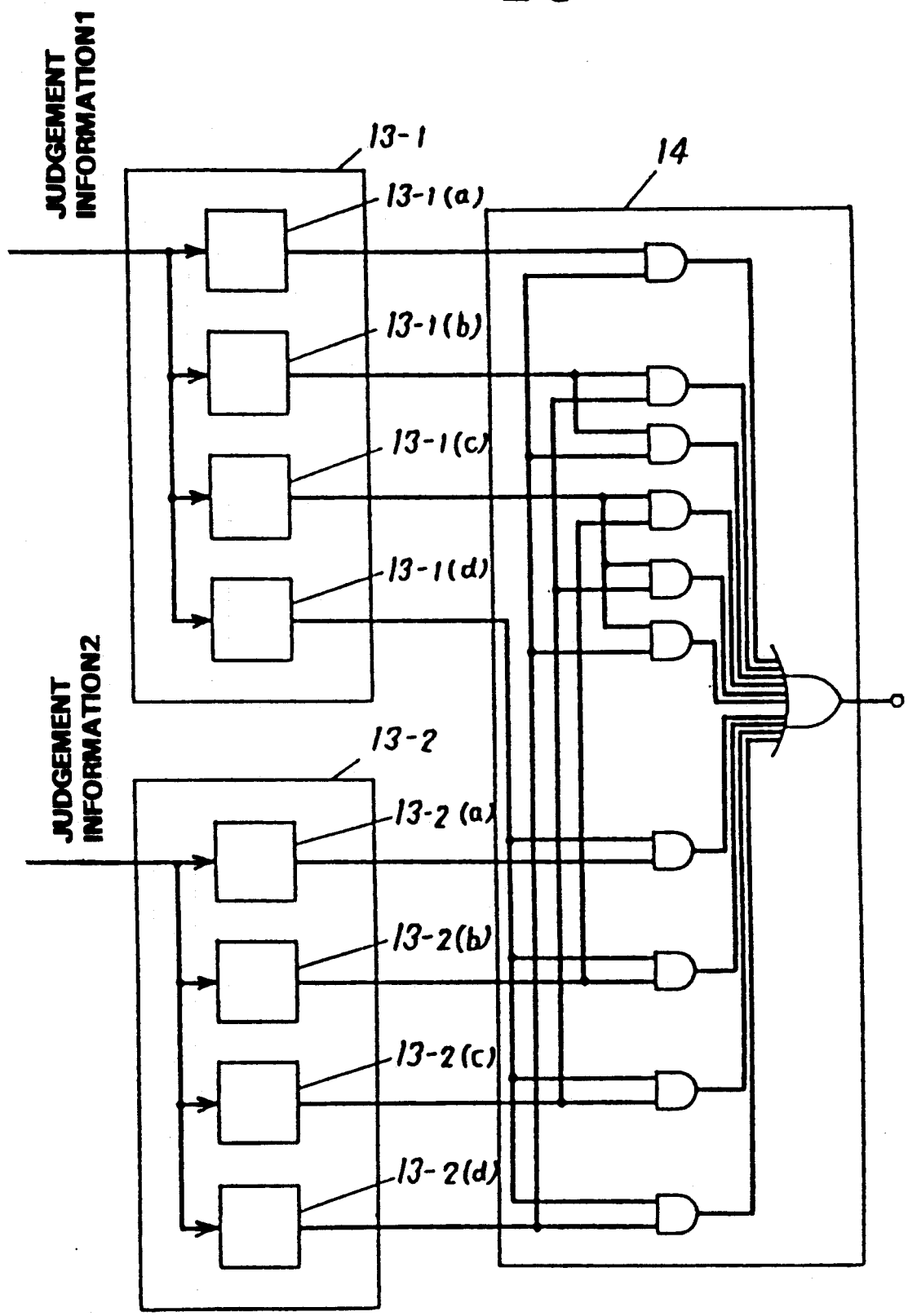
FIG. 23 is a detailed structural diagram of reliability judging means and judgment converting means in the fifth embodiment the present invention.
Figure 24:
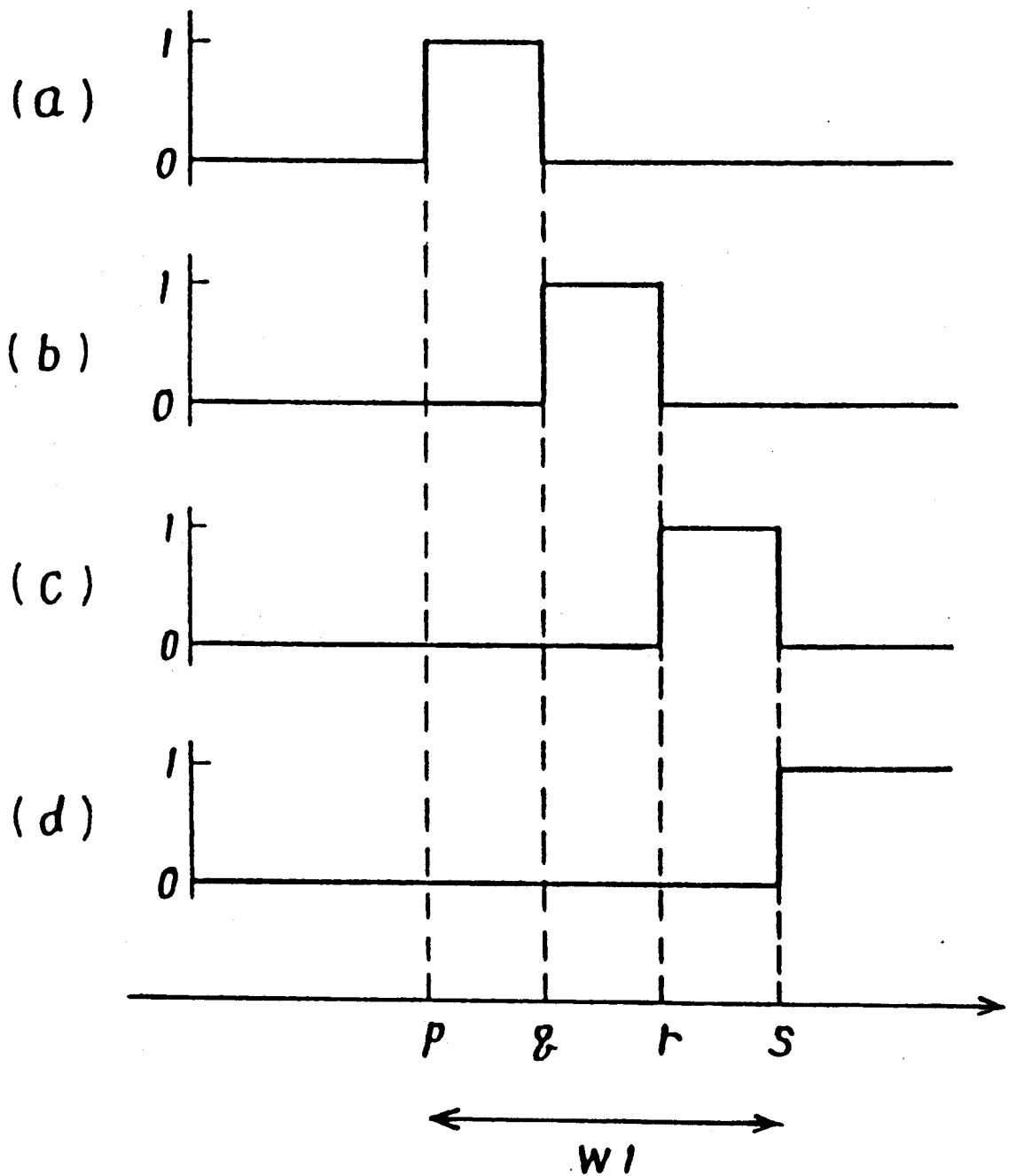
FIG. 24 is a diagram for explaining the operation of the reliability judging means in the fifth embodiment of the present invention.

The method of deduction of the judgment result in each region different from the motion vector detecting device in the third embodiment is further described below. For the sake of simplicity of explanation, the number of pieces of reliability judgment information is two, but this is not limitative. FIG. 23 shows the detailed configuration of the judging means 13 and judgment value converting means 14. In FIG. 23, numerals 13-1(a) to 13-1(d), and 13-2(a) to 13-2(d) are judging circuits for delivering the binary judgment value of {0, 1} in every judging interval, and the judgment value converting circuit 14 is composed of AND and OR circuits. The output signals of the judging circuits 13-1(a) to 13-1(d) are shown in FIGS. 24 (a) to (d), and it is same in 13-2(a) to 13-2(d). That is, 13-1(a) is 1 when the judgment information 1 is from p to q, 13-1(b) is 1 when the judgment information is from q to r, 13-1(c) is 1 when the judgment information is from r to s, and 13-1(d) is 1 when the judgment value is higher than s, and otherwise 0. It is false when all of 13-1(a) to 13-1(d) are 0, and true when 13-1(d) is 1, and intermediate in the meaning from true to false when any one of 13-1(a), (b), (c) is 1, which shows the result of judgment. In this case, in order to have the meaning between true and false by using a binary value of 0 or 1, the judgment region is divided into five intervals as follows: less than p, p to q, q to r, r to s, and more than s as shown in FIG. 24, as for the ambiguous judgment interval W1 shown in FIG. 6. It means the same effect as using the five discrete values for judgment from 0 to 1, by the function of the judgment values for the whole region of judgment as shown in FIG. 18 in the third embodiment. In other words, 13-1(a), 13-2(a) corresponds to 0.25, 13-1(b), 13-2(b) to 0.5, 13-1(c), 13-2(c) to 0.75, and 13-1(d), 13-2(d) to 1, thus corresponding to the intermediate judgment values from 0 to 1. Suppose 13-1(b) to be 1 from the judgment information 1. At this time, the final judgment result of the judgment value converting means 14 becomes 1 when the judgment result by the judgment information 2 is 1 in 13-2(c) or 1 in 13-2(d). In other words, seeing that 13-1(b) corresponds to 0.5, 13-2(c) to 0.75, 13-2(d) to 1, it means that the final judgment result is 1 when the mean of the intermediate judgment value from 0 to 1 by two sets of judgment information is greater than 0.5. This is the same result as shown in the third embodiment.

Thus, the method of obtaining the judgment result in the embodiment is to determine the binary value of {0, 1} in every divided judgment interval corresponding to every one of a plurality of reliability judgment information in every detecting region, and to obtain one binary judgment value of {0 or 1}1 from the binary judgment values of {0, 1} of plural judgment intervals, thereby leading out the final binary judgment value in each detecting region. Accordingly, expressing the ambiguity of the threshold level in the judgment of binary value of {0, 1} in every divided judgment interval, and if one of the plural judgment results is ambiguous, correct judgment is achieved. As far as the function is the same as mentioned in this embodiment, another method may be also employed.

Figure 25:
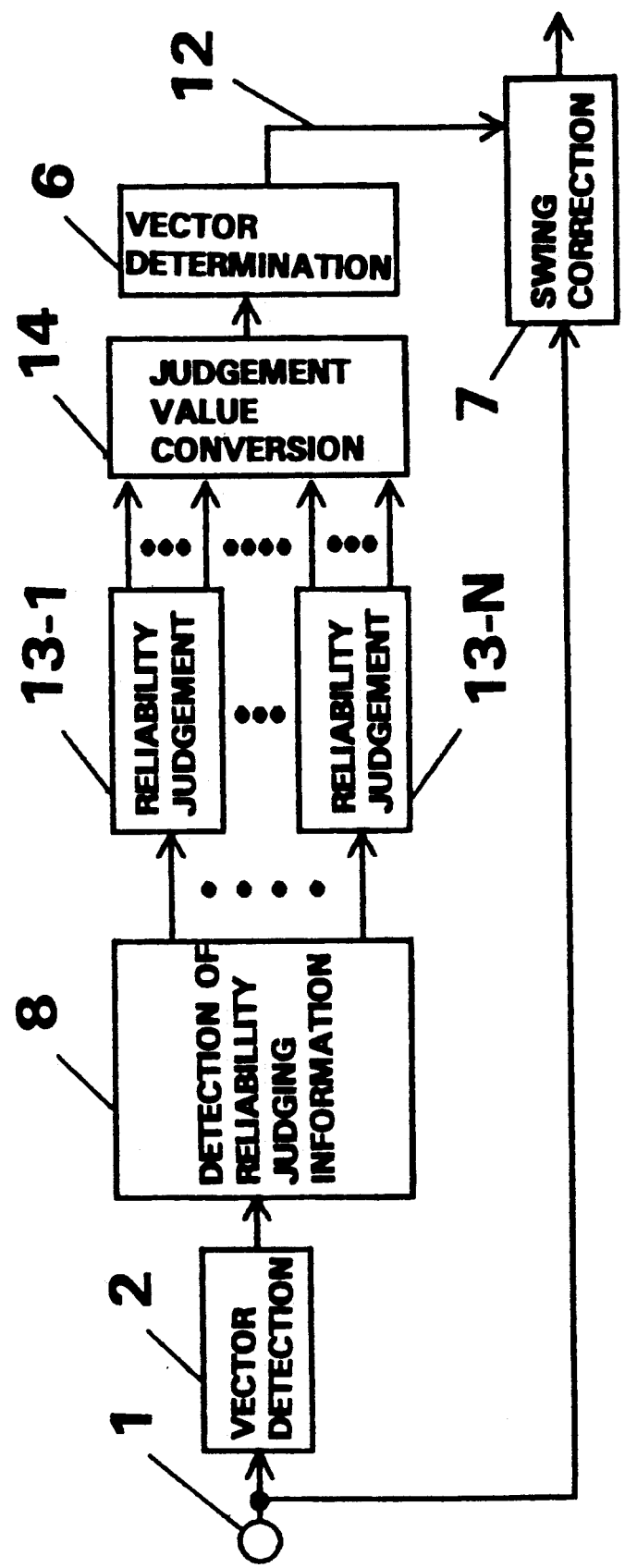
FIG. 25 is a block diagram of a swing correcting device in a sixth embodiment of the present invention.

FIG. 25 is a block diagram of a swing correcting device in a sixth embodiment of the present invention. Those parts the same as shown in FIG. 14, and FIG. 22 are identified with the same reference numbers, and explanations are omitted.

In the sixth embodiment, the blocks of the image motion vector detecting device is the same in operation as the fifth embodiment, and its explanation is omitted. As for the operation of the swing correcting means, it is the same as explained in the second and fourth embodiments, and the repeated explanation is omitted. In the fifth and sixth embodiments, the number of detecting regions on the screen may be either four or another.

Figure 26:
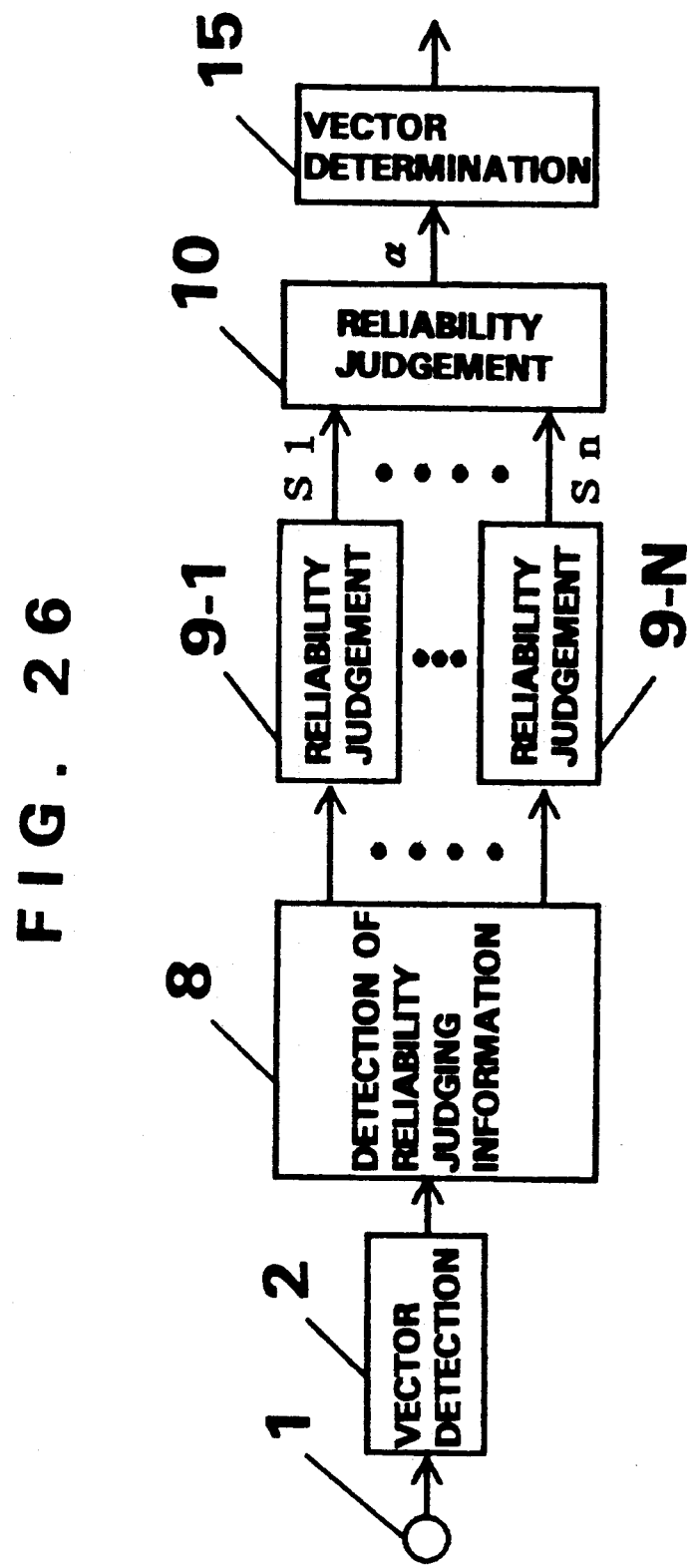
FIG. 26 is a block diagram of an image motion vector detecting device in a seventh embodiment of the present invention.

The motion vector detecting device of the seventh embodiment of the present invention is described. The configuration of the motion vector detecting device of the seventh embodiment is shown in FIG. 26 Those parts the same in FIG. 15 are identified with the same reference numbers, and are omitted in explanation. In FIG. 26, numeral 15 is a motion vector determining means.

In the image motion vector detecting device of the seventh embodiment, the process up to determining one judgement value $a$ having the value in the interval [0, 1[ in each region is the same as in the third embodiment, and the explanation is omitted. What is different from the motion vector detecting device in the third embodiment is the method of determining the motion vector of the screen, and this point is described in detail below.

In the vector detecting circuit 2 in each detecting region, preliminarily, as shown by 209, 210, 211, 212 in FIG. 2, four vector detecting regions are determined in the screen, and in each detecting region between two fields, the difference $\Sigma|\Delta L|$ (i,j) of the signal at the position deviated by the quantity (i,j): $imin<i<imax$, $jmin<j<jmax$ in a specified range is respectively obtained as the correlation value, and the deviation (i',j') for giving the minimum of the value is detected, and it is taken as the vector Vi (i=1 to 4) in each region. On the other hand, in the second judging means 10, from the plural judgment values obtained by the first judging means 9, one judgement value $ai$ (i=1 to 4) having the value in the interval [0, 1] is obtained in each region. In the motion vector determining means 15, from the judgment value $ai$ having the value in the interval [0, 1] and that vector Vi in each region, the motion vector V of the screen is determined by the following equation.

$$V = a1*V1 + a2*V2 + a3*V3 + a4*V4$$

Thus, in the motion vector detecting device of the embodiment, in each detecting region, from the plural sets of reliability judgment information in each detecting region, the ternary or higher judgment value having the value in the interval [0, 1] is obtained, and one ternary or higher judgment value is obtained from the plural ternary or higher judgment values. From the ternary or higher judgment value and the vector in each detecting region, the motion vector of the screen is finally determined. As a result, by the judgment value having the value in the interval [0, 1] in each region, the ambiguity of the result of judgment is expressed, and the motion vector may be determined by reducing the weight in the ambiguous region of the result of judgment. In this embodiment, meanwhile, plural judgment values from the first judging means 9-1 to 9-n are converted into one judgment value by the second judging means 10, but the second judging means 10 may not be required, and the plural judgment values by the first judging means 9-1 to 9-n may be directly used as weight coefficients to determine the motion vector. The information used in judgment of reliability of each region may be only one, and the first judging means 9-1 to 9-n may be also only one.

Figure 27:
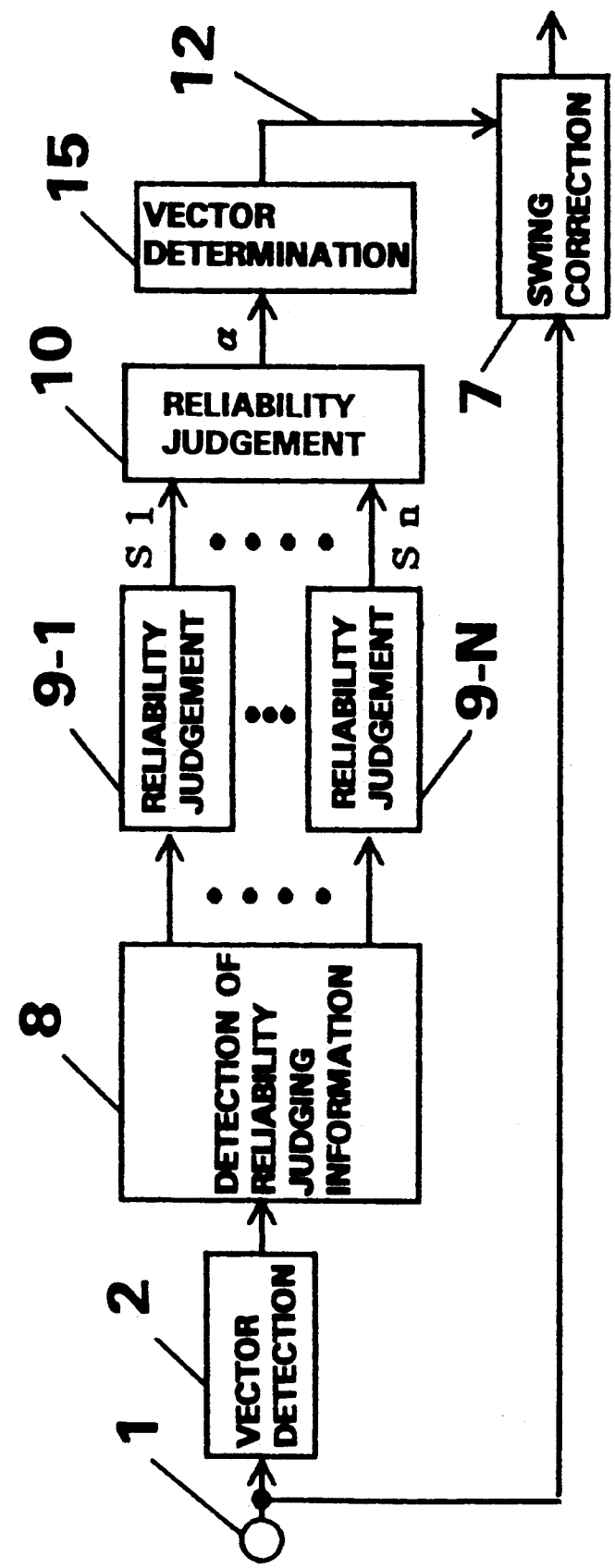
FIG. 27 is a block diagram of a swing correcting device in an eighth embodiment of the present invention.

FIG. 27 shows a block diagram of a swing correcting device in an eighth embodiment of the present invention. Those parts the same in FIG. 14 and FIG. 26 are identified with the same reference numbers, and the explanation is omitted.

The swing correcting means 7, when receiving an image of large fluctuation as indicated by 226, 227 in FIG. 5, moves the screen of the image parallel from 229 to 228 in the direction 231 of correcting the motion, on the basis of the motion vector 230 entered from the motion vector determining means 15, with respect to the input image signals of the (n−1)-th field 226 and the n-th field 227, and enlarges or manipulates the screen by interpolation or the like, thereby delivering image signals 232, 233 in a size of one screen less in fluctuation.

Thus, in this embodiment, when judging the reliability of the vector in each detecting region, the ternary or higher judgment value having the value in the interval [0, 1] is determined from each one of the plural sets of reliability judgment information in each detecting region, and one ternary or higher judgment value is determined from plural ternary or higher judgment values. Furthermore, from this ternary or higher judgment value and the vector in each detecting region, the motion vector of the screen is finally determined. As a result, even when one of the plural sets of judgment information is fluctuated due to noise or the like, the motion vector of the screen may be correctly determined, and if a large object occupying the majority or whole of the screen crosses the screen, malfunction due to correction of the screen in a a wrong direction from the intended direction of the operator due to interruption of the correction may be avoided. In the embodiment in FIGS. 17 and 18, meanwhile, the number of detecting regions in the screen is four, but this is not limitative.

Figure 28:
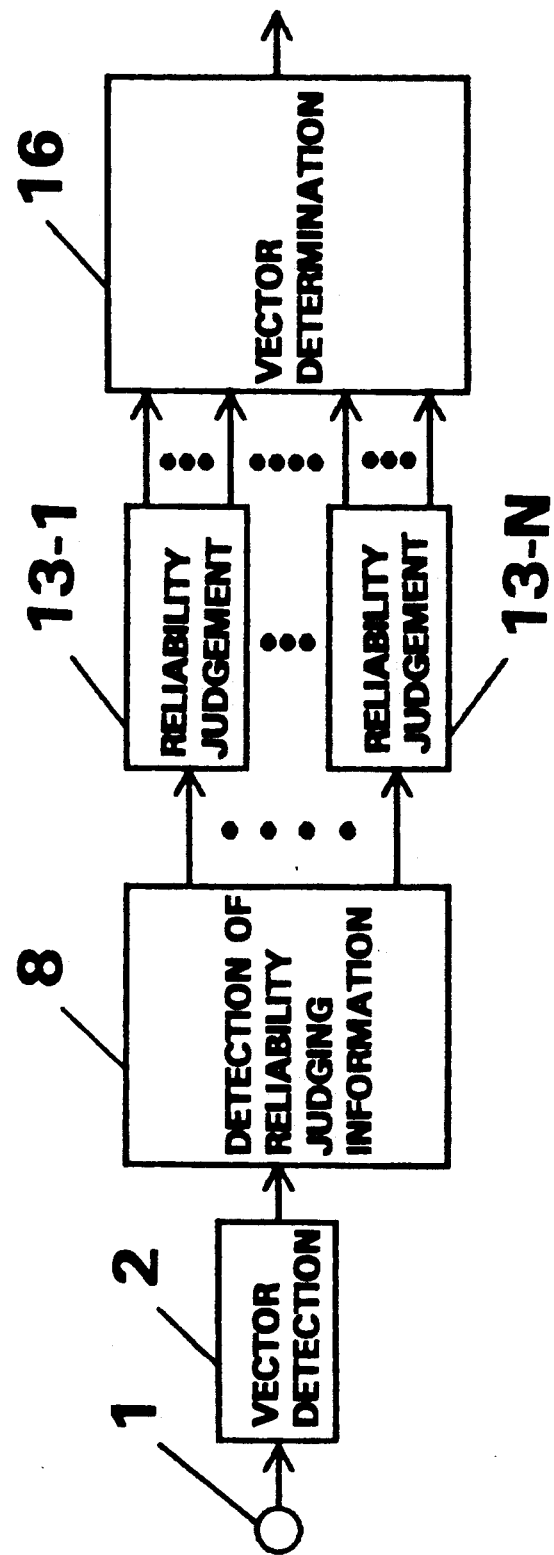
FIG. 28 is a block diagram of an image motion vector detecting device in a ninth embodiment of the present invention.

The motion vector detecting device of the ninth embodiment of the present invention is explained below. The configuration of the motion vector detecting device of the ninth embodiment is shown in FIG. 28. Those parts the same in FIG. 22 are identified with the same reference numbers, and the explanation is omitted. In FIG. 28, numeral 16 is motion vector determining means.

In each detecting region of the image motion vector detecting device of the ninth embodiment, the process up to determining the binary judgment value of {0, 1} in each judgment interval divided with respect to each one of the plural reliability judgment information sets is same as in the fifth embodiment, and the explanation is omitted. What is different from the motion vector detecting device in the fifth embodiment is the method of determining the motion vector of the screen which is described in detail below.

In the vector detecting circuit 2 of each detecting region, preliminarily, as indicated by 209, 210, 211, 212 in FIG. 2, four vector detecting regions are determined in the screen, and in each detecting region between two fields, the difference $\Sigma|\Delta L|(i,j)$ of the signal of the position deviated by the quantity (i,j): imin<i<imax, jmin<j<jmax in a specified range is determined as the correlation value, and the deviation (i′,j′) for giving the minimum value of this value is detected, and it is obtained as the vector Vi (i=1 to 4) in each region.

Figure 29:
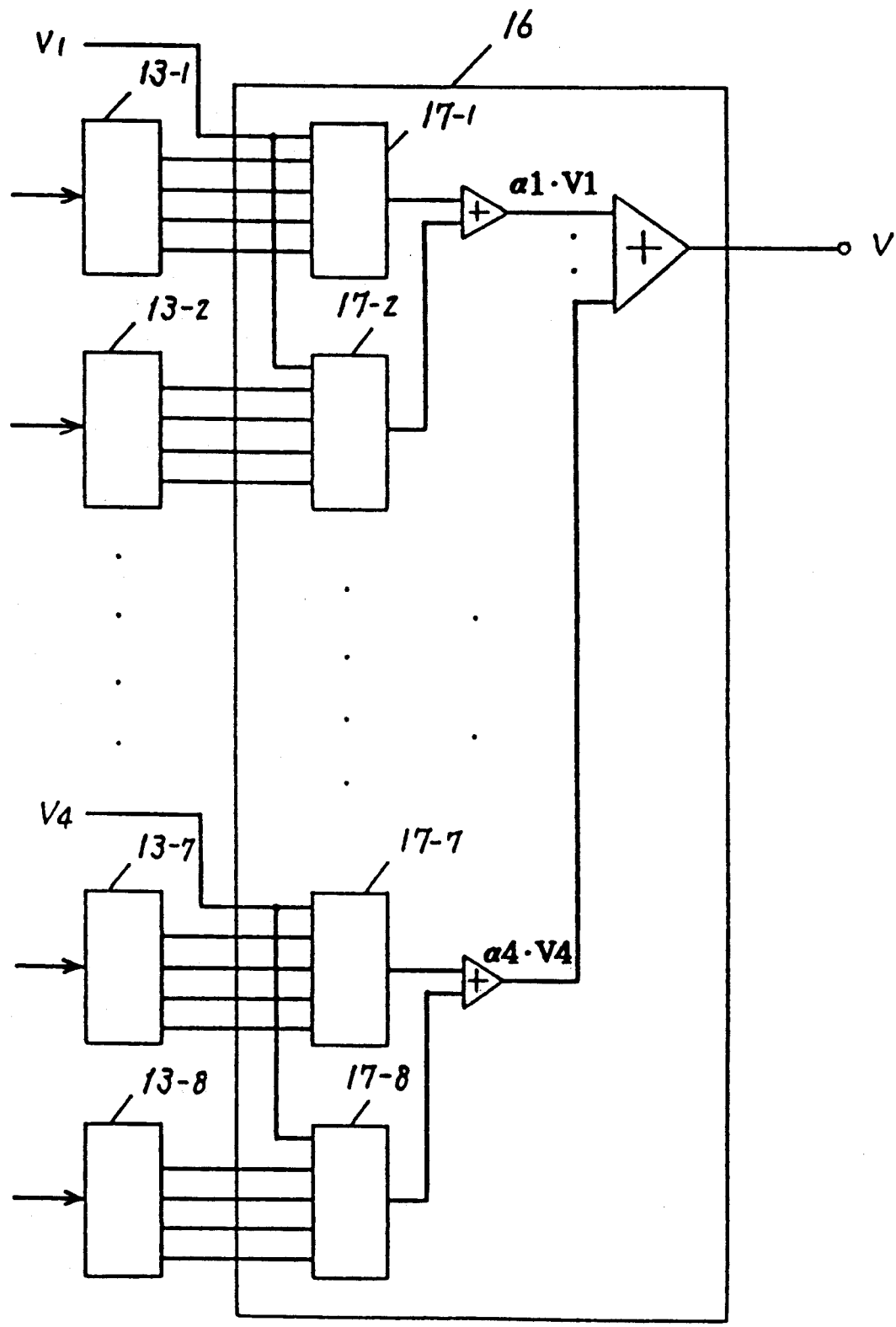
FIG. 29 is a detailed structural diagram of the motion vector determining means in the ninth embodiment of the present invention.
Figure 30:
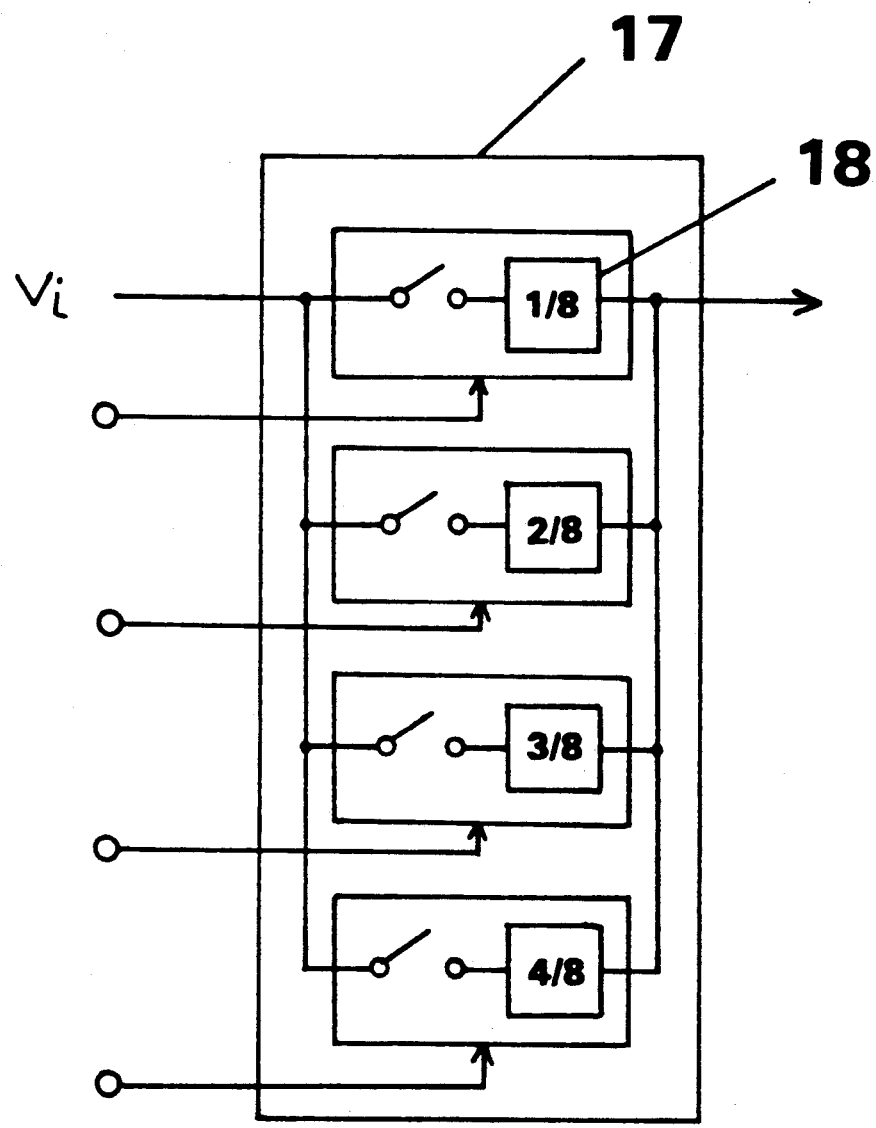
FIG. 30 is a detailed structural diagram of vector weighting means 17 in the ninth embodiment of the present invention.

In the motion vector determining means 16, the motion vector V of the screen is determined from the vector Vi of each region and the binary judgment value of {0, 1} in each divided judgment interval. FIG. 29 shows a detailed constitution of the motion vector determining means 16. The motion vector determining means 16 comprises weighting means 17-1 to 17-8 of the vectors in each region and an adder. A detailed configuration of the vector weighting means 17 is shown in FIG. 30. The vector weighting means 17 consists of attenuator 18 and switching element. The weighting means 17 receives, besides the vector Vi in each region, the binary judgment value of {0, 1} in each judgment divided interval from the judging means 13, and the switching element receiving the judgment value of 1 is turned on. In consequence, the damping factor of the attenuator connected to the switching element which is turned on is multiplied by the vector V, and the product is delivered from the weighting means 17. The vector Vi in each region is multiplied by the damping factor in the above method by the two weighting means as shown in FIG. 29, and added up in the adder. The output after addition becomes the vector Vi weighted by the sum of the damping factors multiplied by the two weighting means. Here, the weight of the vector Vi after addition corresponds to the weight coefficient αi in the seventh embodiment, and in this embodiment, too, the sum of the damping factors is expressed as αi. The vector Vi weighted with αi in each detecting region is summed up in four regions by the adder, and the final motion vector V of the screen is obtained. This is expressed in the following formula.

$$V = a1^*V1 + a2^*V2 + a3^*V3 + a4^*V4$$

This equation is exactly the same as the formula of determining the vector V in the seventh embodiment.

Thus, in the motion vector detecting device of the embodiment, the binary judgment value of {0, 1} is determined in each judgment interval divided corresponding to each one of plural sets of reliability judgment information in each detecting region, and the weight coefficient of the vector in each detecting region is determined by the damping factor corresponding to the interval in which the judgment is 1. From this weight factor and the vector in each detecting region, the motion vector of the screen is finally determined. As a result, the ambiguity of the threshold level is expressed by the binary judgment of 0, 1 in each divided judgment interval, and the motion vector may be determined by reducing the weight in the region with ambiguous result of judgment.

Figure 31:
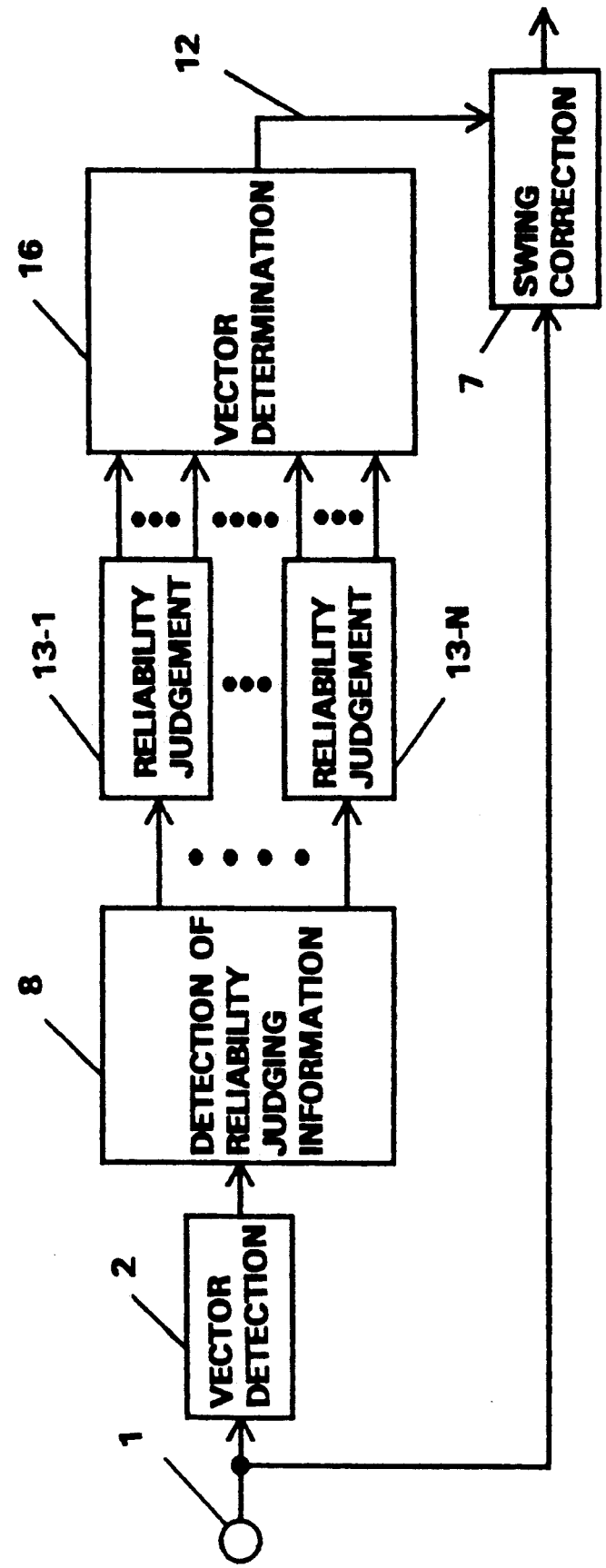
FIG. 31 is a block diagram of a swing correcting device in a tenth embodiment of the present invention.

FIG. 31 is a block diagram of a swing correcting device in a tenth embodiment of the present invention. Those parts the same in FIG. 14 and FIG. 28 are identified with the same reference numbers and are not explained herein.

The blocks of the image motion vector detecting device of the tenth embodiment are the same in operation as the ninth embodiment, and its explanation is omitted.

A swing correcting means 7, when receiving an image with large fluctuation as indicated by 226, 227 in FIG. 5, moves the screen of the image parallel from 229 to 228 in a direction 231 of correcting the motion on the basis of the motion vector 230 entered from the motion vector determining means 16, with respect to input image signals in the (n−1)-th field 226, the n-field 227, and enlarges or manipulates the screen by interpolation or the like, thereby delivering image signals 232, 233 in a size of one screen small in fluctuation.

Thus, in this embodiment, in each detecting region, the binary judgment value of {1, 2} is obtained in each judgment interval divided with respect to each one of plural sets of reliability judgment information, and the weight coefficient of the vector in each detecting region is determined by the damping factor corresponding to the interval in which the judgment is 1. From this weight coefficient and the vector in each detecting region, the motion vector of the screen is finally determined. As a result, by the binary judgment of {0, 1} in each divided judgment interval, the ambiguity of the threshold level is expressed, and the motion vector may be determined by reducing the weight in the region with ambiguous result of judgment and, even if a large object occupying the majority or whole of the screen passes the screen, the malfunction of correction of the screen in the wrong direction from the direction intended by the operator due to interruption of the correction is avoided. Meanwhile, in the ninth and tenth embodiments, the number of detecting regions in the screen is four, but it may be also a different number.

Figure 1:
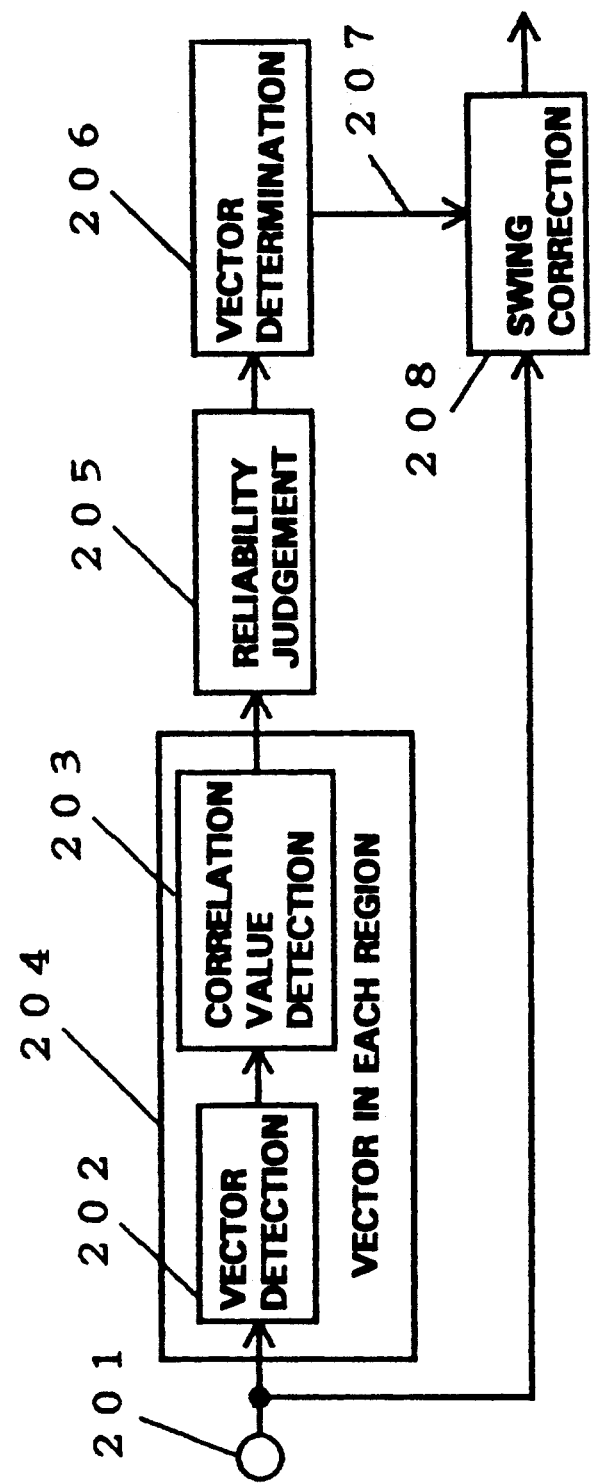
FIG. 1 is a block diagram of a swing correction device applying a conventional image motion vector detecting device.
Figure 32:
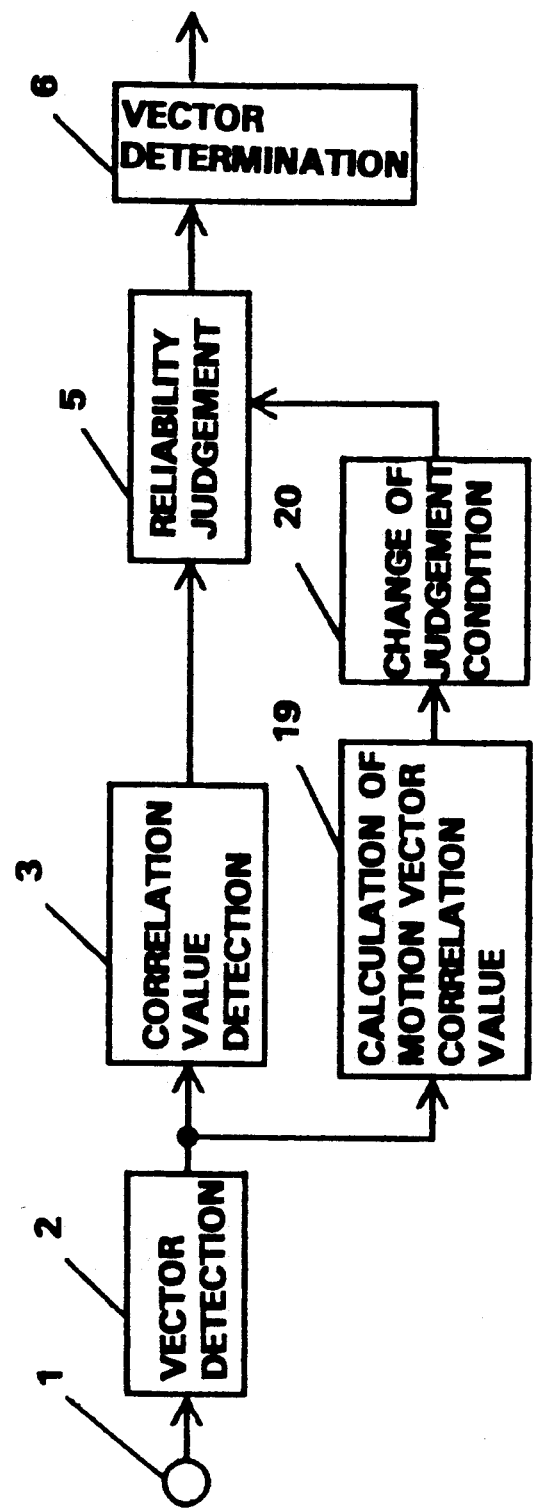
FIG. 32 is a block diagram of an image motion vector detecting device in an eleventh embodiment of the present invention.

The motion vector detecting device in an eleventh embodiment of the present invention is described below. The configuration of the motion vector detecting device of the eleventh embodiment is shown in FIG. 32. This embodiment is based on the conventional motion vector detecting device, and those parts the same as in the prior art in FIG. 1 are identified with the same reference numbers, and explanations are omitted. What is different from the prior art is that the motion vector correlation value calculating means 19 and judgement condition varying means 20 are provided as shown in FIG. 32.

In the image motion vector detecting device of the eleventh embodiment, preliminarily as indicated by 209, 210, 211, 222 in FIG. 2, four vector detecting regions are determined in the screen, and the vector Vi (i=1 to 4) of each region is determined in the vector detecting circuit 2. In the correlation value calculating means 19 of motion vectors, the correlation value C between motion vectors in the detecting regions is determined in the following equation.

$$C = \sum_{i=1}^{4} \sum_{j=1}^{4} |Vi - Vj|$$

In the judgment condition varying means 20, when the correlation value C of the motion vector is less than the specified value, the value of the threshold level Ref of the judgment condition in the comparator 220 shown in FIG. 3 is changed into the direction of making the judgment condition less severe. Besides, it may be also considered to change the comparators by the correlation value C by preparing plural comparators differing in the threshold level of the judgement condition. Meanwhile, the number of changes of the judgment condition by the correlation value is not limited to two.

In the embodiment, incidentally, if the motion vectors in the detecting regions are correlated, the judgment condition of the reliability is made less severe. That is, the correlation between motion vectors in the detecting region, means that the entire screen is moving in a same direction, and it is less possible that it is due to the motion of the subject or the like, and it may be all right if the judgment condition is made less severe.

Figure 33:
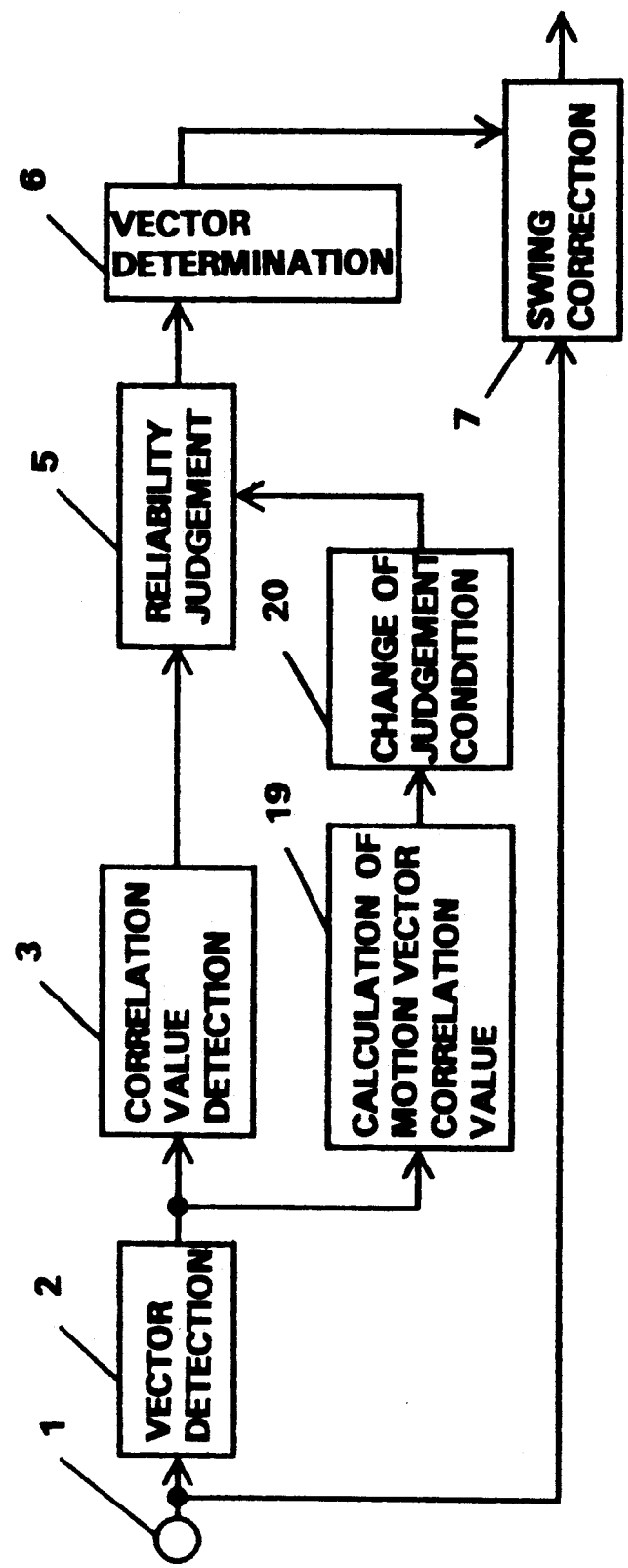
FIG. 33 is a block diagram of a swing correcting device in a twelfth embodiment of the present invention.

FIG. 33 is a block diagram of a swing correcting device in a twelfth embodiment of the present invention. Those parts the same in FIG. 14 and FIG. 32 are identified with the same reference numbers, and explanations are omitted.

In the twelfth embodiment, the block of the image motion vector detecting device is the same in operation as the eleventh embodiment, and its explanation is omitted. The operation of the swing correcting means is also the same as in the second and fourth embodiments, and the explanation is omitted. In the eleventh and twelfth embodiments, the number of detecting regions in the screen is four, but this is not limitative.

Figure 34:
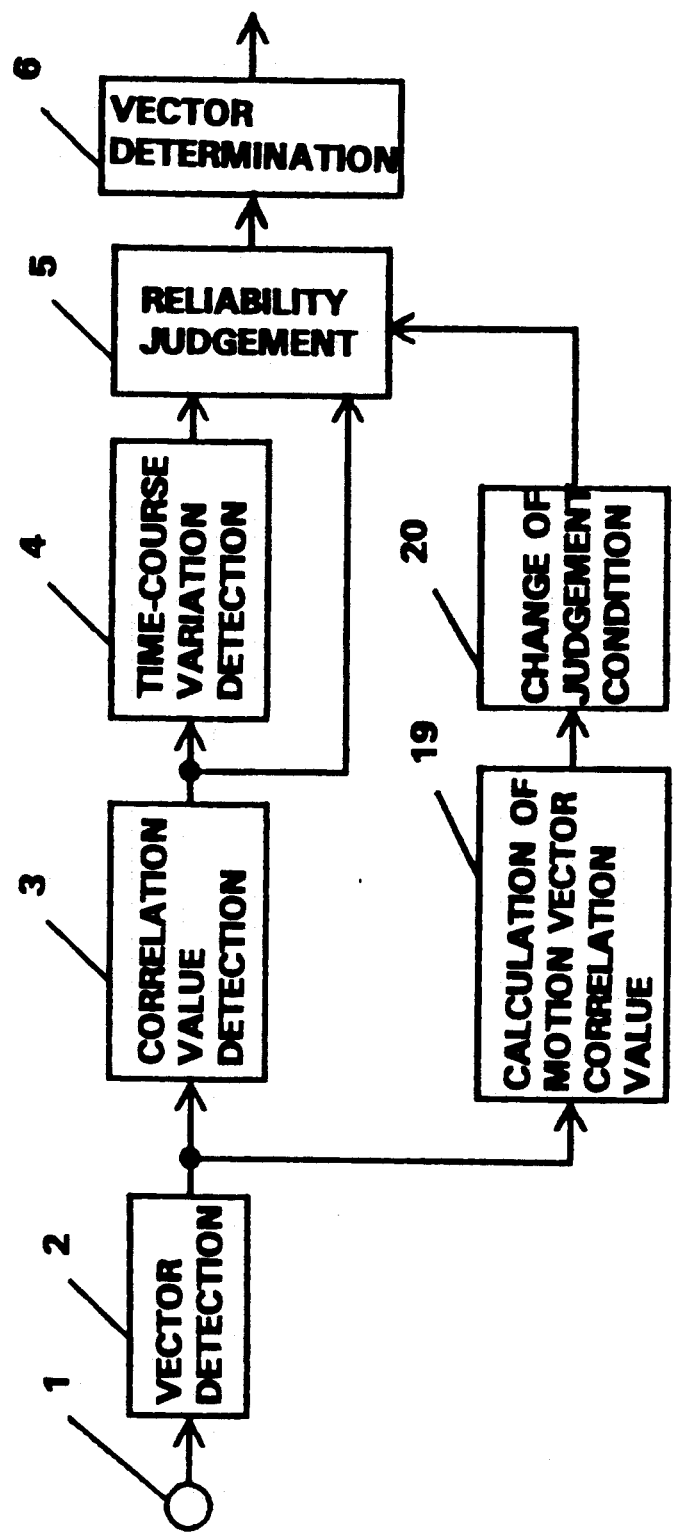
FIG. 34 is a block diagram of an image motion vector detecting device in a thirteenth embodiment of the present invention.

The motion vector detecting device of the thirteenth embodiment of the present invention is explained below. The configuration of the motion vector detecting device of the thirteenth embodiment is shown in FIG. 34. This embodiment is based on the motion vector detecting device in the first embodiment, and those parts the same as in the configuration of the first embodiment in FIG. 11 are identified with the same reference numbers, and the explanations are omitted. What is different from the first embodiment is that the motion vector correlation value calculating means 19 and the judgment condition varying means 20 are disposed as shown in FIG. 34.

In the image motion detecting device of the thirteenth embodiment, the operation of the motion vector correlation calculating means 19 and the judgment condition varying means is the same as explained in the eleventh embodiment of FIG. 32.

Figure 35:
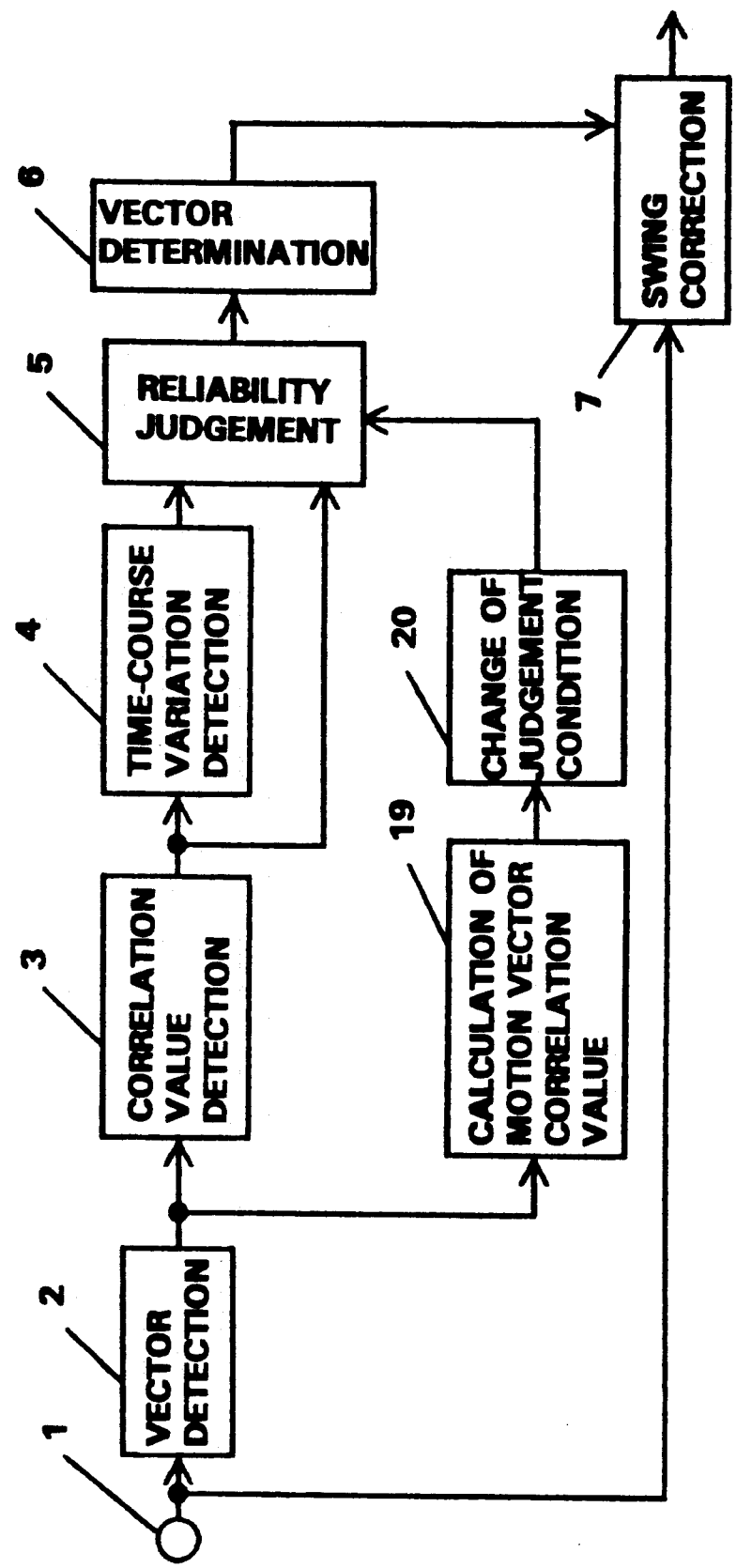
FIG. 35 is a block diagram of a swing correcting device in a fourteenth embodiment of the present invention.

Next, a block diagram of a swing correcting device in a fourteenth embodiment of the present invention is shown in FIG. 35. Those parts the same in FIG. 14 and FIG. 34 are identified with the same reference numbers and explanation are omitted.

In the fourteenth embodiment, the block of the image motion vector detecting device is the same in operation as the thirteenth embodiment, and its explanation is omitted. The operation of the swing correcting means is also the same as explained in the fourth embodiment, and the explanation is omitted. In the thirteenth and fourteenth embodiments, the number of detecting regions in screen is four, but this is not limitative.

Figure 36:
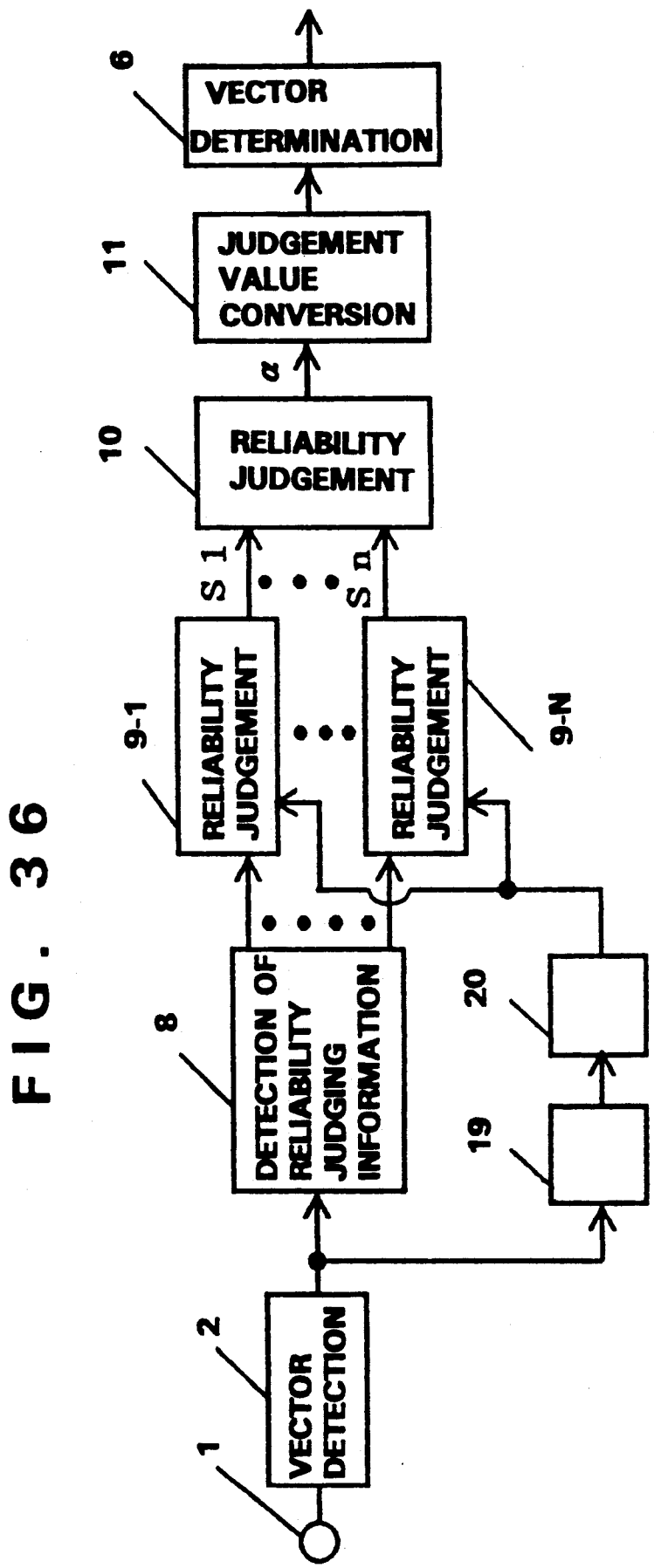
FIG. 36 is a block diagram of an image motion vector detecting device in a fifteenth embodiment of the present invention.

Next, the motion vector detecting device in a fifteenth embodiment of the present invention is explained. The configuration of the motion vector detecting device of the fifteenth embodiment is shown in FIG. 36. This embodiment is based on the motion vector detecting device of the third embodiment, and those parts the same as in the configuration of the third embodiment in FIG. 15 are identified with the same reference numbers and are not explained herein. What is different from the third embodiment is that the motion vector correlation calculating means 19 and judgment condition varying means 20 are disposed as shown in FIG. 36.

Figure 37:
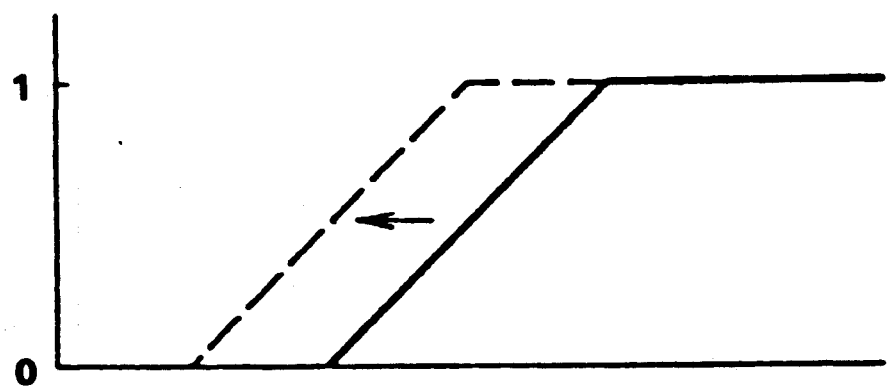
FIG. 37 is a diagram for explaining a method for changing the judging condition.

In the image motion vector detecting device of the fifteenth embodiment, the operation of the motion vector correlation calculating means 19 is the same as explained in the eleventh embodiment. The judgment condition varying means 20 changes the function of the judgment value as shown in FIG. 37 so that the judgment condition may be made less severe when the correlation value C of the motion vector is less than the specified value. In FIG. 37, the function of the judgment value is moved parallel, but this is not limitative, and the shape of the function may be varied. Or, it may be also considered to prepare two judging means different in the function of the judgment value and to change the judging means depending on the correlation value C. Meanwhile, the number of changes of judgment condition by the correlation value is not limited to two.

Figure 38:
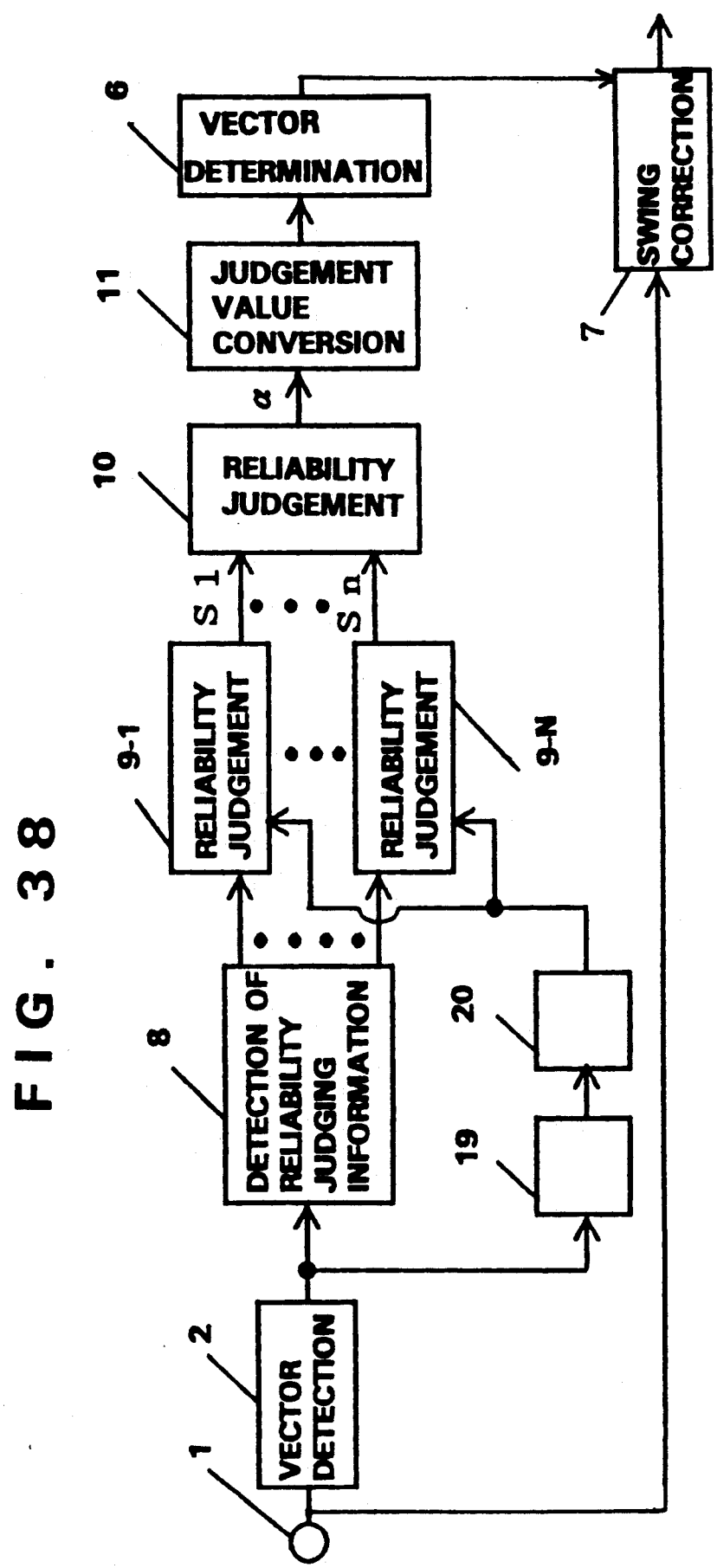
FIG. 38 is a block diagram of a swing correcting device in a sixteenth embodiment of the present invention.

FIG. 38 is a block diagram of a swing correcting device in a sixteenth embodiment of the present invention. Those parts the same in FIG. 14 and FIG. 36 are identified with the same reference numbers, and explanations are omitted.

In the sixteenth embodiment, the block of the image motion vector detecting device is the same in action as the fifteenth embodiment, and its explanation is omitted. The operation of the swing correcting means is the same as explained in the second and fourth embodiments, and its explanation is omitted. In the fifteenth and sixteenth embodiments, the number of detecting regions in the screen is four, but it may be also another number.

Figure 39:
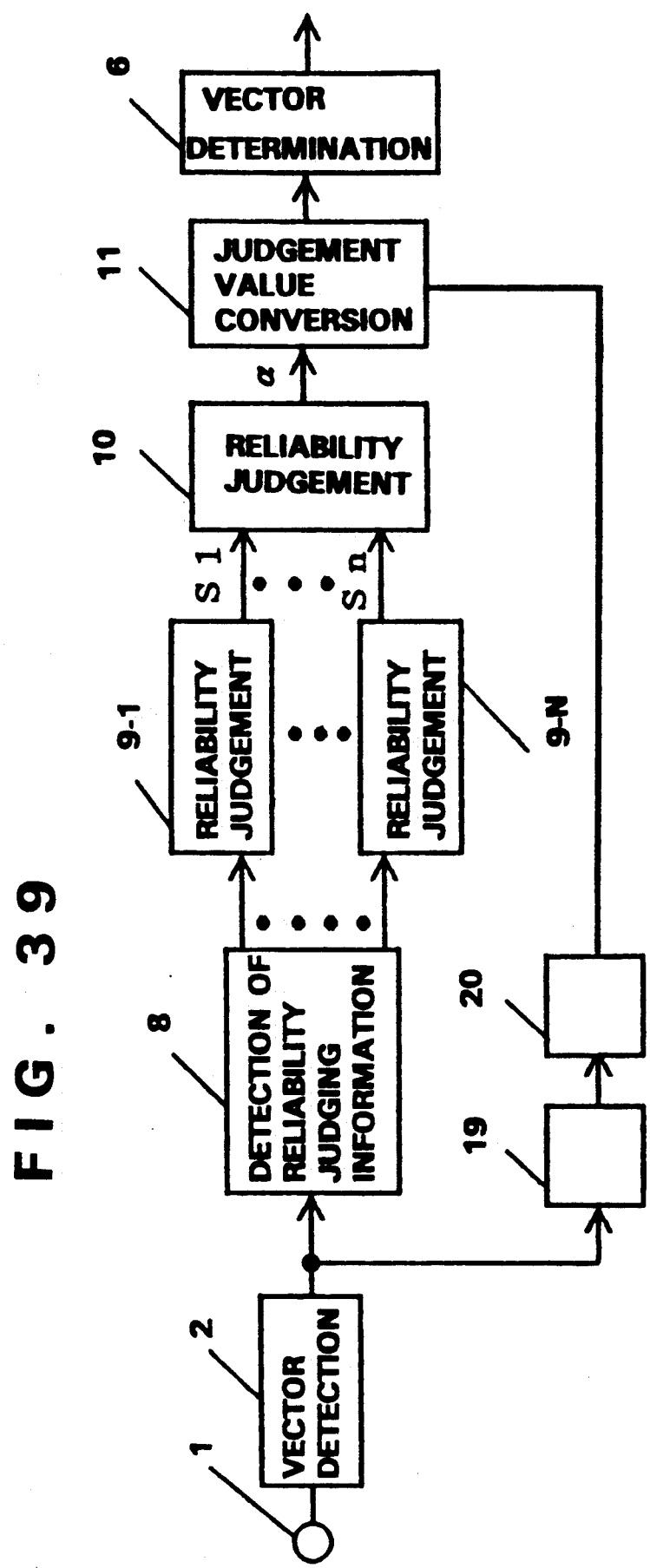
FIG. 39 is a block diagram of an image motion vector detecting device in a seventeenth embodiment of the present invention.

Next, the motion vector detecting device of the seventeenth embodiment of the present invention is described below. The configuration of the motion vector detecting device of the seventeenth embodiment is shown in FIG. 39. This embodiment is based on the motion vector detecting device of the third embodiment, and those parts the same as in the configuration of the third embodiment in FIG. 15 are identified with the same reference numbers and the explanations are omitted. What is different from the third embodiment is that the motion vector correlation value calculating means 19 and judgment condition varying means 20 are disposed as shown in FIG. 39.

In the image motion vector detecting means of the seventeenth embodiment, the operation of the motion vector correlation value calculating means 19 is the same as explained in the eleventh embodiment. The judgment condition varying means 20 changes the conversion level of the judgment value varying means 11 for comparing the specified conversion level with the ternary or higher judgment value having the value in interval [0, 1] obtained by the second judging means 10, so that the judgment condition may be made less severe when the correlation value C of the motion vector is less than the specified value. Or it may be also possible to prepare plural judgment value converting means differing in the conversion level, and change over the judgment value converting means depending on the correlation value C. The number of changes of the judgment conditions by the correlation value is not limited to two alone.

Figure 40:
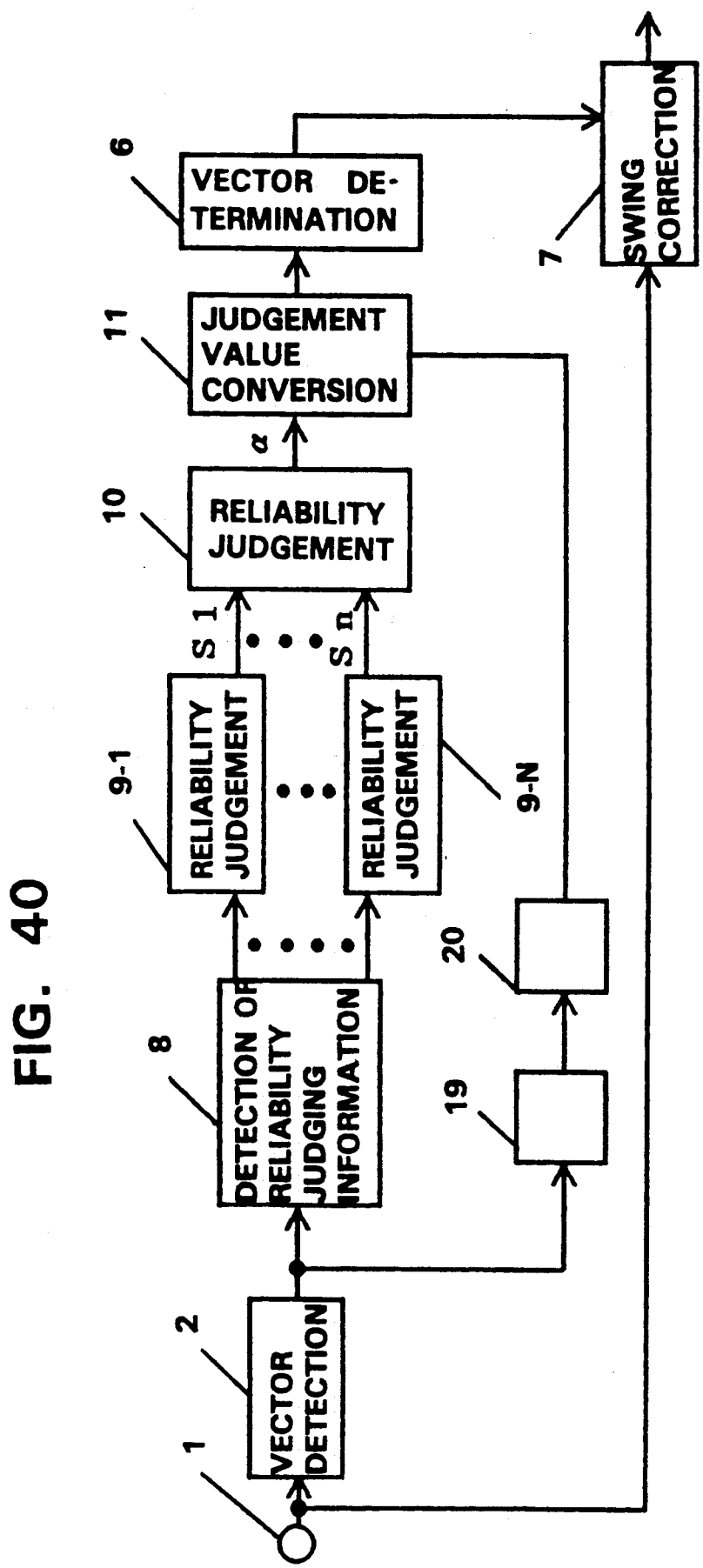
FIG. 40 is a block diagram of a swing correcting device in an eighteenth embodiment of the present invention.

FIG. 40 is a block diagram of a swing correction device in an eighteenth embodiment of the invention. Those parts the same as in FIG. 14 and FIG. 30 are identified with same reference numbers, and are not explained herein.

In the image motion vector detecting device of the eighteenth embodiment, the operation is the same as in the seventeenth embodiment, and its explanation is omitted. The operation of the swing correcting means is also the same as explained in the second and fourth embodiments, and its explanation is omitted. In the seventeenth and eighteenth embodiments, the number of detecting regions in the screen may be either four or another number.

Figure 41:
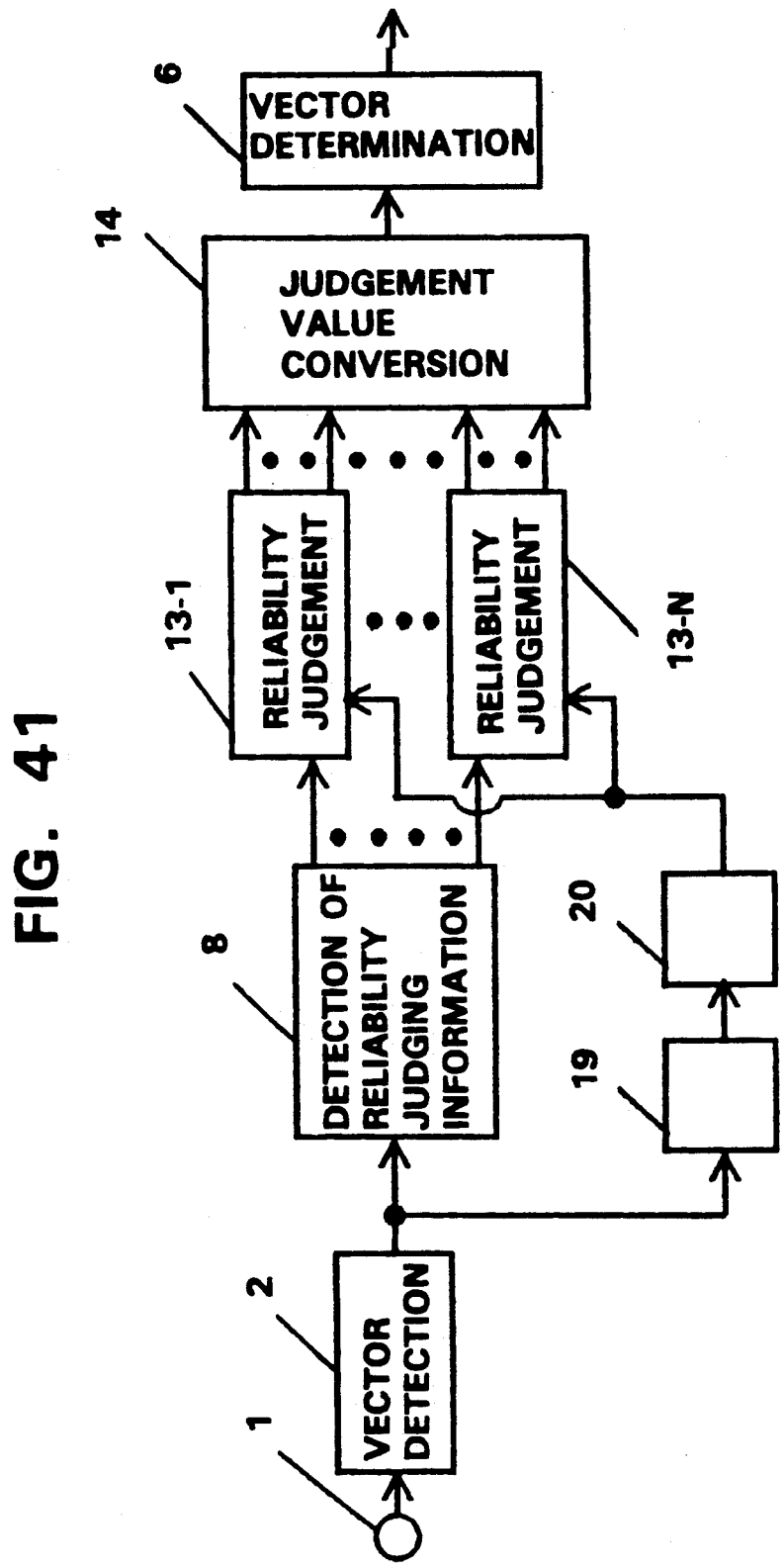
FIG. 41 is a block diagram of an image motion vector detecting device in a nineteenth embodiment of the present invention.

Next, the motion vector detecting device of a nineteenth embodiment of the invention is explained. The configuration of the motion vector detecting device the nineteenth embodiment is shown in FIG. 41. This embodiment is based on the motion vector detecting device of the fifth embodiment, and the parts the same as in the configuration of the fifth embodiment in FIG. 22 are identified with the same reference numbers, and their explanation is omitted. What is different from the fifth embodiment is that the correlation value calculating means 19 of the motion vector and judgment condition varying means 20 are disposed as shown in FIG. 41.

In the image motion vector detecting device of the nineteenth embodiment, the operation of the correlation value calculating means 19 of the motion vector is same as explained in the eleventh embodiment. The judgment condition varying means 20 changes to make the judgment condition of the judging means 13 less severe when the correlation vector C of the motion vector is less than a specific value. That is, the judgment intervals from p to s shown in FIG. 24 are moved to the less severe direction of the judging condition. It may be also possible to prepare plural judging means differing in the judging intervals, and change over the judging means depending on the correlation value C. The number of changes of the judging condition by the correlation value is not limited to two.

Figure 42:
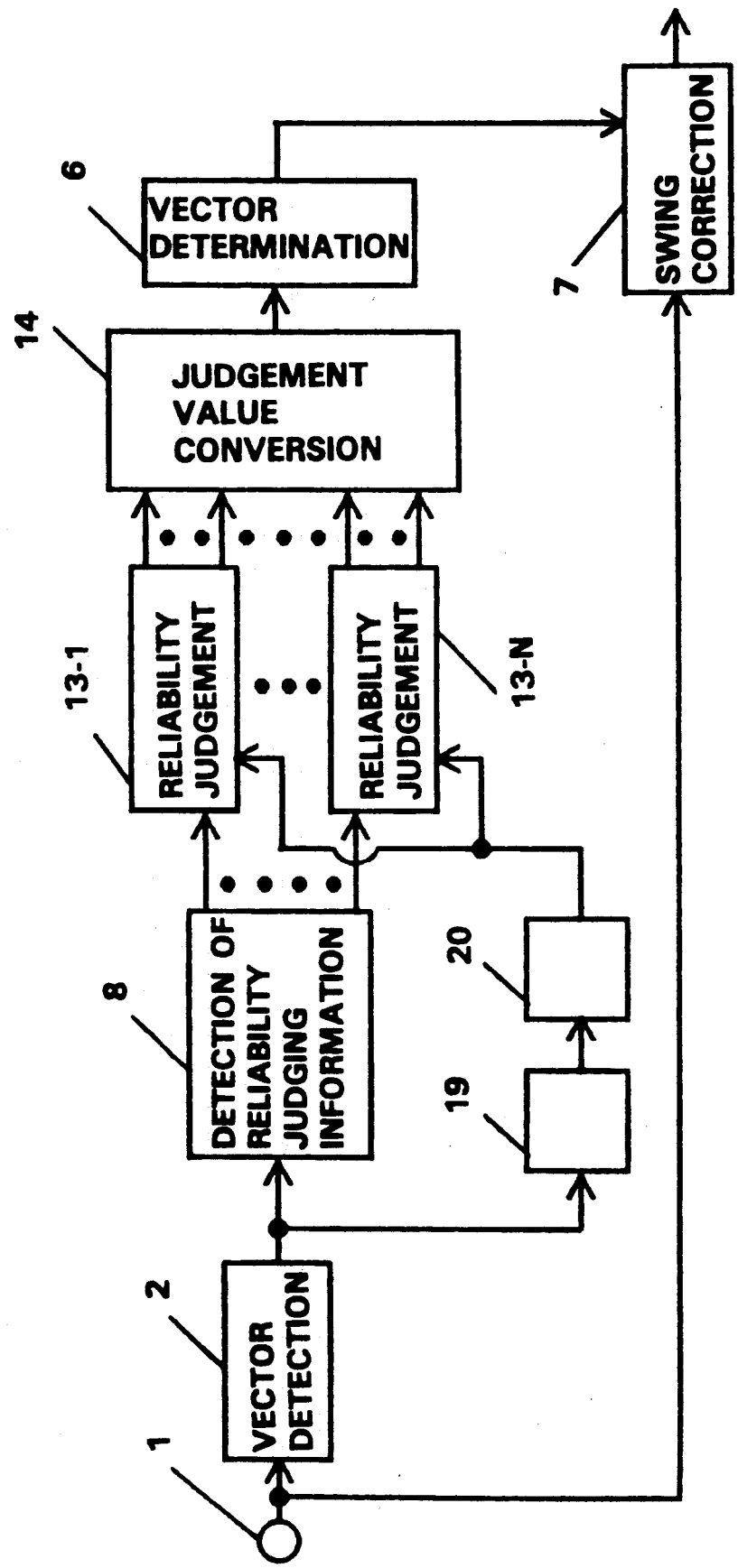
FIG. 42 is a block diagram of a swing correcting device in a twentieth embodiment of the present invention.

FIG. 42 is a block diagram of a swing correcting device in a twentieth embodiment of the invention. Those parts the same in FIG. 14 and FIG. 41 are identified with same reference numbers, and the explanation is omitted.

The blocks of the image motion vector detecting device of the twentieth embodiment are the same in operation as the nineteenth embodiment, and its explanation is omitted. The operation of the swing correcting means is also the same as in the second and fourth embodiments, and the explanation is omitted. In the nineteenth and twentieth embodiments, the number of detecting regions in the screen may be either four or an other.

Figure 43:
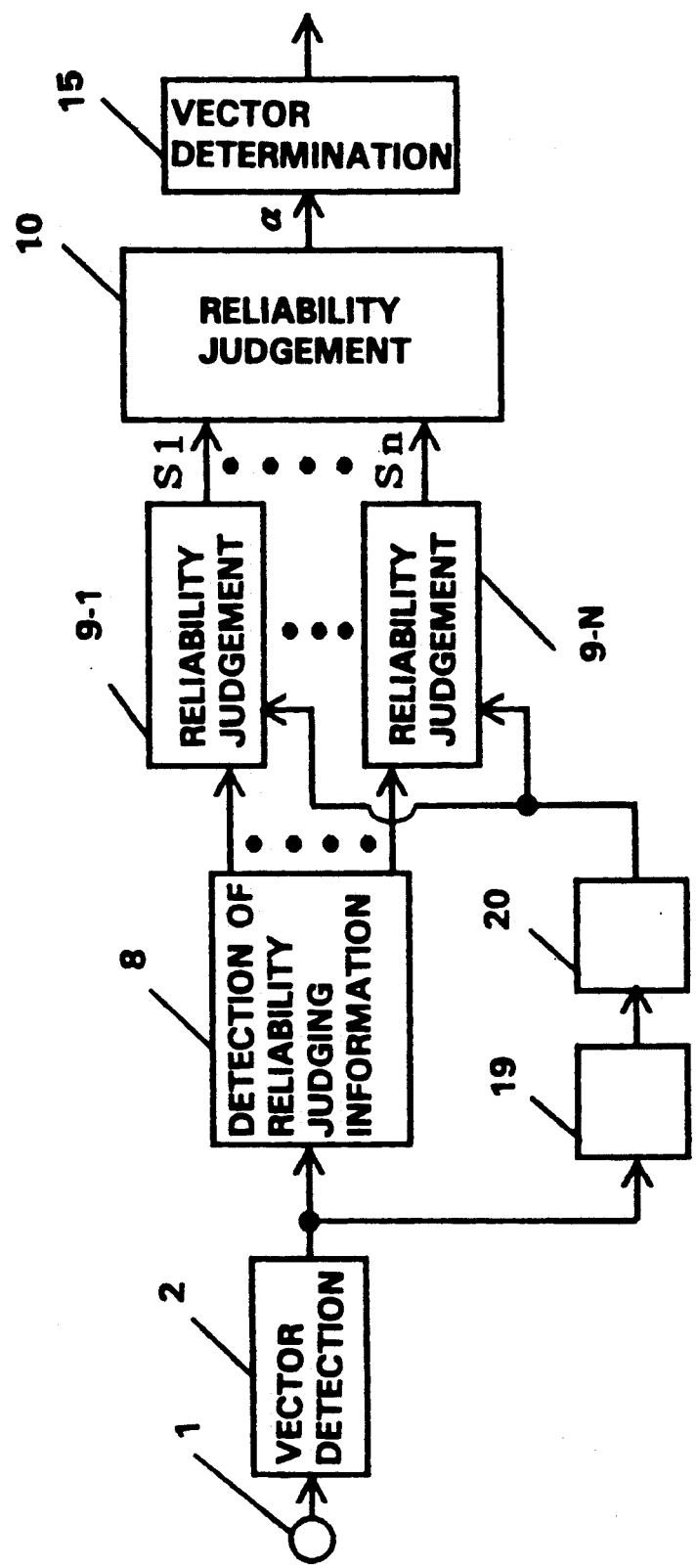
FIG. 43 is a block diagram of an image motion vector detecting device in a twenty-first embodiment of the present invention.

Next the motion vector detecting device in a twenty-first embodiment of the invention is described below. The configuration of the motion vector detecting device of the twenty-first embodiment is shown in FIG. 43. This embodiment is based on the motion vector detecting device of the seventh embodiment of the invention, and those parts the same as in the configuration of the seventh embodiment in FIG. 26 are identified with the same reference numbers, and are not explained herein. What is different from the seventh embodiment is that correlation value calculating means 19 of the motion vector and judgment condition varying means 20 are disposed as shown in FIG. 43.

In the image motion vector detecting device of the twenty-first embodiment, the operation of the correlation value calculating means 19 of motion vector is the same as explained in the eleventh embodiment. The judgment condition varying means 20 changes the function of the judgment value to make the judgment condition less severe as shown in FIG. 37 when the correlation value C of the motion vector is less than a specific value. In FIG. 37, meanwhile, the function of the judgment value is moved parallel, but it is not limitative, and the shape of the function may be varied.

Figure 44:
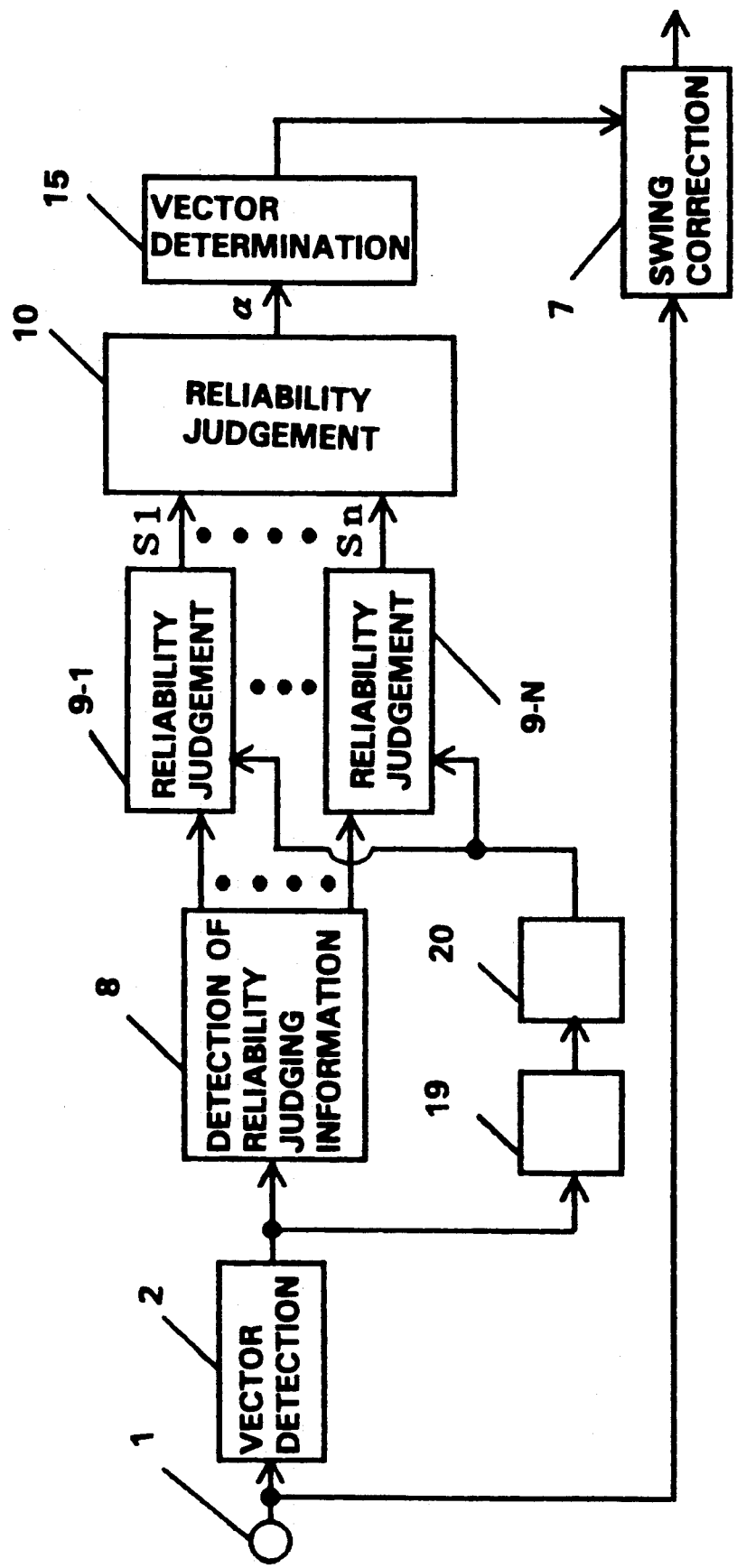
FIG. 44 is a block diagram of a swing correcting device in a twenty-second embodiment of the present invention.

Next, FIG. 44 is a block diagram of a swing correcting device in a twenty-second embodiment of the invention. Those parts the same in FIG. 14 as in FIG. 43 are identified with the same reference numbers, and are not explained herein.

The blocks of the image motion vector detecting device of the twenty-second embodiment are the same in operation as the twenty-first embodiment, and its explanation is omitted. The operation of the swing correcting means is also the same as explained in the eighth embodiment, and is not described herein. In the twenty-first and twenty-second embodiments, the number of detecting regions in the screen may be either four or an other number.

Figure 45:
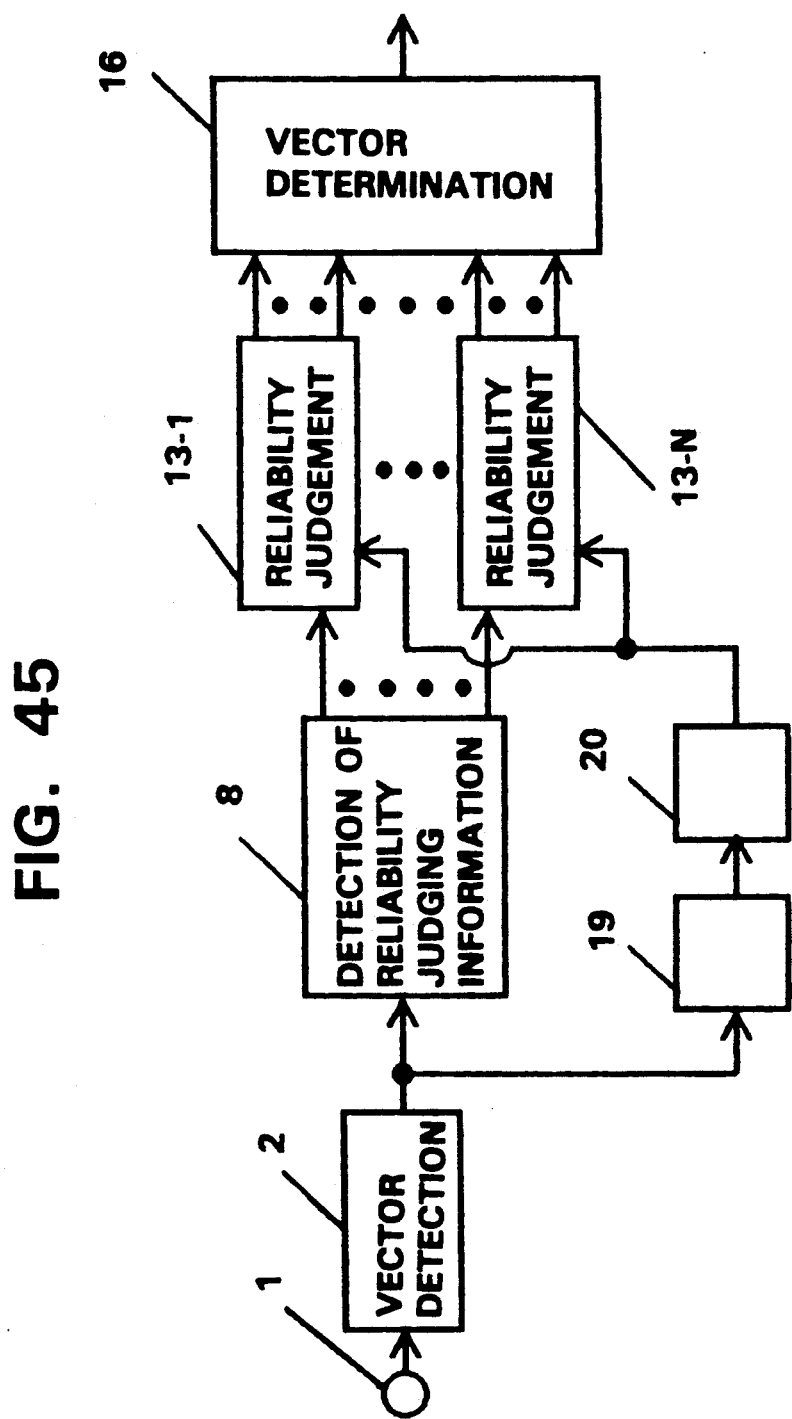
FIG. 45 is a block diagram of an image motion vector detecting device in a twenty-third embodiment of the present invention.

Next, the motion vector device of a twenty-third embodiment of the invention is described. The configuration of the motion vector detecting device of the twenty-third embodiment is shown in FIG. 45. This embodiment is based on the motion vector detecting device of the ninth embodiment of the invention, and those parts the same as in the configuration of the ninth embodiment in FIG. 28 are identified with the same reference numbers, and the explanation is omitted. What is different from the ninth embodiment is the correlation value calculating means 19 of the motion vector and judgment condition varying means 20 are disposed as shown in FIG. 45.

In the image motion vector detecting device of the twenty-third embodiment, the operation of the correlation value calculating means 19 of the motion vector is the same as explained in the eleventh embodiment. The judgment condition varying means 20 changes to make less severe the judgment condition of the judging means 13 when the correlation value C of motion vector is less than a specific value. That is, the judgment intervals from p to s in FIG. 24 are moved in the less severe direction of the judgment condition. Or it may be also possible to prepare plural judging means differing in the judgment intervals, and change over the judging means depending on the correlation value C. The number of changes of judgment condition by the correlation value is not limited to two.

Figure 46:
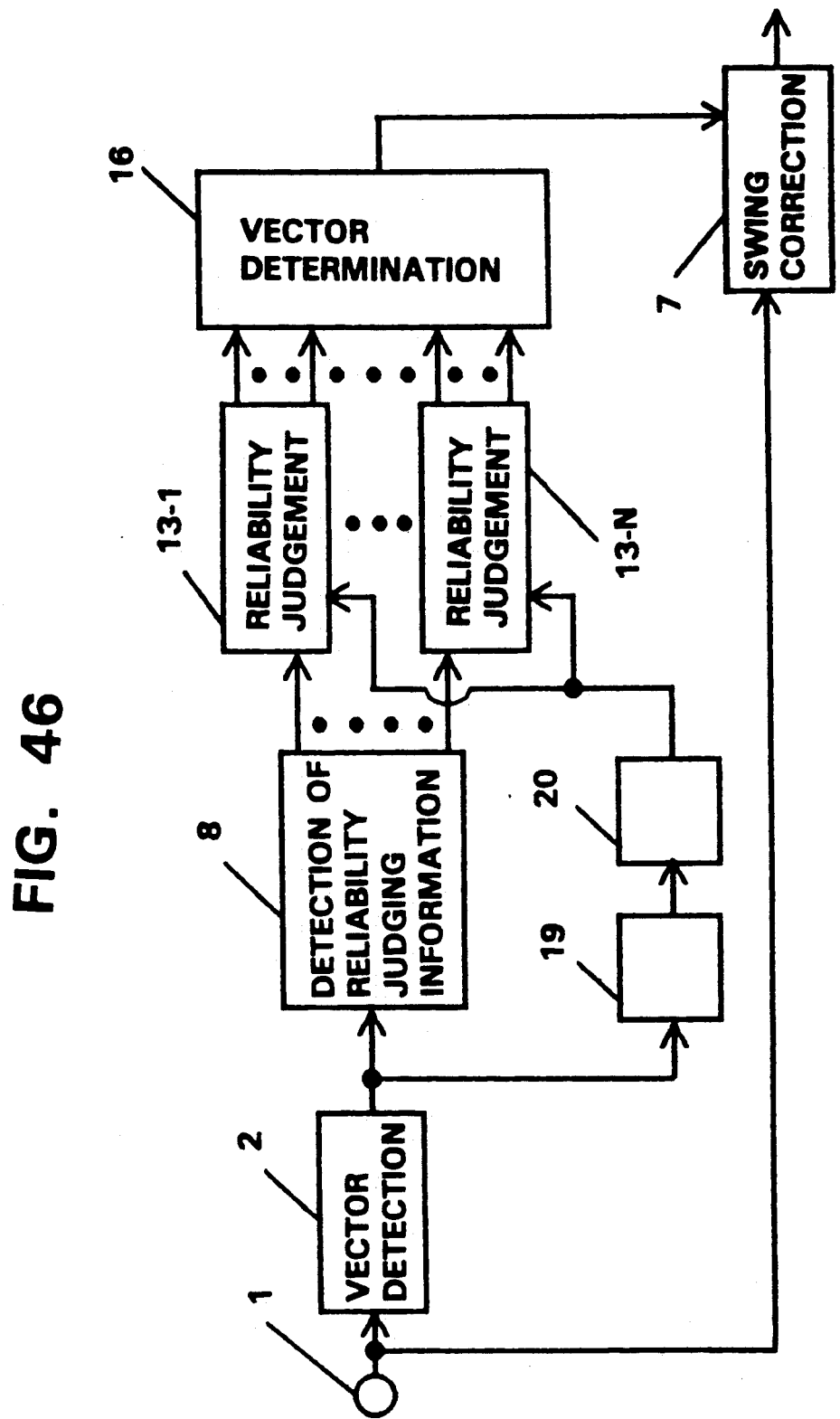
FIG. 46 is a block diagram of a swing correcting device in a twenty-fourth embodiment of the present invention.

Next, FIG. 46 is a block diagram of a swing correcting device in a twenty-fourth embodiment of the invention. Those parts the in FIG. 14 as in FIG. 45 are identified with the same reference numbers, and explanations are omitted.

The blocks of the image motion vector detecting device of the twenty-fourth embodiment are the same in operation as the twenty-third embodiment, and its explanation is omitted. The operation of the swing correcting means is also the same as explained in the tenth embodiment, and its explanation is omitted, too. In the twenty-third and twenty-fourth embodiments, the number of detecting means in the screen may be either four or an other.

Figure 47:
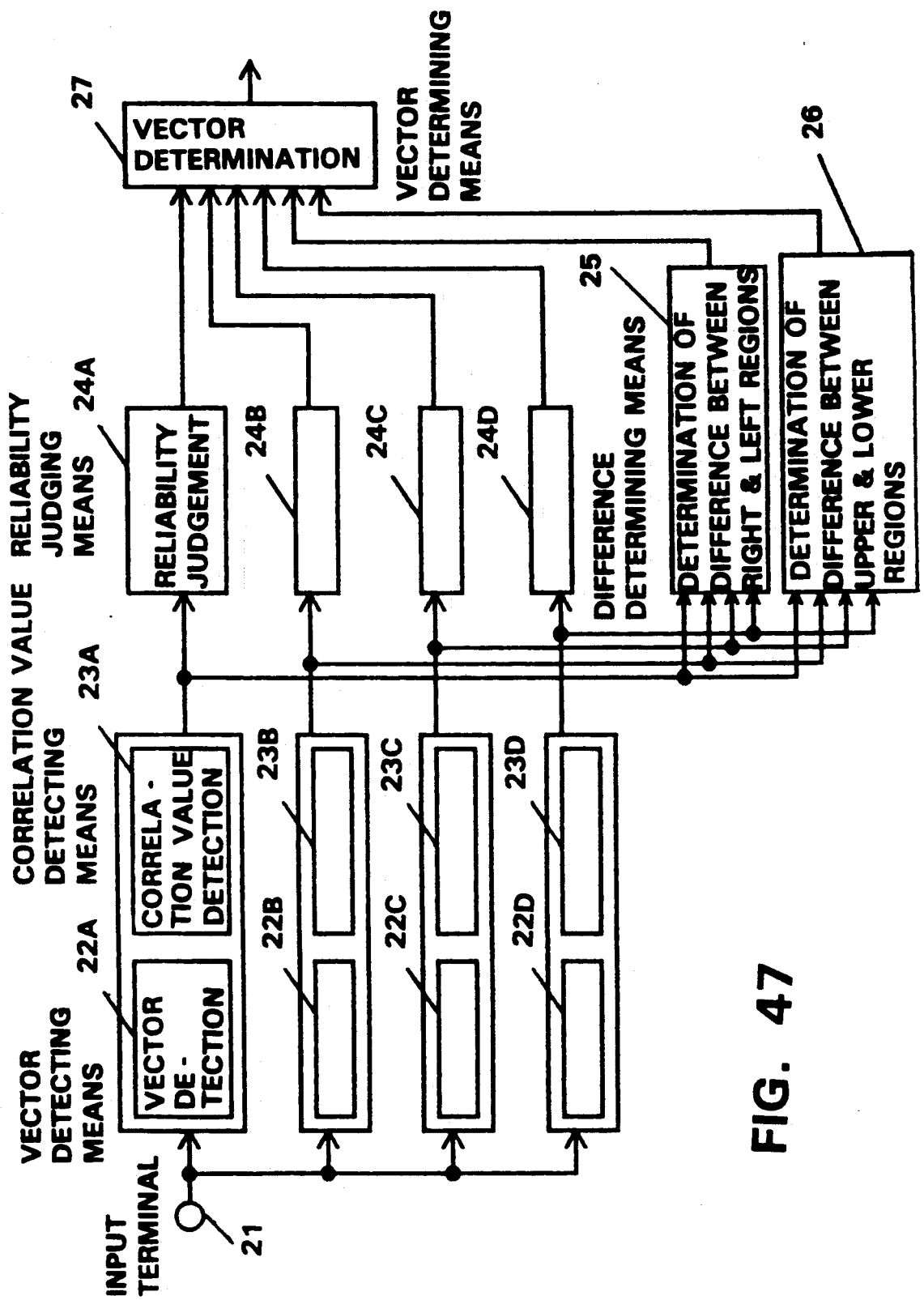
FIG. 47 is a block diagram of an image motion vector detecting device in a twenty-fifth embodiment of the present invention.

Next, FIG. 47 is a block diagram of a motion vector detecting device in a twenty-fifth embodiment of the invention. Numeral 21 is an image signal input terminal, 22a to 22d are vector detecting circuits of detecting regions, 23a to 23d are correlation value detecting parts, 24a to 24d are vector reliability judging means, 25, 26 are means for determining the difference of the correlation values, and 27 is motion vector determining means.

In the image motion vector detecting device of the twenty-fifth embodiment, first, an image signal consecutive in time for two fields or more is entered in an input terminal 21. In the screen, four vector detecting regions are preliminarily determined as indicated by 209, 210, 211, 212 in FIG. 2, and in the vector detecting circuits 2a to 2d in each detecting region, as for each detecting region between two fields, the difference $\Sigma|\Delta L|$ (i,j) of the signal at a position deviated by a specified quantity (i,j): imin<i<imax, jmin<j<jmax is determined as the correlation value, and the deviation (i',j') for giving the minimum value is detected, which is taken as the vector of each region. In the correlation value detecting parts 23a to 23d, the minimum, mean and maximum of correlation values are obtained in each detecting region. In the vector reliability judging circuit means 24a to 24d, the reliability of each region is judged by the correlation value entered from the correlation value detecting part 23a–23d, and the result of judgment and the motion vector of each region are delivered to the motion vector determining means 27. In the means 25 for determining the difference of the correlation values, the difference of the right and left regions on the screen is determined, while the difference between the upper and lower regions on the screen is obtained in the means 26. As the method for determining the difference of correlation values in the upper and lower regions or the right and left regions of the screen, either all four regions or only two regions in FIG. 2 may be used. Meanwhile, when two diagonal regions are used, the differences of the upper and lower regions, and right and left regions may be determined at the same time. The motion vector determining means 27, when the difference of the correlation values between the regions is less than a specific value, determines the intermediate value of the vectors of the regions judged to be reliable (the value positioned in the middle when arranged in the size order, or the mean of two central values in the case of an even number) as the motion vector of the entire screen, and delivers. If the difference of the correlation values between the regions is greater than a specific value, the motion vector of the entire screen is regarded as 0.

What is different from the conventional motion vector detecting device is that the motion vector of the entire screen is not determined only by the result of judgment of reliability in each detecting region, but is determined from the difference of the correlation values between regions, as well as the result of judgment of reliability in each detecting region. This point is described in greater detail below. The case of right and left regions is explained below, and the case of upper and lower regions is the same and is omitted herein.

Figure 48:
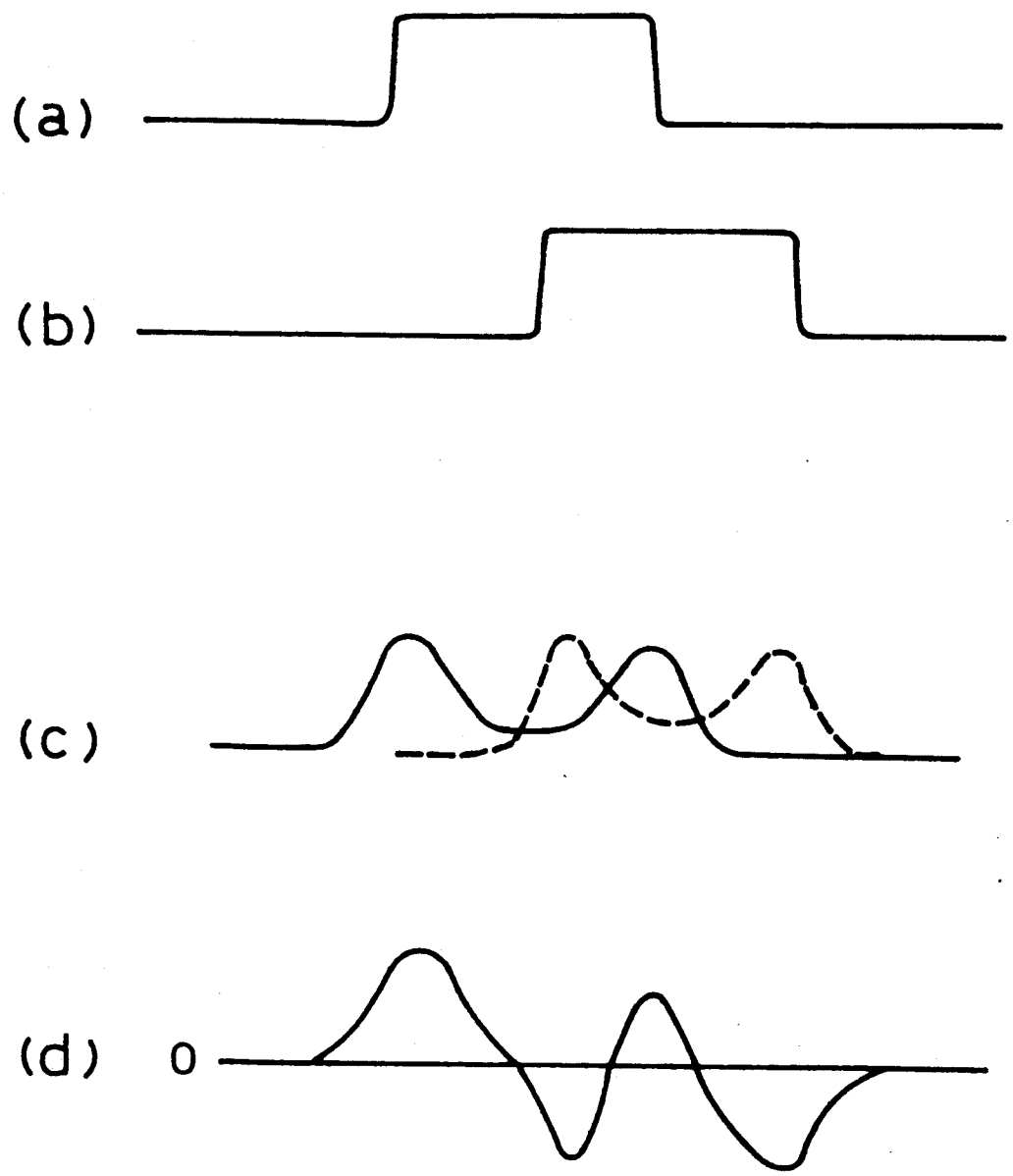
FIG. 48 is a diagram for explaining the operation of the motion vector detecting device in the twenty-fifth embodiment of the present invention.

FIG. 48 shows the motion vectors of right and left regions, correlation values, and difference of correlation values between regions when a moving object enters the screen from left to right, taking the time on the axis of abscissas. In FIG. 48, (a) denotes the motion vector of the left region, (b) is the motion vector of the right region, the solid line in (c) is the correlation value of the left region, the broken line in (c) is the correlation value of the right region, and (d) denotes the difference of correlation values of the right and left regions. The correlation value increases as the moving objects invades the detecting region, and decreases as the entire region is occupied by the moving object. When the moving object leaves the detecting region, the correlation value begins to increase again. In the reliability judging circuit means 24, the reliability is judged on the basis of the correlation value of (c) in each region, but as shown in the prior art, the moving object is often misjudged if judged in each region independently. On the other hand, in the means 25 for determining the difference of the right and left regions of the correlation value, due to the time difference of invasion of the moving object into the right and left regions, a signal as shown in (d) is obtained, and the difference signal is sent to the vector determining means 27 together with the reliability judgment result in each region. In the vector determining means 27, if the absolute value of the difference signal of the right and left regions of the correlation values becomes larger than a specific value, regardless of the result of the reliability determining means, the motion vector of the entire screen is set at 0 for a specific period. As a result, in the reliability determining means in each region, even if the moving object is misjudged, the invasion of the moving object is detected by the difference signal between regions. In this embodiment, meanwhile, the number of detecting regions in the screen is four, but it is not limitative.

Figure 49:
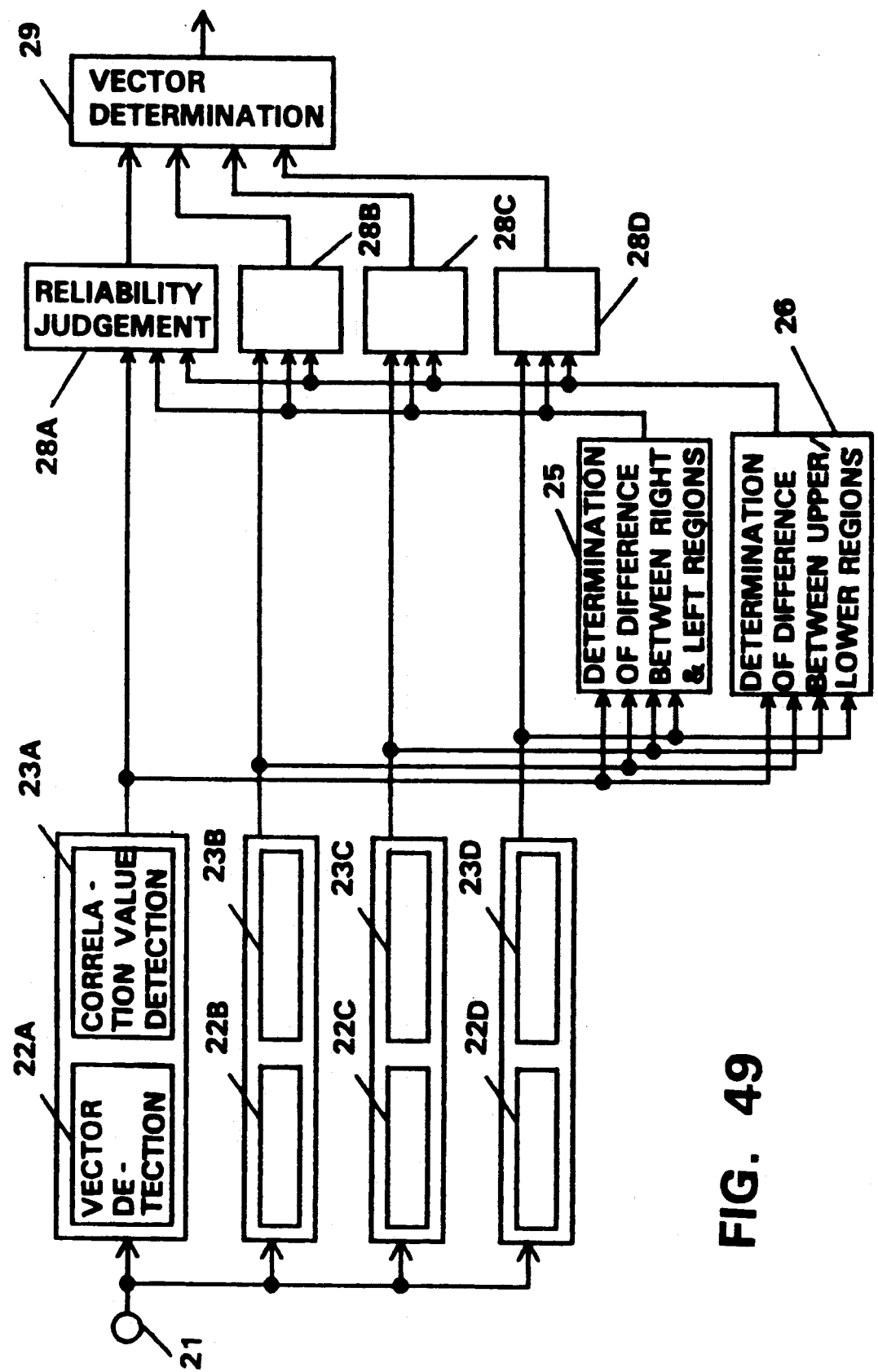
FIG. 49 is a block diagram of an image motion vector detecting device in a twenty-sixth embodiment of the present invention.

Next, the motion vector detecting device of a twenty-sixth embodiment is described below. The configuration of the motion vector detecting device of the twenty-sixth embodiment is shown in FIG. 49. Those parts the same as in FIG. 47 are identified with the same reference numbers, and are not explained. In FIG. 49, numerals 28a to 28d are vector reliability judging means, and 29 is motion vector determining means.

In the image motion vector detecting device of composed twenty-sixth embodiment, the method of leading out the vector of each region and correlation values and the method of determining the difference of correlation values between regions are the same as in the above-mentioned embodiment, and the explanation is omitted. In the vector reliability judging means 28a to 28d, the reliability of each region is judged by the correlation values entered from the correlation value detecting parts 23a to 23d, and besides by the difference of correlation values between regions entered from the means 25 for determining the difference of correlation values between right and left regions and from the means 26 for determining the difference between the upper and lower regions, and the result of this judgment and the motion vector of each region are delivered to the motion vector determining means 29. The motion vector determining means 29 determines the intermediate value of the vectors of the regions judged to be reliable (the value positioned in the middle when arranged in the size order, or the mean of two central values in the case of an even number) as the motion vector of the entire screen, and delivers.

What is different from the conventional motion vector detecting device is that the reliability of each detecting region is not judged by the correlation value only in each detecting region, but is judged by the difference in the correlation values between detecting regions as well as the correlation value in each detecting region. This point is explained in further detail below. The following explanation relates only to the case of upper and lower regions, and the case of right and left regions is the same and is omitted herein.

When a moving object enters the screen from left to right, the operation is described referring to FIG. 48. In FIGS. 48, (a) to (d) are as explained already in the twenty-fifth embodiment. Now, the difference signal of the right and left regions of the correlation values in FIG. 48(d) is obtained by subtracting the correlation value of the right region from the correlation value of the left region. As shown in this diagram, as the moving object passes on the screen, the difference signal of the correlation value fluctuates largely to both positive and negative sides. In the reliability judging means 28a, 28b (the reliability judging means of the left region), in addition to the correlation values, the difference signal of the correlation values is compared with the positive specified level, and the reliability is judged, while in the reliability judging means 28c, 28d (the reliability judging means of the right region), in addition to the correlation values, the difference signal of the correlation values is compared with the negative specified level, and the reliability is judged. In the motion vector determining means 29, as mentioned above, the intermediate value of the vectors of the regions judged to be reliable (the value positioned in the middle when arranged in the size order, or the mean of two central values in the case of an even number) is determined and delivered as the motion vector of the entire screen.

In this embodiment, thus, by using the correlation values of the regions and the difference of correlation values between regions in the reliability judgment in each region, the judging performance of the reliability for a moving object is enhanced. In this embodiment, meanwhile, the number of detecting regions in the screen is four, but it may be also another number.

Figure 50:
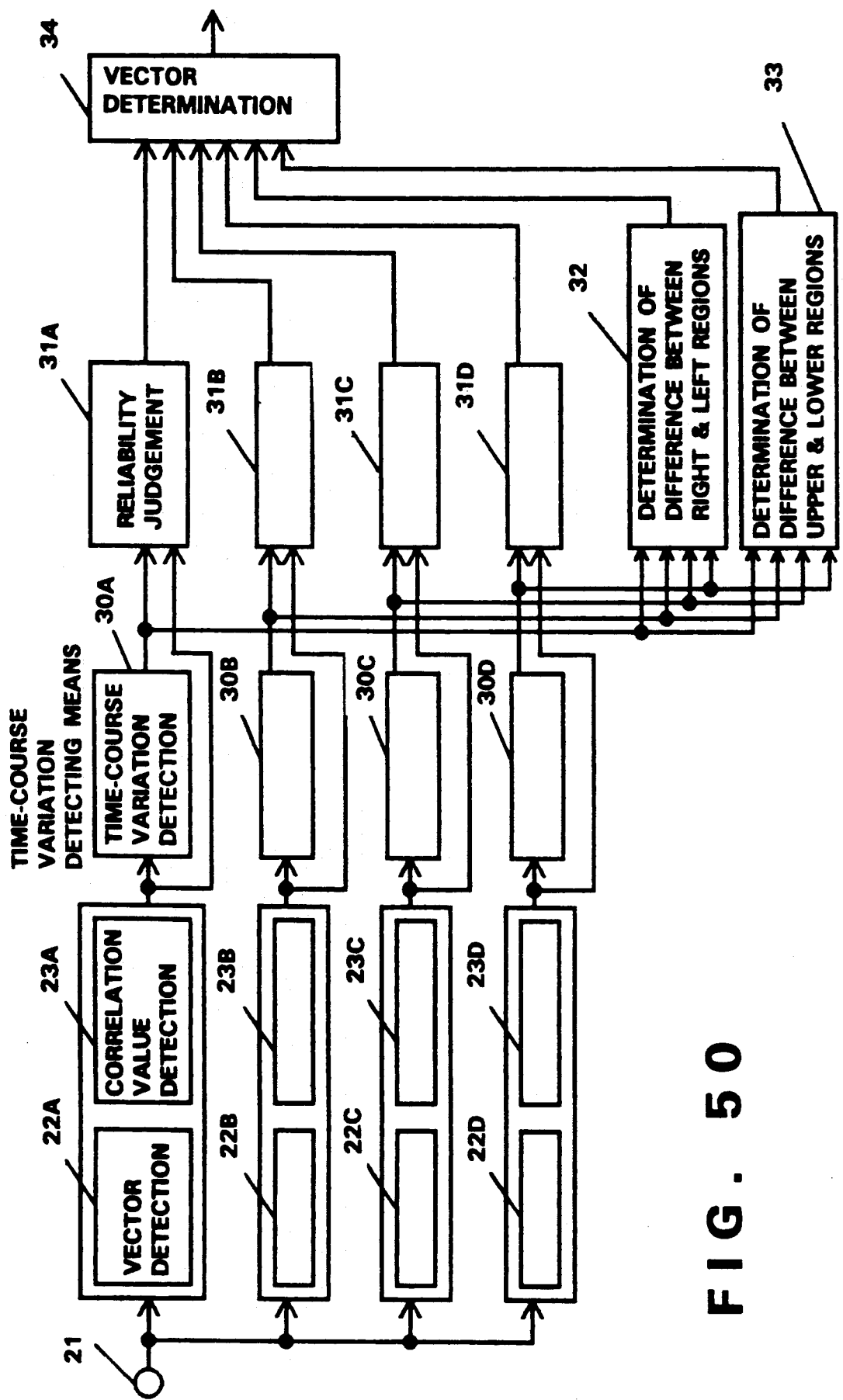
FIG. 50 is a block diagram of an image motion vector detecting device in a twenty-seventh embodiment of the present invention.

Next the motion vector detecting device of a twenty-seventh embodiment of the invention is described below. The configuration of the motion vector detecting device in the twenty-seventh embodiment is shown in FIG. 50. Those parts the same as in FIG. 47 are identified with the same reference numbers and are not explained herein. In FIG. 50, numerals 30a to 30d are time variation detecting parts of correlation values, 31a to 31d are vector reliability judging means, 32, 33 are means for determining the difference of the time variation values of correlation values, and 34 is motion vector determining means.

In the image motion vector determining device of the twenty-seventh embodiment, the method of deducing the vectors of each region and correlation values is the same as in the twenty-fifth embodiment, and its explanation is omitted. In the time variation detecting part 30 of correlation values, the time differential value or the difference value after averaging the correlation values is determined. The vector reliability judging circuit means 31 judges the reliability of each region from the correlation values entered from the correlation value detecting part 23, and from the time variation values of correlation values entered from the time variation detecting part 30 of correlation values, and delivers the result of the judgment to the motion vector determining means 34, together with the motion vector of each region. In the means 32 for determining the difference of the time variation value of correlation values, the difference as to right and left regions of the screen is determined, while the difference as to upper and lower regions of the screen is determined in the means 33. As the method of determining the difference of the time variation values of the correlation of the upper and lower or right and left regions of the screen, either all four regions, in FIG. 2 or only two regions may be used. Or when two diagonal regions and used, the differences of the upper and lower, and right and left regions may be detected at the same time. The motion vector determining means 34 determines the intermediate value of the vectors of the regions judged to be reliable (the value positioned in the middle when arranged in the size order, or the mean of two central values in the case of an even number), when the difference of the time variation values of the correlation values between regions is less than a specific value, as the motion vector of the entire screen, and delivers. When the difference of time variation values of correlation values between regions is larger than a specific value, the motion vector of the entire screen is 0.

What is different here from the conventional motion vector detecting device is that the motion vector of the entire screen is not determined only by the result of judgment of reliability in each detecting region, but by the difference of the time variation values of correlation values between regions, as well as the result of judgment of reliability in each detecting region. This point is described in further detail below. Hereunder, only the case of right and left regions is discussed, and the case of upper and lower regions is the same and its explanation is omitted.

FIG. 51 shows the motion vectors of right and left regions, time variation values of correlation values, and difference of time variation values of correlation values between regions, when a moving object enters the screen from left to right, taking the time on the axis of abscissas. In FIG. 51, (a) denotes the motion vector of the left region, (b) is the motion vector of the right region, (c) is the time variation value of correlation value of the left region, (d) is the time variation value of correlation value of the right region, and (e) denotes the difference of time variation values of correlation values between the right and left regions. When determining the difference between the regions, however, the negative portion of the time variation value of the correlation value in each region was assumed to be 0. In the reliability judging means 31, the reliability is judged in each region, on the basis of the correlation value, and the time variation value of the correlation values shown in FIG. 51(c), (d), but even when the time variation value of the correlation value is used in the reliability judgment, as explained in the prior art, the moving object may be often misjudged when judged in each region independently.

Then, in the means 32 for determining the difference of the right and left regions of the time variation values of the correlation values, owing to the time difference of the moving object entering the right and left regions, a signal as shown in (e) is obtained, and the difference signal is sent to the vector determining means 34, together with the result of judgment of reliability in each region. In the vector determining means 34, when the absolute value of the difference signal of the right and left regions of the time variation values of the correlation values exceeds a specific value, the motion vector of the entire screen is set at 0 for a specific period regardless of the result of the reliability judging means. As a result, in the reliability judging means 31a to 31d in each region, even if the moving object is misjudged, the invasion of the moving object may be detected by the difference signal between the regions. In this embodiment, the number of detecting regions in the screen is four, but it may be an other number. Besides, when determining the difference between regions, the negative portion of the time variation values of the correlation values in each region is assumed to be 0, but it is not necessarily set at 0.

Figure 52:
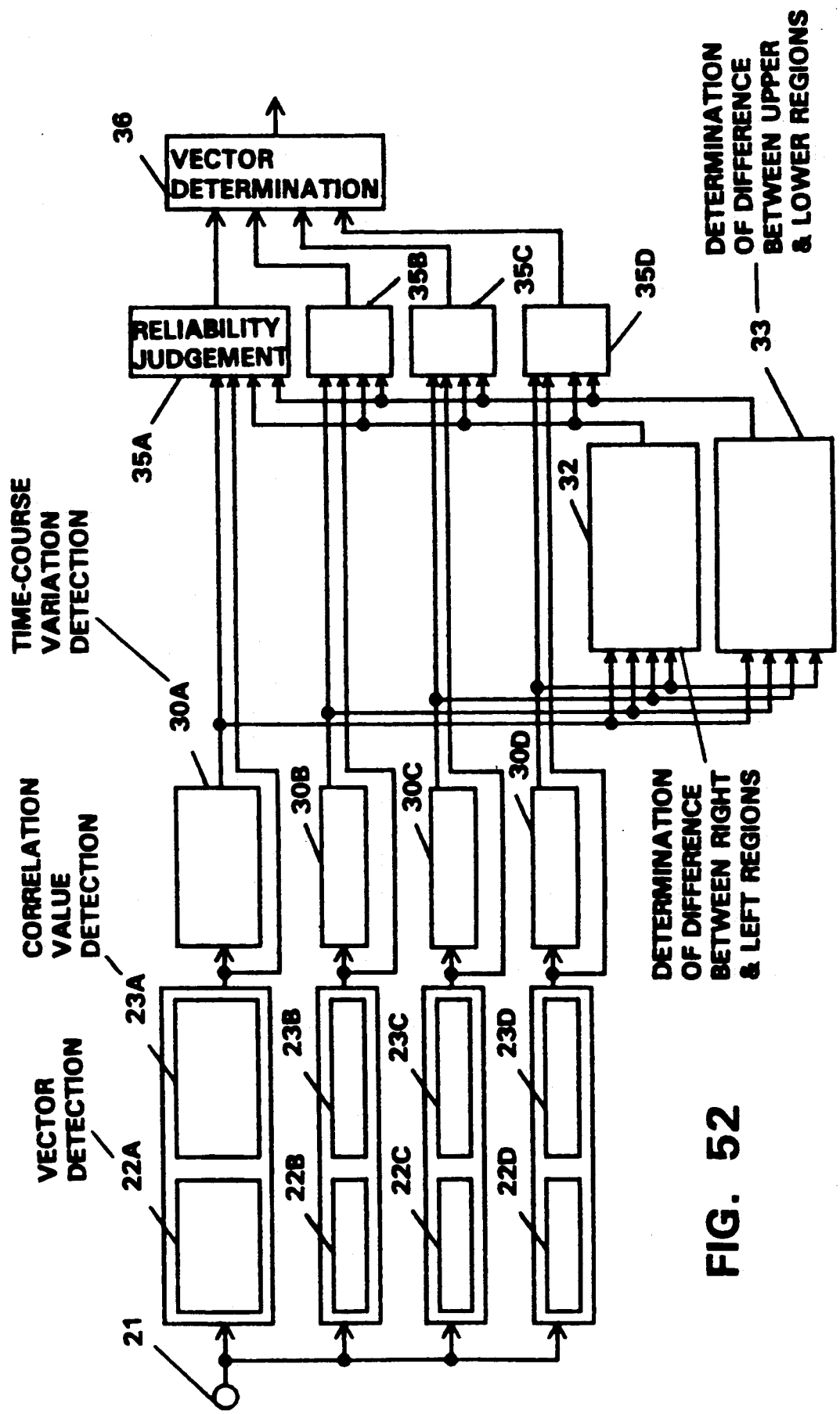
FIG. 52 is a block diagram of an image motion vector detecting device in a twenty-eighth embodiment of the present invention.

The motion vector detecting device of the twenty-eighth embodiment of the invention is described. The configuration of the motion vector detecting device of the twenty-eighth embodiment is shown in FIG. 52. Those parts the same as in FIG. 50 are identified with the same reference numbers, and explanations are omitted. In FIG. 52, numerals 35a to 35d are vector reliability judging means, and 36 is motion vector determining means.

In the image motion vector detecting device of the twenty-eighth embodiment, the method of deducing the vectors of each region and correlation values and the method of determining the difference between regions of the time variation values of correlation values the same as in the twenty-fifth and twenty-seventh embodiments, and the explanation is omitted. In the vector reliability judging means 35a to 35d, the reliability of each region is judged from the correlation values entered from the correlation values detecting parts 23a to 23d, time variation values of correlation values entered from the time variation value detecting parts 30a to 30d of correlation values, and the difference signal of the time variation values of the correlation values between regions entered from the means 32 for determining the difference of right and left regions of time variation values of correlation values and from the means 33 for determining the difference of the upper and lower regions, and the result of judgment and the motion vector of each region and delivered to the motion vector determining means 36. The motion vector determining means 36 determines the intermediate value of the vectors in each region judged to be reliable (the value positioned in the middle when arranged in the size order, or the means of two central values in the case of an even number) as the motion vector of the entire screen, and delivers.

What is different from the conventional motion vector detecting device is that the reliability of each detecting region is not judged from only the correlation values of detecting regions and time variation value of correlation values, but is judged from the difference in the time variation values of the correlation values in the detecting regions, as well as the correlation values of each detecting region and the time variation value of the correlation values. This point is described in further detail below. Only the case of right and left regions is mentioned herein, and the case of upper and lower regions is the same and is not explained.

When a moving object enters the screen from left to right, the operation is explained by referring to FIG. 51. In FIG. 51, (a) to (e) are as explained in the twenty-seventh embodiment. Now, the difference signal of the right and left regions of the time variation values of the correlation values in FIG. 51 (e) is obtained by subtracting the time variation value of the correlation value of the right region from that of the left region, and the negative portion of the time variation value of the correlation value in each region is supposed to be 0. As the moving object passes on the screen as shown herein, the difference signal of the time variation value of the correlation value fluctuates largely to the positive and negative side. Accordingly, in the reliability judging means 35a, 35b (the reliability judging means of the left region), in addition to the correlation value and the time variation value of the correlation value, the difference signal of the time variation value of the correlation value is compared with the positive specified level, and the reliability is judged, and in the reliability judging means 35c, 35d (the reliability judging means of the right region), in addition to the correlation value and the time variation value of correlation value, the difference signal of the time variation value of correlation value is compared with the negative specified level to judge the reliability. In the motion vector determining means 36, as mentioned above, the intermediate value of the vector in each region judged to be reliable (the value positioned in the middle when arranged in the size order, or the mean of two central values in the case of an even number) is determined and delivered as the motion vector of the entire screen.

In this embodiment, thus, in judgment or reliability of each region, in addition to the correlation value of the each region and time variation value of correlation value, by using the time variation value of the correlation values between regions, the judging performance of reliability of the moving object may be enhanced. In this embodiment, meanwhile, the number of detecting regions in the screen is four, but it is not limitative. Besides, when determining the difference between regions, the negative portion of the time variation value of correlation values individual regions was supposed to be 0, but it is not always necessary to set at 0.

Figure 53:
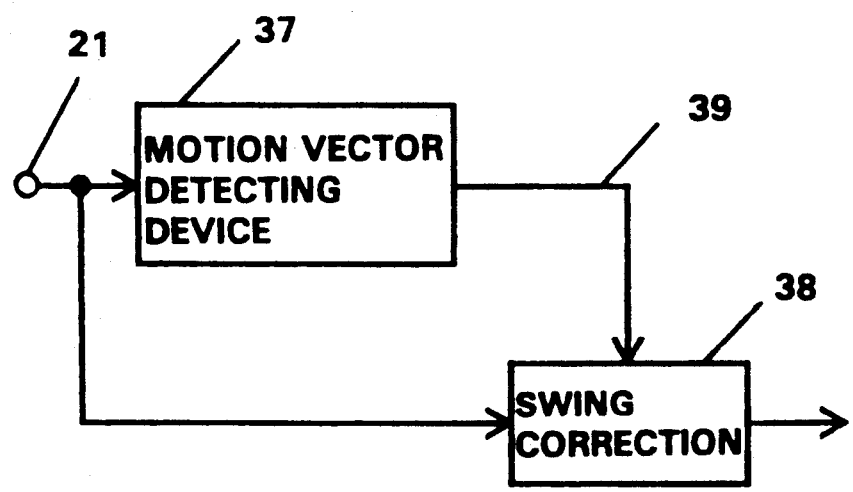
FIG. 53 is a block diagram of a swing correcting device in a twenty-ninth embodiment of the present invention.

Next FIG. 53 is a block diagram of a swing correcting device in a twenty-ninth embodiment of the invention. In FIG. 53, numeral 37 is a motion vector detecting device, and 38 is swing correcting means. Incidentally, the structure of the motion vector detecting device 37 may be any one of those explained in the twenty-fifth to twenty-eighth embodiments.

In the image motion vector detecting device of the twenty-ninth embodiment, the operation is the same as in the twenty-fifth to twenty-eight embodiments, and its explanation is omitted.

The swing correcting means 38, when receiving an image with a large fluctuation as indicated by 226, 227 in FIG. 5, moves the screen of the image parallel from 229 to 228 in the direction 231 of correcting the movement, on the basis of the motion vector 230 entered from the motion vector detecting device 37, with respect to the input image signals of the (n−1)-th field 226 and the n-th field 227, and manipulates the screen by enlarging or the like by interpolation or the like, thereby delivering image signal 232, 233 in the size of one screen small in fluctuation.

Thus, according to this embodiment, whether the moving object has invaded the region or not is judged, in each detecting region, by the correlation value and the time variation value of the correlation value, and the moving object is detected by finding the correlation value between regions and the difference of time variation value of correlation values, and the motion vector of the entire screen is determined. On the basis of the determined motion vector of the entire screen, the image signal memory means and CCD reading position are controlled, thereby correcting the swing of the screen. As a result, even if a moving object occupying the majority or whole of the screen passes through the screen, malfunction of correcting the screen in a wrong direction from the direction intended by the operator due to interruption of correction is avoided.

Figure 54:
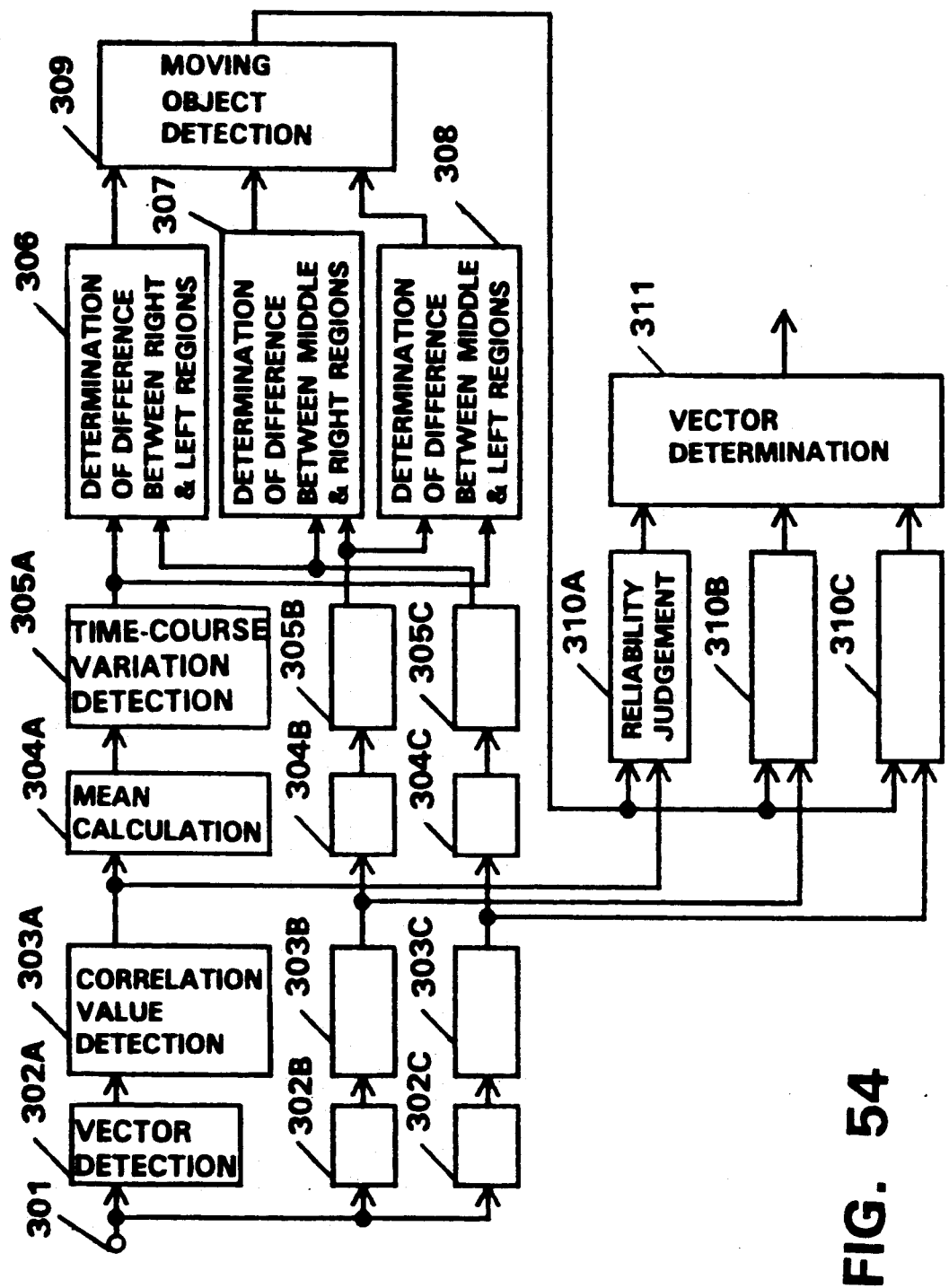
FIG. 54 is a block diagram of an image motion vector detecting device in a thirtieth embodiment of the present invention.

Next the motion vector detecting device of a thirtieth embodiment of the invention is explained. The configuration of the motion vector detecting device of the thirtieth embodiment is shown in FIG. 54. Numeral 301 is an image signal input terminal, 302a to 302c are vector detecting circuits of each detecting region, 303a to 303c are correlation value detecting parts, 304a to 304c are mean calculating parts, 305a to 305c are time variation value detecting parts, 306 to 308 are means for determining the difference of the time variation values between regions, 309 is moving object detecting means, 310 is reliability judging means, and 311 is motion vector determining means.

In the image motion vector detecting device of the thirtieth embodiment, first, an image signal consecutive in time for at least two fields is entered into the input terminal 301. In the screen, three vector detecting regions are preliminarily determined as indicated by 312, 313, 314 in FIG. 55, and in vector detecting circuits 302a to 302c of the detecting regions, the difference $\Sigma|\Delta L|$ (i,j) of the signal at the position deviated by a specified quantity (i,j): imin<i<imax, jmin<j<jmax is determined as the correlation value in each detecting region between two fields, and the deviation (i′,j′) for giving the minimum value of the value is detected, and it is regarded as the vector of each region. In the correlation detecting parts 303a to 303c, the minimum, mean and maximum of correlation values are determined in each detecting region. In the mean calculating parts 304a to 304c, the time mean is determined for the minimum of the correlation values. In the time variation value detecting parts 305a to 305c, the time differential value or the difference value after averaging the minimum values of the correlation values is determined. In the means 306 for determining the difference of the time variation values between regions, the difference between the left region and right region of the screen is determined, while the difference between the middle region and right region of the screen is determined in 307, and the difference between the middle region and left region of the screen is determined in 308. Numeral 309 is for detecting the moving object on the basis of the difference signal between regions obtained by 306 to 308. The vector reliability judging means 310 judges the reliability in each region from the correlation value entered from the correlation value detecting part 303 and the moving object detecting signal from the moving object detecting means 309, and the result of judgment and the motion vector of each region are delivered to the vector determining means 311. The motion vector determining means 311 determines the intermediate value of the vectors of each region judged to be reliable by the reliability judging means (the value positioned in the middle when arranged in the size order, or the mean of two central values in the case of an even number) as the motion vector of the entire screen and delivers.

Here, what is different from the conventional motion vector detecting device is that the motion vector of the entire screen is not determined only by the reliability judgment result in each detecting region, but by the difference in the time variation values of correlation values between regions as well as the result of judgment of reliability in each detecting region. This point is further described below.

Figure 56:
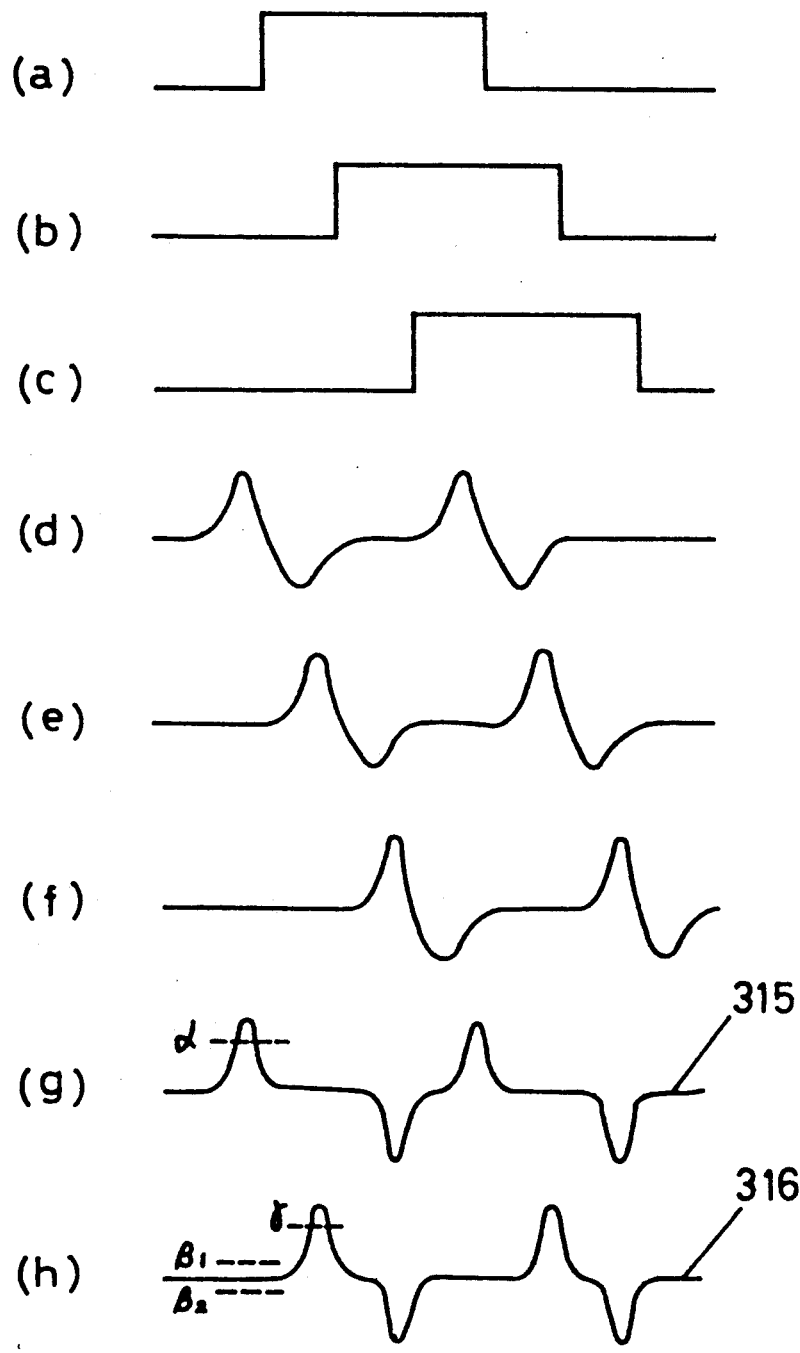
FIG. 56 is a diagram for explaining the operation of the motion vector detecting device in the thirtieth embodiment of the present invention.

FIG. 56 shows the motion vectors of left, middle and right detecting regions, output signals of the time variation value detecting parts 305a to 305c of the minimum value of correlation values, and the difference of the time variation values between regions, when a moving object enters the screen from left to right, taking the time on the axis of abscissas. In FIG. 56, (a) denotes the motion vector of the left region, (b) is the motion vector of the middle region, (c) is the motion vector of the right region, (d) is the time variation value of the left region, (e) is the time variation value of the middle region, (f) is the time variation value of the right region, (g) is the difference in the time variation value between the right and left regions, and (h) denotes the difference in time variation value between the middle and right regions. When determining the difference between regions, however, the negative portion of the time variation value of the correlation value in each region was assumed to be 0. In the means 306 for determining the difference of time variation value between the right and left regions, and the means 307 for determining the difference between the middle and right regions, due to the time difference of the moving object entering the regions, the difference signals 315, 316 as indicated in (g), (h) are obtained, and are sent to the moving object detecting means 309. In the moving object detecting means 309, after the difference signals 315, 316 satisfy the following condition 1, when condition 2 is met within a specific time, it is judged that the moving object has invaded the screen.

Condition 1: difference signal $315 > \alpha$ and $\beta 1 >$ difference signal $316 > \beta 2$ Condition 2: difference signal $316 > \gamma$ This is the explanation of the case of the moving object entering the screen from left to right, but if entering from right to left, the moving object may be similarly detected. In this case, instead of the difference of the time variation value between the middle and right regions, the difference of the time variation value between the middle and left regions is used.

In the reliability judging means 310, the reliability is judged by using the correlation value of each region, and the reliability is judged on the basis of the moving object detecting signal from the moving object detecting means 309. Concerning the technique of judging the reliability using the correlation value, either the conventional technique to the technique used in the foregoing embodiments of the invention may be employed. As the technique of judging the reliability on the basis of the moving object detecting signal, when the moving object is detected by the moving object detecting means 309, the reliability is negated in all regions. The motion vector determining means 311 determines the intermediate value of the vectors of each region judged to be reliable by the reliability judging means 310 as mentioned above as the motion vector of the entire screen, and delivers it.

In such constitution of the embodiment of the invention as described herein, even if the reliability judging means by the correlation value in each region fails to detect the moving object, the invasion of the moving object may be detected by the difference signal between regions. Therefore, the motion vector due to camera shake or the like may be detected correctly.

Figure 57:
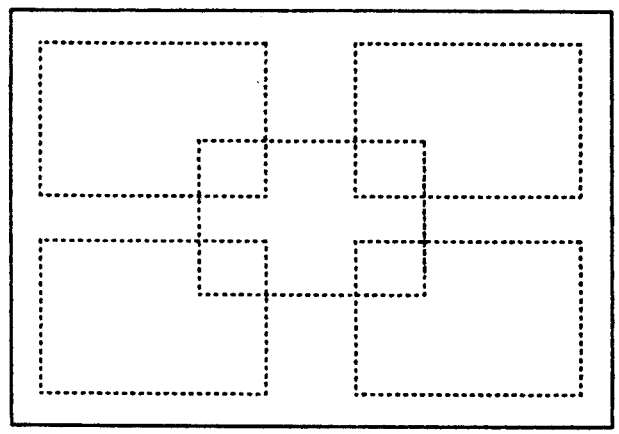
FIG. 57 is a diagram showing an example of a detecting region of a motion vector.

In the embodiment, the number of detecting regions in the screen is three, but this is not limitative. Furthermore, in this embodiment, the difference between the regions is determined in the lateral direction in order to detect the moving object moving in the lateral direction, but to detect a moving object moving in the vertical direction, the difference between the regions may be determined in the vertical direction. An example with five detecting regions is given in FIG. 57.

In the embodiment, when determining the difference between regions, the negative portion of the time variation value of correlation values in each region is supposed to be 0, but it is not always required to be 0.

Figure 58:
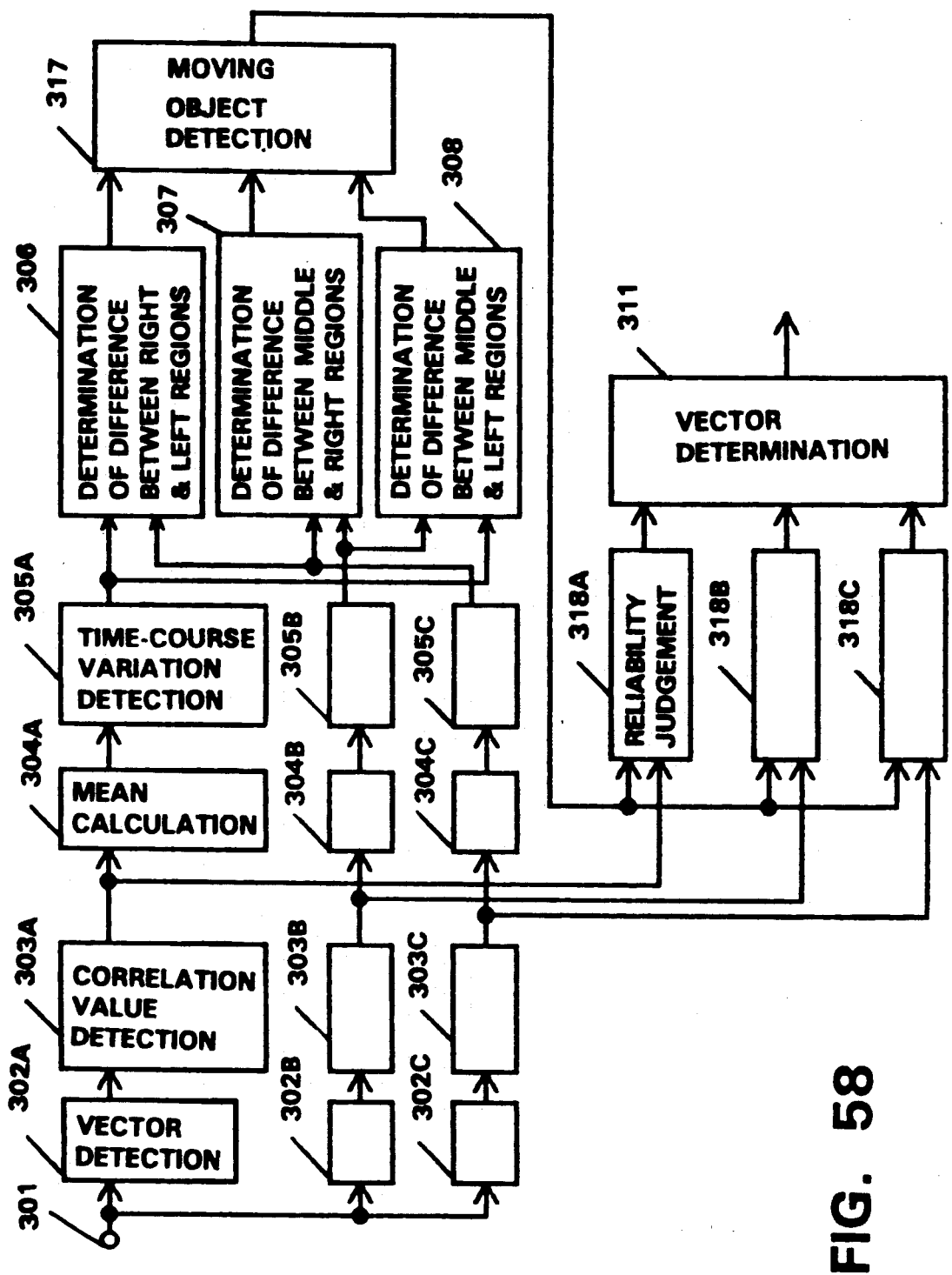
FIG. 58 is a block diagram of an image motion vector detecting device in a thirty-first embodiment of the present invention.

Next the motion vector detecting device of a thirty-first embodiment of the invention is descried. The configuration of the motion detecting device of the thirty-first embodiment is shown in FIG. 58. Those parts the same as in FIG. 54 are identified with the same reference numbers, and the explanation is omitted. What is different from the thirtieth embodiment is the moving object detecting means 317 and the reliability judging means 318, and only these two points are described below.

An example of detecting a moving object entering the screen from the left side is described below. In the screen, three vector detecting regions are determined as indicated by 312, 313, 314 in FIG. 55. In the means 306 for determining the difference between the left and right regions of the time variation value, and in the means 307 for determining the difference of the middle and right regions, due to the time difference of the moving object entering each region, difference signals 315, 316 are obtained as shown in FIG. 56 (g), (h), and are sent to the moving object detecting means 317. In the moving object detecting means 317, after the difference signals 315, 316 satisfy the following condition 1, when the condition 2, condition 3, and condition 4 are satisfied within a specific time, it is judged that the moving object has invaded the screen.

Figure 55:
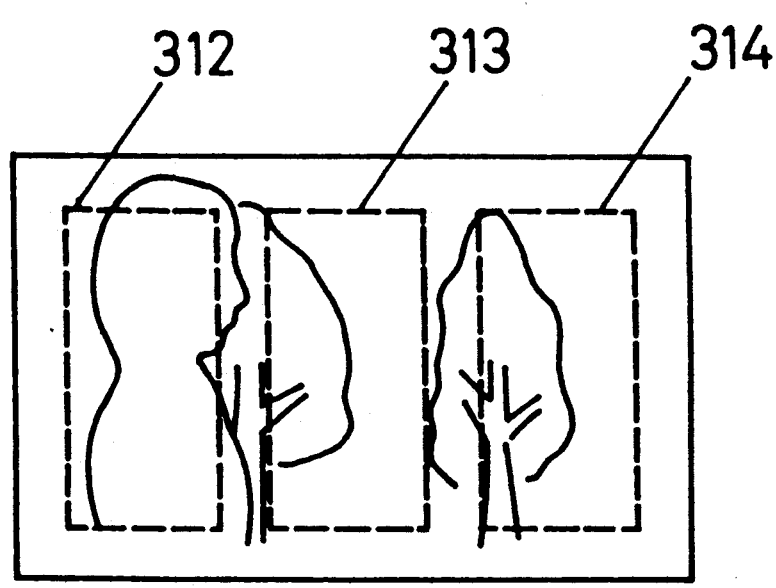
FIG. 55 is a diagram showing an example of a detecting region of a motion vector.

Condition 1: difference signal $315 > \alpha$ and $\beta 1 >$ difference signal $316 > \beta 2$ Condition 2: difference signal $316 > \gamma 1$ Condition 3: difference signal $316 > \gamma 2$ Condition 4: difference signal $316 > \gamma 3$ however, $\gamma 1 < \gamma 2 < \gamma 3$ In the reliability judging means 318, while judging the reliability by using the correlation value of each region, the reliability is judged on the basis of the moving object detecting signal from the moving object detecting means 317. As the technique for judging the reliability by using the correlation value, either the conventional method or the technique used in the other embodiments of the invention may be employed. As the technique for judging the reliability on the basis of the moving object detecting signal, when the condition 2 is satisfied by the moving object detecting means 317, the vector detecting region 312 in FIG. 55 is judged to be not reliable, and when the condition 3 is satisfied, the vector detecting region 313 is judged to be not reliable, and when the condition 4 is satisfied, the vector detecting region 314 is judged to be not reliable. However, when the condition 4 is not satisfied within a specific time, the vector detecting regions judged to be not reliable in the condition 2 and condition 3 are judged to be reliable. Thus, in this embodiment, it is characteristic that the reliability is negated sequentially from the region invaded by the moving object. The motion vector determining means 311 determines the intermediate value of the vector in each region judged to be reliable by the reliability judging means 318 as mentioned above as the motion vector of the entire screen, and delivers it.

In such constitution of the embodiment of the invention as described above, even if the moving object cannot be detected by the reliability judging means by the correlation value in each region, the invasion of the moving object can be detected by the difference signal between regions. Therefore, the motion vector due to camera shake or the like can be correctly detected.

In the embodiment, the number of detecting regions in screen is three, but it is not limitative. Furthermore, in this embodiment, the difference between regions is determined in the lateral direction to detect the object moving in the lateral direction, but the difference between regions may be determined in the vertical direction to detect an object moving in the vertical direction. Incidentally, the condition 4 of the moving object detecting means 317 of the embodiment may not be absolutely necessary, and without it, the vector detecting region 313 in FIG. 55 is judged to be not reliable when either the condition 2 or condition 3 is satisfied. In the embodiment, when determining the difference between regions, the negative portion of the time variation value of correlation value in each region is supposed it to be 0, but it is not always necessary to suppose to be 0.

Next the motion vector detecting device of a thirty-second embodiment of the invention is described below. The configuration of the motion vector detecting device of the thirty-second embodiment is shown in FIG.

Figure 59:
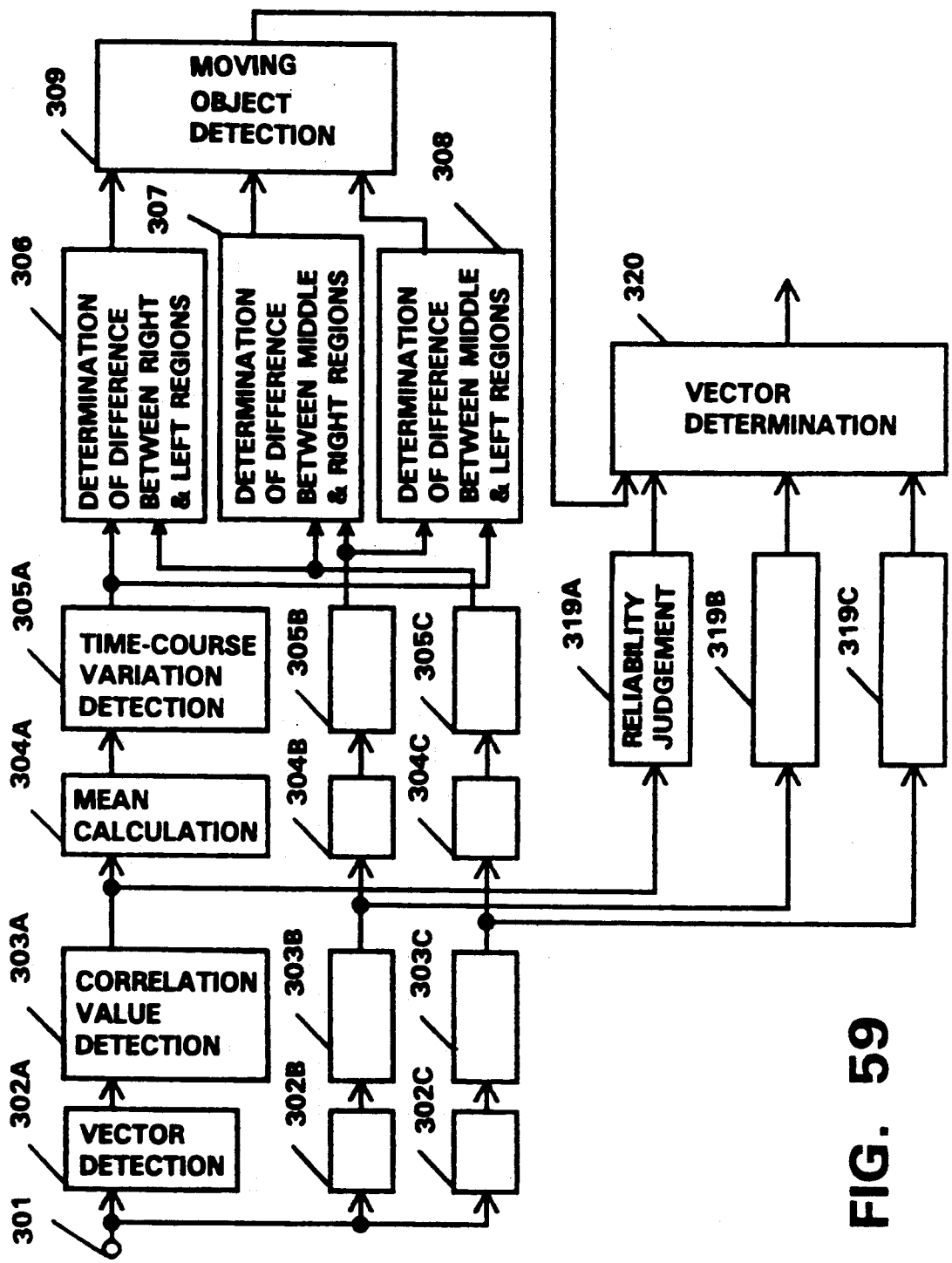
FIG. 59 is a block diagram of an image motion vector detecting device in a thirty-second embodiment of the present invention.

59. Those parts the same as in FIG. 54 are identified with the same numbers, and are not explained herein. In FIG. 59, numeral 319 is reliability judging means, and 320 is vector determining means.

As an example of invasion of a moving object from the left side of the screen, only different points from the thirtieth embodiment are explained below. In the reliability judging means 319, the reliability is judged in each region by using the correlation value of each region. The technique of judging the reliability by using the correlation value may be either the conventional technique or the technique used in the other embodiments of the invention. The motion vector determining means 320, as mentioned above, determines the intermediate value of the vector of each region judged to be reliable by the reliability judging means 319 as the motion vector of the entire screen and delivers it, but when the moving object is detected by the moving object detecting means 309, regardless of the result of the reliability judging means 319, the motion vector of the entire screen is assumed to be 0 for a specific period. As a result, even if the moving object is misjudged by the reliability judging means in each region, the invasion of the moving object is determined by the moving object detecting means, and the motion vector due to camera shake or the like may be correctly detected.

Figure 60:
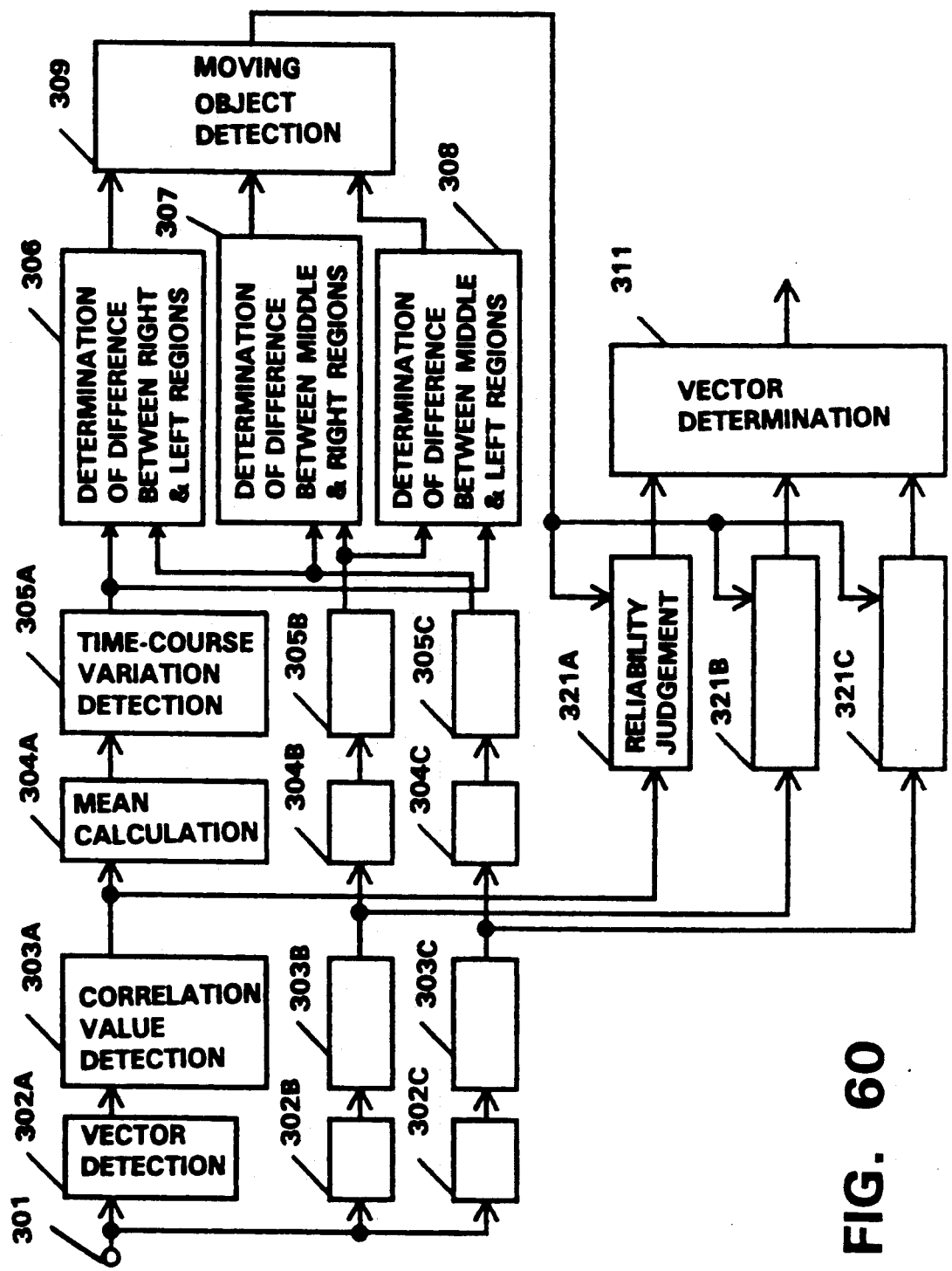
FIG. 60 is a block diagram of an image motion vector detecting device in a thirty-third embodiment of the present invention.

Next is explained the motion vector detecting device of a thirty-third embodiment of the invention. The configuration of the motion vector detecting device of the thirty-third embodiment is shown in FIG. 60. Those parts the same as in FIG. 54 are identified with the same reference numbers, and the explanation is omitted. In FIG. 60, numeral 321 is reliability judging means.

As an example of invasion of a moving object from the left side of the screen, only different points from the thirtieth embodiment are described below. In the reliability judging means 321, the reliability is judged in each region by using the correlation value of each region, and when the moving object invading from the left is detected by the moving object detecting means 309, the vector detecting region 312 in FIG. 55 is judged to be not reliable. The technique of judging the reliability by using the correlation value may be either the conventional method or the technique used in the other embodiments of the invention. Furthermore, when detecting the moving object by the moving object detecting means 309, the reliability judging condition of the reliability judging means 321 is varied so as to raise the detecting sensitivity of the moving object. As a result, even if the moving object is misjudged in the reliability judging condition of the ordinary reliability judging means, the invasion of the moving object is detected by the moving object detecting means, and by varying the reliability judgment condition, the motion vector due to camera shake can be correctly detected.

Figure 61:
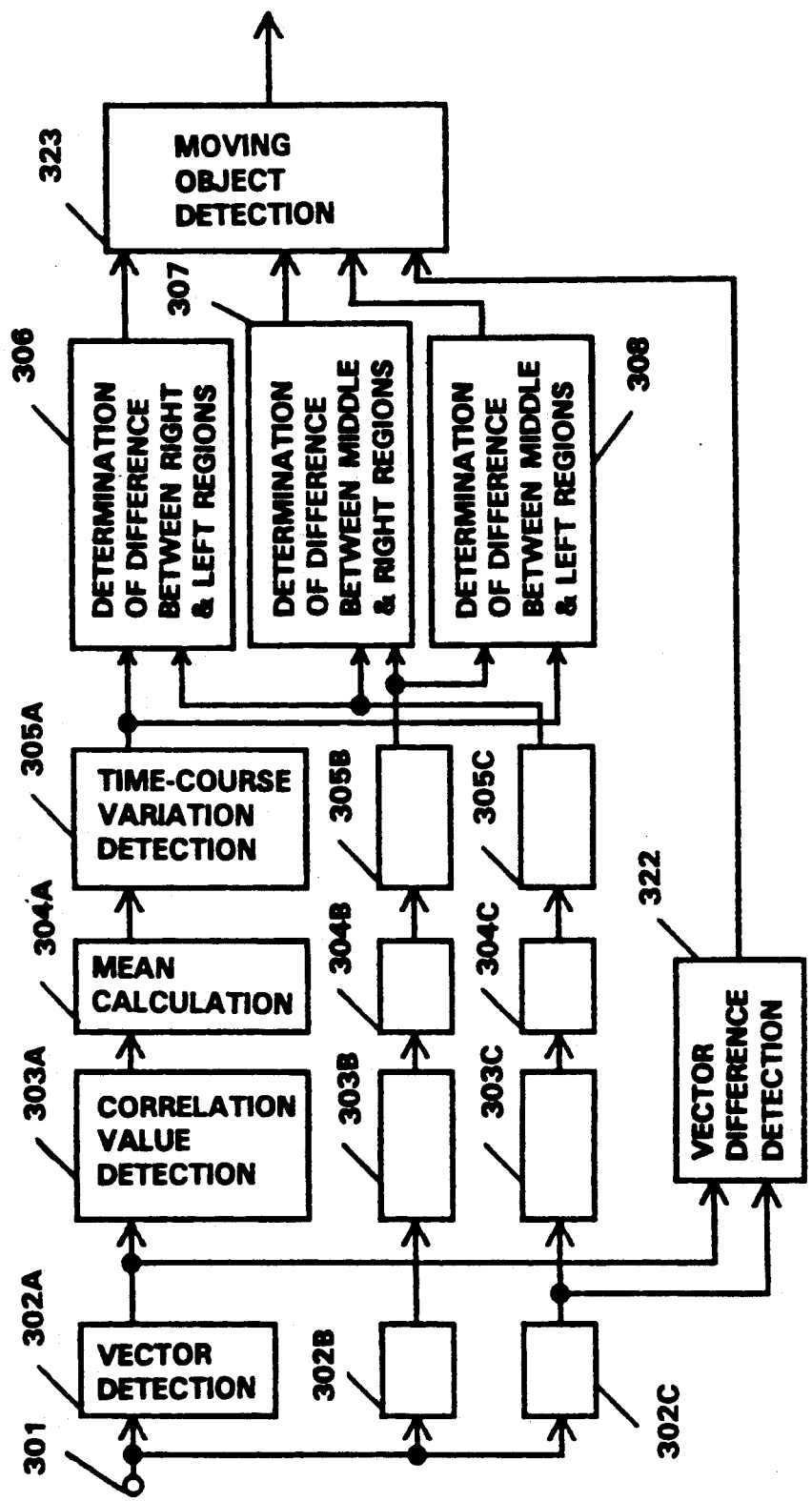
FIG. 61 is a block diagram of an image motion vector detecting device in a thirty-fourth embodiment of the present invention.

The motion vector detecting device of a thirty-fourth embodiment of the invention is described below. The configuration of the motion vector detecting device of the thirty-fourth embodiment up to the moving object detecting means is shown in FIG. 61. As for the overall configuration of the motion vector detecting device, on the basis of the moving object detecting signal from the moving object detecting means 323 shown in FIG. 61, it may be composed by using either one of the reliability judging means or motion vector determining means explained in the thirtieth to the thirty-third embodiments. Therefore, only the moving object detecting means 323 is explained here. Those parts the same as in FIG. 54 are identified with same reference numbers, and the explanations are omitted. In FIG. 61, numeral 322 is vector difference detecting means between regions, and 323 is moving object detecting means.

In the vector difference detecting means 322 between regions, the absolute value of the difference of the motion vector of the left region (312 in FIG. 55) of the vector detecting region and the motion vector of the right region (314 in FIG. 55) is determined. In the moving object detecting means 323, the moving object detecting conditions explained in the thirtieth and thirty-first embodiment are further combined with the new detecting conditions by the vector difference signal between regions from the means 322 for detecting vector difference between regions. An example of adding the new conditions to the moving object detecting conditions in the thirtieth embodiment is shown below. In the moving object detecting means 322, after satisfying the following condition 1, when the condition 2 is satisfied within a certain period, it is judged that the moving object has invaded the screen.

Condition 1: difference signal $315 > \alpha$ and $\beta 1 >$ difference signal $316 > \beta 2$ Condition 2: difference signal $316 > \gamma$ and vector difference signal between regions $> \delta$ Likewise, the conditions may be also added to the moving object detecting conditions in the thirty-first embodiment.

Thus, by adding the difference of the motion vector between regions to the condition, the detecting condition of the moving object becomes severe, and the possibility of mistaking something for a moving object is lowered.

Figure 62:
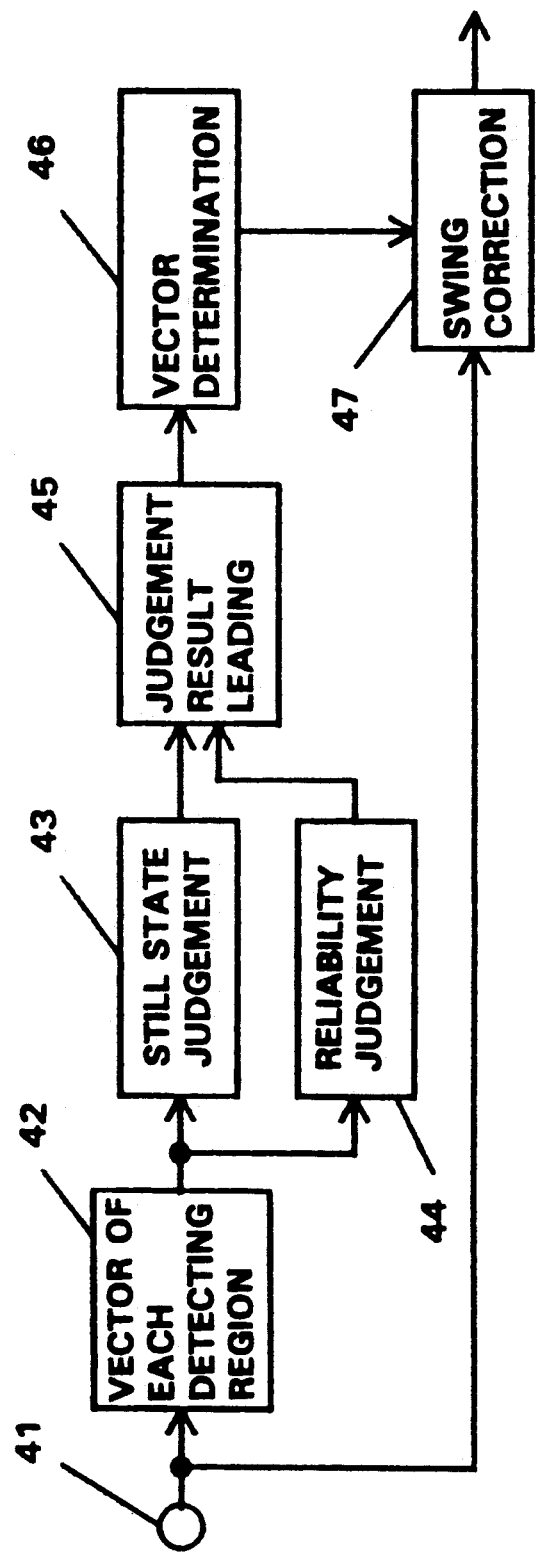
FIG. 62 is a block diagram of an image motion vector detecting device in a thirty-fifth embodiment of the present invention.

FIG. 62 is a block diagram of an image swing correcting device including a motion vector detecting device in a thirty-fifth embodiment of the invention. Numeral 41 is an image signal input terminal, 42 is a vector detecting circuit of each region, 43 is still state judging means, 44 is reliability judging means of vector, 45 is judgment result leading means, and 46 is motion vector determining means. Numeral 47 is swing correcting means, which has the same function as the swing correcting means 208 in FIG. 1.

In the image motion vector detecting device of the thirty-fifth embodiment, first, an image signal consecutive in time for at least two fields is entered in the input terminal 41. In the vector detecting circuit 42 of each region, four vector detecting regions are determined in the screen as indicated by 209, 210 211, 212 in FIG. 2, and as for each detecting region between two fields, the difference $\Sigma |\Delta L|$ (i,j) of the signal at the position deviated by a specified quantity (i,j): imin $<$ i $<$ imax, jmin $<$ j $<$ jmax is determined as the correlation value, and the deviation (i',j') for giving the minimum value of the value is detected, and it is taken as the motion vector Vk of each detecting region (the number of detecting regions: k=1, 2, 3, 4). The motion vector of each detecting region is delivered to the still state judging means 43.

The still state judging means 43 judges if the motion vector in each detecting region is still or not, and the result of this judgment is delivered to the judgment result leading means 45 together with the motion vector of each detecting region. The still state judging means 43 judges that the motion vector in the detecting region is still when the vector Vk is within the constant C for 10 consecutive times or n times (n: a natural number) in the time series, for example:

$$Sk = \{Vk(t) < C\} \cap \{Vk(t-1) < C\} \cap$$
$$\{Vk(t-2) < C\} \cap \{Vk(t-3) < C\} \cap$$
$$\{Vk(t-4) < C\} \cap \{Vk(t-5) < C\} \cap$$
$$\{Vk(t-6) < C\} \cap \{Vk(t-7) < C\} \cap$$
$$\{Vk(t-8) < C\} \cap \{Vk(t-9) < C\}$$

where
Sk: judgment result (1 if true, 0 if false) (k=1,2,3,4)
t: time
C: constant
∩: AND
Vk: motion vector of each detecting region (k=1,2,3,4)
As the still state condition, besides, it may be also considered to judge that the motion vector is still when it is within the constant C by m times out of n times (n>m) (m: a natural number).

The vector detecting circuit 42 of each region determines the maximum, mean and minimum of the correlation values, and delivers them, together with the value of the motion vector, to the vector reliability judging means 44. The vector reliability judging means 44 judges the reliability of each detecting region from the input values from the vector detecting circuit 42 of each region, and delivers the result of judgment to the judgment result leading means 45 together with the motion vector of each region. In the judgment result leading means 45, if it is judged that there is at least one motion vector standing still among four vector detecting regions, this judgment result and the motion vectors of detecting regions are delivered to the vector determining means 46. If there is no motion vector standing still, the result of judgment of the reliability judging means and motion vectors of detecting regions are delivered to the vector determining means. The motion vector determining means 46 determines the motion vector of the entire screen from the judgment result of each detecting region and the motion vector of each detecting region.

Figure 63:
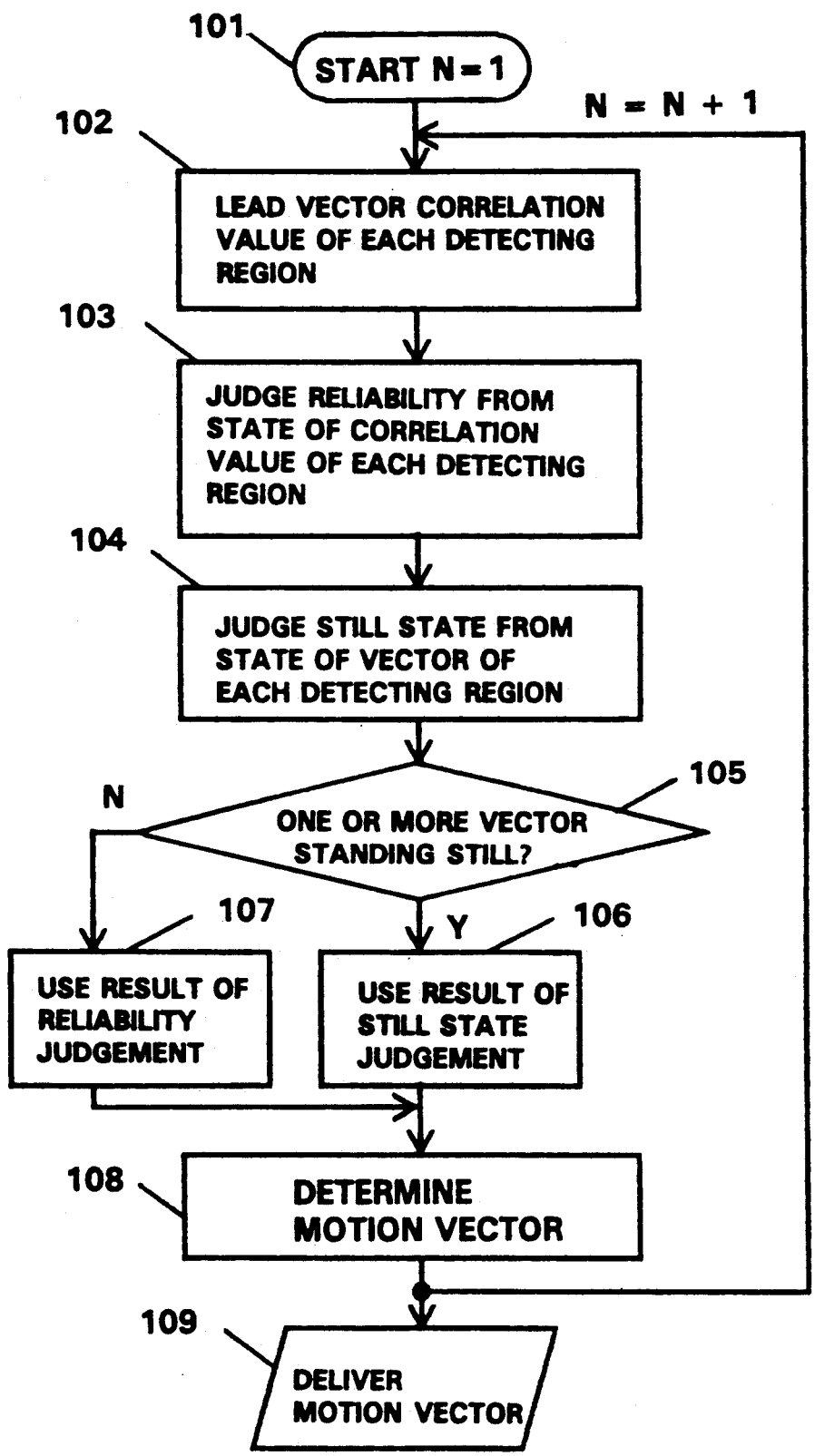
FIG. 63 is a flow chart of an image motion vector detecting device.

This operation is shown in a flow chart in FIG. 63. Starting from step 101, step 102 corresponds to 42 in FIG. 62, step 103 to 44 in FIG. 62, step 104 to 43 in FIG. 62 steps 105, 106, 107 to 45 in FIG. 62, step 108 to 45 in FIG. 62, and the motion vector is delivered at step 109.

Figure 64:
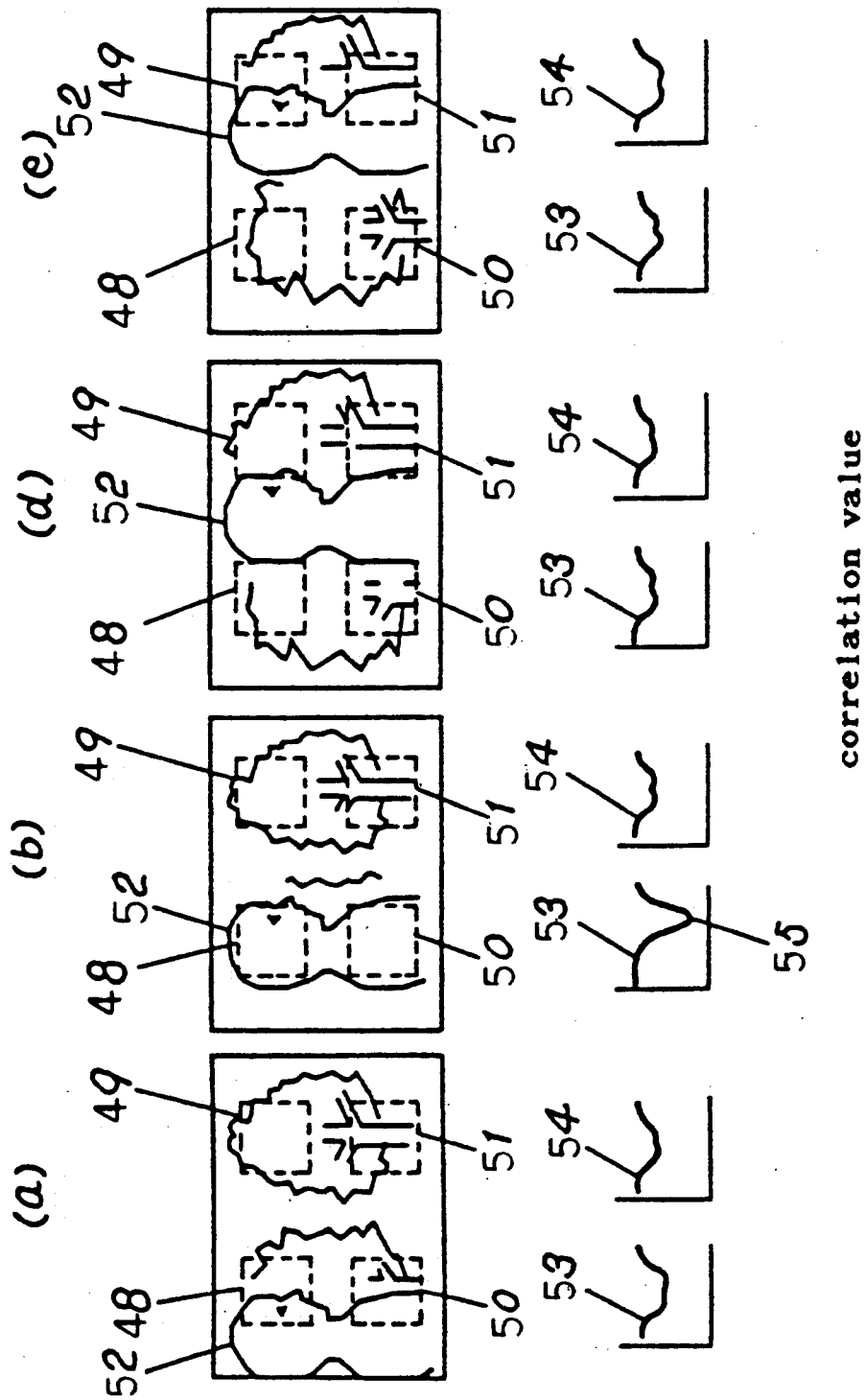
FIG. 64 is a diagram showing the operation and configuration of detecting regions in the screen of the motion vector detecting device in the thirty-fifth, thirty-sixth and thirty-seventh embodiment of the present invention.
Figure 65:
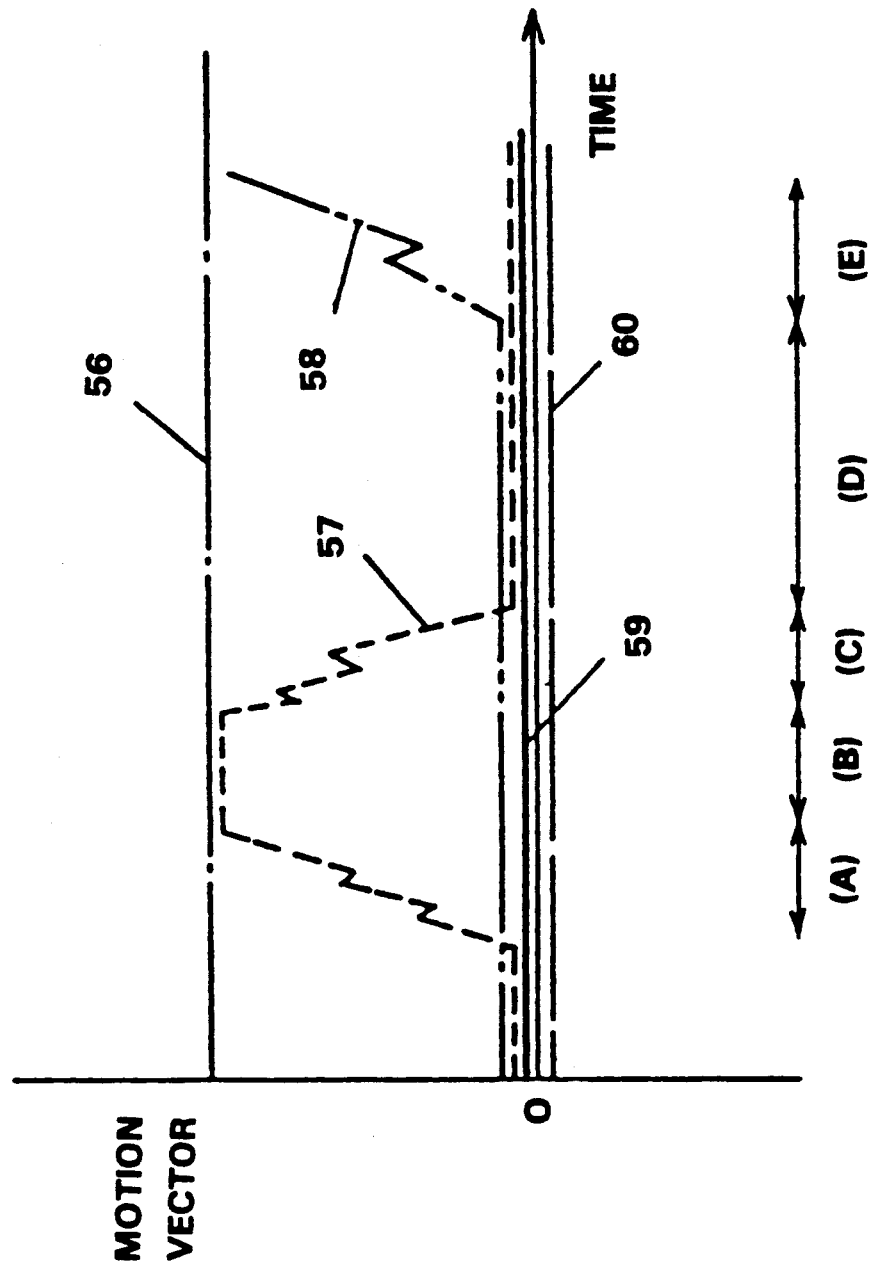
FIG. 65 is a diagram for explaining the operation of motion vector.

FIGS. 64 and 65 are diagrams showing practical examples. Intervals (a) to (e) in FIG. 65 correspond to (a) to (e) in FIG. 64. FIG. 64 shows the correlation value between the screen and each detecting region when a moving object 52 enters the screen, and FIG. 65 shows the motion vector 59 detected at this time. In FIG. 65, numeral 60 denotes a motion vector of camera, and it is a 0 vector. Numeral 56 is a motion vector of a moving object, and it is nearly constant. Numerals 57, 58 are vectors detected in detecting regions 48, 49, and depending of the manner of relation between the moving object and the detecting regions, the vector 56 comprising the motion of the moving object, and other wrong vectors are detected. Numeral 59 is a motion vector delivered from the motion vector determining means 46.

First, as shown in FIG. 64(a), when both the background and the moving object 52 are present in a certain detecting region 48, this detecting region is judged to be not reliable depending on the state of the correlation value 53 as shown in FIG. 64(a). It is desired that the detecting region 49 be judged to be reliable, but depending on the manner of reproduction(image signal) of the background, the reliability is negated as shown in FIG. 64(a) and (b). The operation of the detecting regions 50, 51 is the same as that of 48 and 49, and the explanation is omitted. Next, as shown in FIG. 64(b), when occupying the majority or whole of a certain detecting region 48, the motion vector 57 of the detecting region becomes a sum motion vector adding the motion of the moving object 52, and it is judged to be reliable from the state of the correlation value 55. Furthermore, at this time, the detecting region 49 is not reliable. Here, however, the detecting region 49 is judged to be still in the motion vector by the still state judging means 43, and the motion vector 57 is ignored by the judgment result leading means 45, and the motion vectors of the detecting regions 49 and 51 are used in the final determination of the motion vector. As the moving object moves along with the passing of the time, the background and the moving object 52 are both present in the detecting region 48 again (this is (c) though not shown in FIG. 64), and the no-reliability state is established as shown in FIG. 64(d) and (e). In (c), (d) and (e), however, since still vectors are present, the motion vectors detected at (a) to (e) in FIG. 65 are as shown by 59 in FIG. 65, so as not to be influenced by the motion of the object.

Thus, according to the embodiment, if there is at least one motion vector judged to be still by the still state vector judging means, the still judgment result is given priority over the judgment result of the reliability judging means, and therefore if the reliability judgment means misjudges, it is finally possible to avoid output of wrong vector due to invasion of the subject or the like.

In the thirty-fifth embodiment, meanwhile, when there is a certain uniform brightness or color image such as the sky and the wall in a certain detecting region in the screen, if the screen swings due to camera shake or the like, the motion vector of that region obtained from the vector detecting circuit 42 of each region often delivers an uncertain value. At this time, if the still state judging circuit 43 judges that the uniform image is standing still, it is impossible to correct when the screen swings due to camera shake or the like. Accordingly, the still state judging means 43 may be further improved as follows. FIG. 66 shows its screen and the mean of the correlation value at that time. Numerals 86, 87, 88, 89 are detecting regions. FIG. 66(a) is a spontaneous scene, (c) is the mean at that time, (b) is the sky scene with uniform image detecting regions 87, 88, and (d) is the mean of the detecting regions 87, 88. The mean of the correlation values is obtained by obtaining the difference $\Sigma|\Delta L|$ (i,j) of the signal at the position deviated by a specified quantity (i,j): imin<i<imax, jmin<j<jmax as the correlation value in each detecting region between two fields, and averaging the obtained values. Generally, when the screen is a spontaneous scene as in FIG. 66(a), the mean of the detecting regions is a high value as in FIG. 66(c). In the case of a uniform screen as in the detecting regions 87, 88 in FIG. 68(b), on the other hand, the correlation values (the signal difference $\Sigma|\Delta L|$ (i, j)) become small in the entire region of imin<i imax, jmin<j<jmax, showing smaller values than FIG. 66(c), as indicated in FIG. 66(d). When the mean is smaller than a specific value C', it is enough when the detecting regions 87, 88 are judged to be not still.

The still state judging means judges that the motion vector of the detecting region is still when the vector Vk and the mean satisfy the specified conditions consecutively 10 times or n times (n: a natural number) in the time series, for example:

$$Sk = \{Vk(t) < C\} \cap \{Vk(t-1) < C\} \cap$$
$$\{Vk(t-2) < C\} \cap \{Vk(t-3) < C\} \cap$$
$$\{Vk(t-4) < C\} \cap \{Vk(t-5) < C\} \cap$$
$$\{Vk(t-6) < C\} \cap \{Vk(t-7) < C\} \cap$$
$$\{Vk(t-8) < C\} \cap \{Vk(t-9) < C\} \cap$$
$$\{Avek(t) > C'\} \cap$$
$$\{Avek(t-1) > C'\} \cap$$
$$\{Avek(t-2) > C'\} \cap$$
$$\{Avek(t-3) > C'\} \cap$$
$$\{Avek(t-4) > C'\} \cap$$
$$\{Avek(t-5) > C'\} \cap$$
$$\{Avek(t-6) > C'\} \cap$$
$$\{Avek(t-7) > C'\} \cap$$
$$\{Avek(t-8) > C'\} \cap$$
$$\{Avek(t-9) > C'\}$$

where

Sk: judgment result (1 if true, 0 if false) (k=1,2,3,4)
t: time
C, G': constants
$\cap$: AND
Vk: motion vector of each detecting region (k=1,2,3,4)
Avek: mean of each detecting region (k=1,2,3,4)

Thus, according to the embodiment, if there is a uniform image of the screen in a certain detecting region, that detecting region is judged not to be still by the still state judging means, and by correcting according to the detecting regions of non-uniform image, a stable and easy-to-see screen is obtained.

Figure 67:
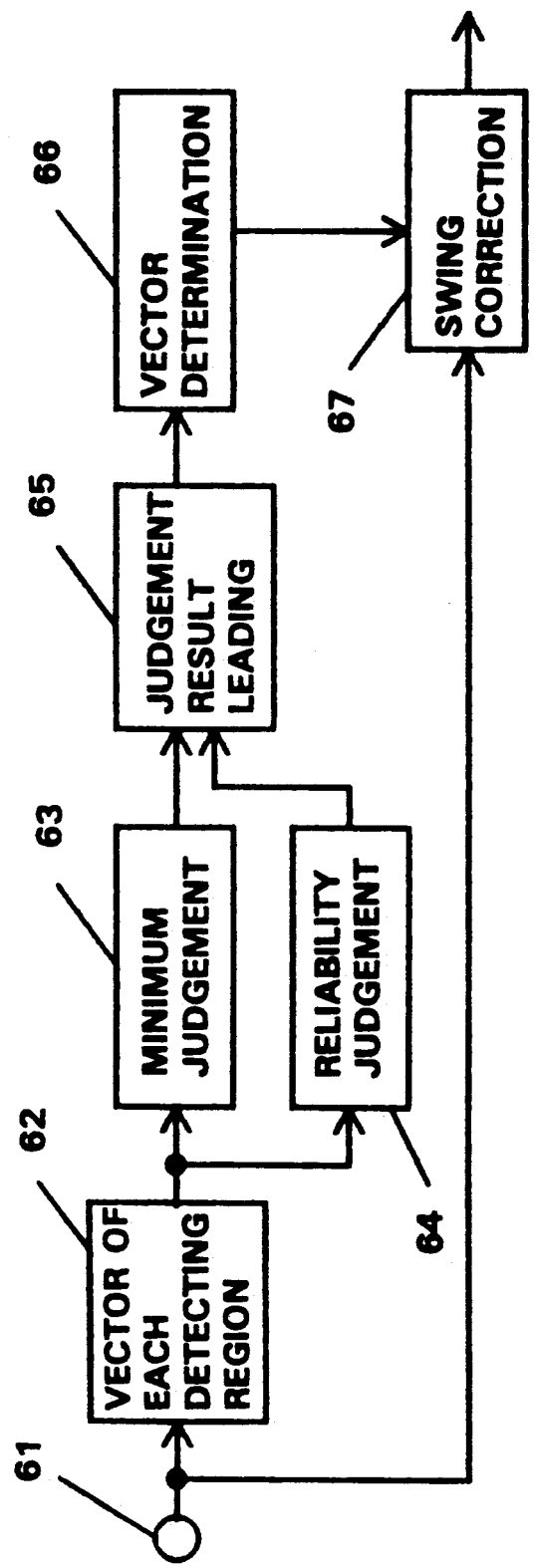
FIG. 67 is a block diagram showing the operation of the motion vector detecting device in the thirty-sixth embodiment of the present invention.

FIG. 67 is a block diagram of an image swing correcting device including a motion vector detecting device in a thirty-sixth embodiment of the invention. Numeral 61 is an image signal input terminal. Numeral 62 is a vector detecting circuit of each region, 63 is minimum judging means, 64 is vector reliability judging means, 65 is judgment result leading means, 66 is motion vector determining means, and 67 is swing correcting means.

In the thirty-sixth embodiment, the vector detecting circuit 62 of each region, reliability judging means 64, vector determining means 66, and swing correction means 67 are the same in operation as the vector detecting circuit 42 of each region, reliability judging means 44, vector determining means 46 and swing correcting means 47 in the thirty-fifth embodiment.

The minimum judging means 64 judges if the motion vector in each detecting region is standing still or not, and delivers the result of judgment, together with the motion vector of each region, to the judgment result leading means 65. The minimum judgment is to judge the detecting region having the minimum value among the plural motion vectors of the detecting regions.

In the judgment result leading means 65, when the reliability judging means 64 judges that the reliability is absent at least in one detecting region, the judgment result of the minimum judging means 63 is employed, and is delivered to the motion vector determining means 66. In the vector determining means 66, the minimum value among the motion vectors of the detecting regions is taken as the motion vector of the entire screen. When the reliability judging means 64 judges that all detecting regions are reliable, the judgment result of the reliability judging means is employed, and is delivered to the motion vector determining means 66. The motion vector determining means 66 takes the mean of the motion vectors of the detecting regions as the motion vector of the entire screen.

Figure 68:
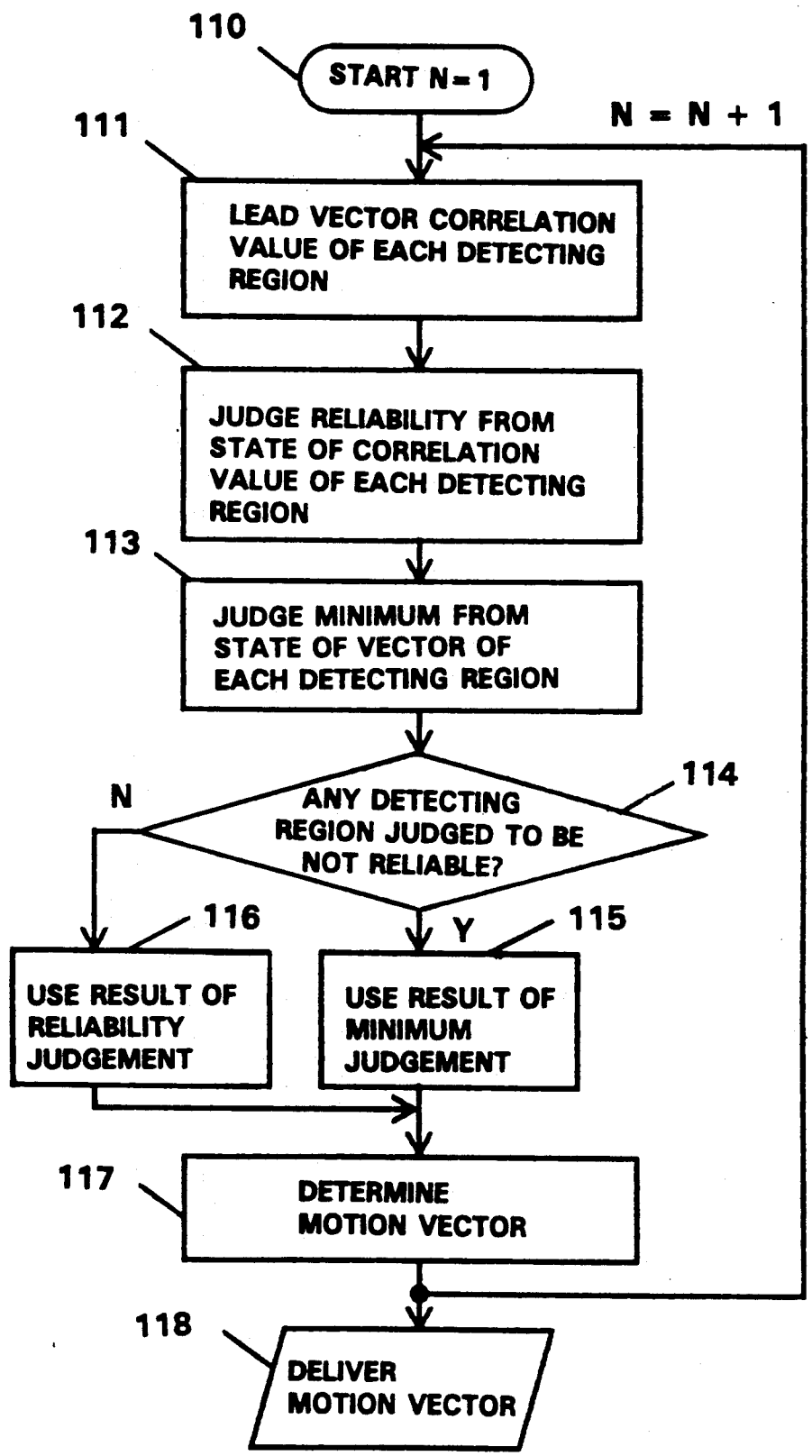
FIG. 68 is a flow chart of an image motion vector detecting device.

This operation is shown in a flow chart in FIG. 68. Starting with step 110, step 111 corresponds to 62 in FIG. 67, step 112 to 64 in FIG. 67, step 113 to 63 in FIG. 67, steps 114, 115, 116 to 65 in FIG. 67, step 117 to 66 in FIG. 67, and the motion vector is delivered at step 118.

As in the thirty-fifth embodiment, practical effects are explained by referring to FIG. 64 and FIG. 65. First, as shown in interval (a) in FIG. 64, when both the background and the moving object 52 are present in a certain detecting region 48, that detecting region is judged to be not reliable depending on the state of the correlation value 53 as shown in FIG. 64(a). It is desired that the detecting region 49 to judged to be reliable, but depending on the manner of reproduction of the background, the reliability is negated as shown in FIG. 64(a), (b). Accordingly, the minimum judgment result is employed by the judgment result leading means 65. The operation of the detecting regions 50, 51 is the same as that of the detecting regions 48, 49 and is hence not explained herein. Next, as shown in FIG. 64 (b), when occupying the majority or whole of the detecting region 48, the vector 57 in FIG. 65 of that detecting region becomes a sum motion vector adding the motion of the moving object 52, and the reliability is affirmatively judged from the state of the correlation value 55. At this time, the detecting region 49 is not reliable. In this case, however, since the detecting region 49 is in the minimum value of the detecting regions, the motion vector 57 is ignored, and the motion vectors of the detecting regions 49, 51 are finally used in the determination of the motion vector. Furthermore, when the moving object 52 moves with the passing of the time, both the background and the moving object 52 enter the detecting region 48 again (this is (c) although not shown in FIG. 64), and it is followed by no-reliability state as shown in FIG. 64(d) and (e). In the intervals (c), (d) and (e), however, the minimum vector is employed, and the motion vectors detected at intervals (a) to (e) in FIG. 65 become as shown in 59 in FIG. 65, being not influenced by the motion of the subject.

Thus, according to the embodiment, if there is at least one vector judged to be not reliable by the reliability judging means, the minimum judgment result is given priority over the judgment result of the reliability judging means, and therefore if the reliability judging means misjudges, output of the wrong vector may be finally avoided.

In the judgment result leading means 65, meanwhile, the minimum judgment result may be employed only when the reliability judgment result is a mixture of being reliable and being not reliable. In other words, it may be designed not to correct the swing when all reliability judgments of the detecting regions are absent.

Incidentally, the minimum judging means 63 may judge n motion vectors selected sequentially from the smallest among the motion vectors of detecting regions, to be minimum. The vector determining means 66 determines the motion vector of the entire screen from n values.

Figure 69:
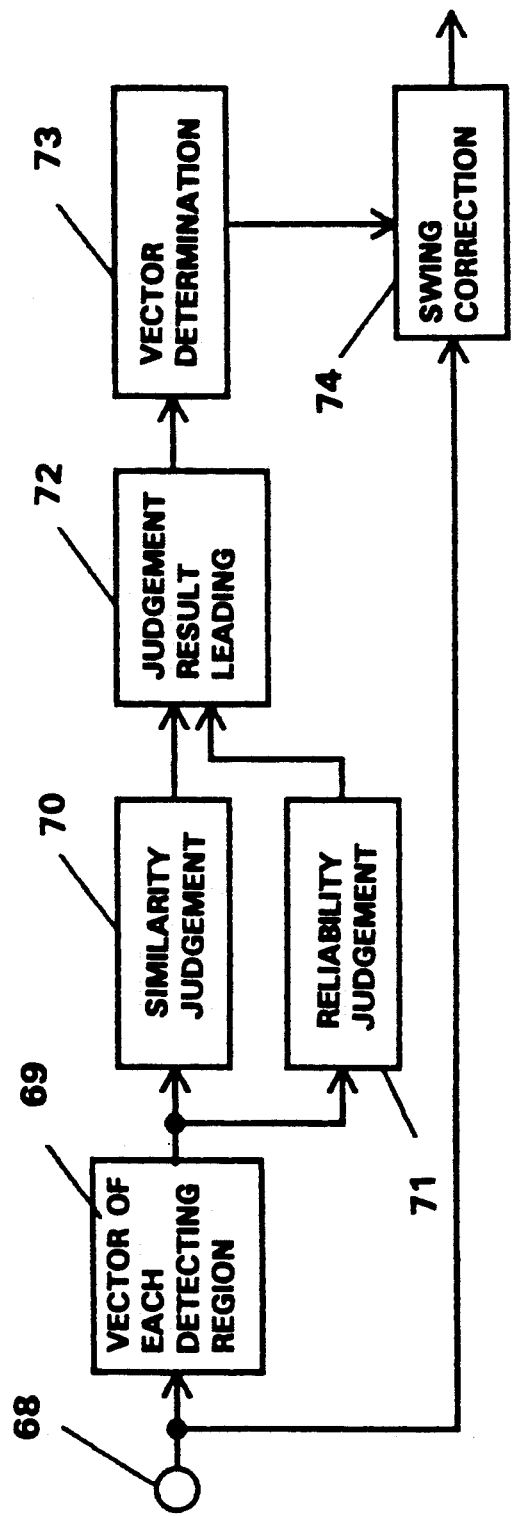
FIG. 69 is a block diagram showing the operation of the motion vector detecting device of the thirty-seventh embodiment of the present invention.

FIG. 69 is a block diagram of the swing correcting device including a motion vector detecting device in a thirty-seventh embodiment of the invention. Numeral 68 is an image signal input terminal. Numeral 69 is a vector detecting circuit of each region, 70 is similarity judging means, 71 is vector region judging means, 72 is judgment result leading means, 73 is vector determining means, and 74 is swing correcting means.

In the thirty-seventh embodiment, the operation of the vector detecting circuit 69 of each region, reliability judging means 71, vector determining means 73, and swing correcting means 74 are the same as those of the vector detecting circuit 42 of each region, reliability judging means 44, vector determining means 46, and swing correcting means 47 in the thirty-fifth embodiment, respectively.

In the similarity judging means 70, the degree of similarity is calculated. To determine the similarity, the difference portion of the motion vectors of the detecting regions is calculated. For example, it may be expressed as follows:

$$\text{Similarity} = \{|V1| - |V2|\} + \{|V1| - |V3|\} + \\ \{|V1| - |V4|\} + \{|V2| - |V3|\} + \\ \{|V2| - |V4|\} + \{|V3| - |V4|\}$$

where
Vi: (i=1, 2, 3, 4) motion vector of the detecting region, i is the number of detecting regions.

The smaller the similarity, the more similar are the motion vectors of the detecting regions. In the similarity judging means 70, when motion vectors of all detecting regions are similar, the result of judgment of all vectors is true (1). Otherwise, the result is false (0). The result of judgment, the degree of similarity, and motion vectors of detecting regions are delivered to the judgment result leading means 72.

In the judgment result leading means 72, the judging means is selected on the basis of the similarity.

if similarity ≤ C, the similarity judgment result is used.

if similarity > C, the reliability judgment result is used.

C: constant

Figure 70:
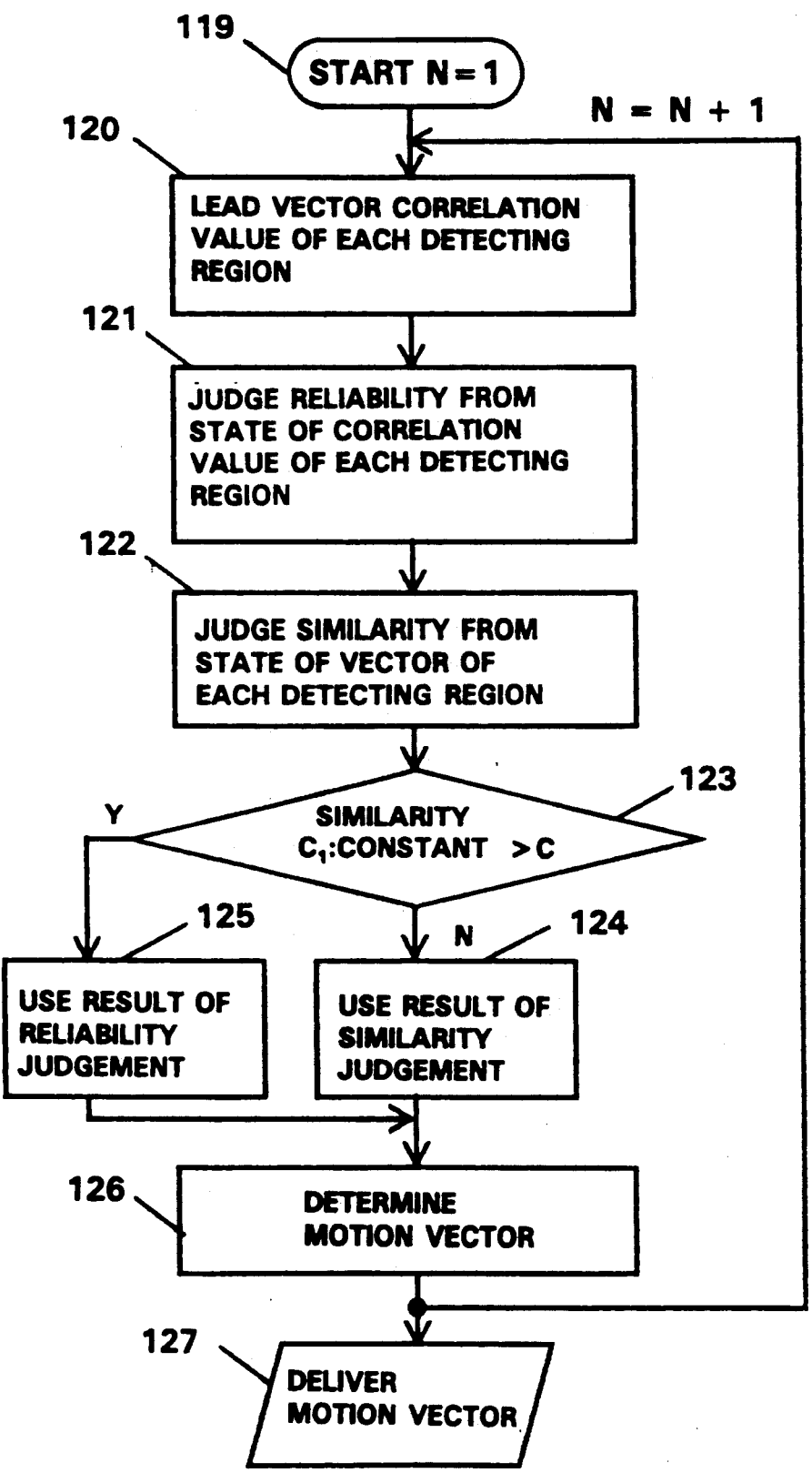
FIG. 70 is a flow chart of the image motion vector detecting device.

This operation is shown in the flow chart in FIG. 70. Starting with step 119, step 120 corresponds to 69 in FIG. 69, step 121 to 71 in FIG. 69, step 122 to 70 in FIG. 69, steps 123, 124, 125 to 72 in FIG. 69, step 126 to 73 in FIG. 69, and a motion vector is delivered at step 127.

Figure 71:
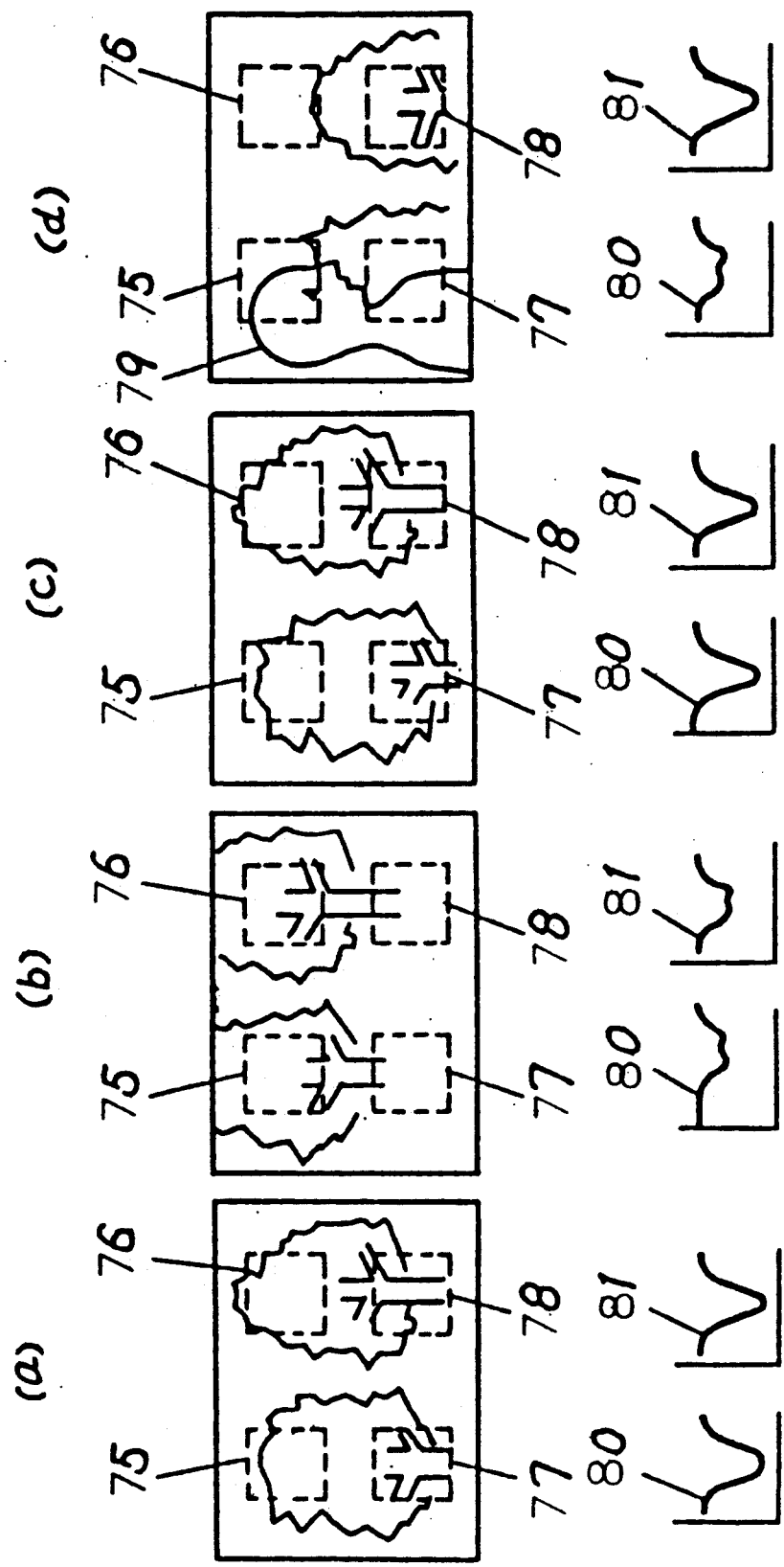
FIG. 71 is a diagram for explaining the operation of similarity and motion vector.

A practical example is explained in FIGS. 71 and 72. FIG. 71 shows the screen before correction with camera shake, detecting regions 75, 77 and their correlation value 80, detecting regions 76, 78 and their correlation value 81. The operation of detecting regions 77, 78 is the same as that of 75, 76, and the explanation is omitted. Numeral 79 is an obstacle. FIG. 72 shows the motion vector and similarity in FIG. 71. In FIG. 72, numeral 84 is a motion vector of the camera, and it is swinging vertically about a 0 vector. Numeral 83 is a motion vector detected from the detecting region 75, and the motion vector 84 due to camera shake or the motion of the moving object 79 or other wrong vector is detected. Numeral 82 is a motion vector detected from the detecting region 76, and the motion vector 84 due to camera shake is detected. Numeral 85 is a motion vector of the entire screen delivered from the vector determining means 73. Intervals (a) to (d) in FIG. 71 correspond to (a) to (d) in FIG. 72.

First, in FIGS. 71(a) to (c), from FIG. 72, it is known that the state is

Similarity ≤ C and therefore the similarity judgment result is employed. By the vector determining means 73, the mean of all motion vectors in the detecting regions becomes the motion vector of the entire screen.

In FIG. 71(b), the reliability judgment is suddenly no reliability in all detecting regions due to the appearance(image signal) of the background, and by this judgment alone, the swing is not corrected, but since the state is Similarity ≤ C as known from FIG. 72, the similarity judgment result is employed. Next, in interval (d) in FIG. 71, the obstacle 79 has entered, and hence the state is Similarity > C and the reliability judgment result is employed. Hence, the motion vector of the detecting region 75 is employed. As a result, the motion vector of the entire screen is as shown in 85 in FIG. 72, and the vector correcting only the camera shake is obtained.

Thus, according to the embodiment, when the motion vectors of the detecting regions are judged to be similar by the similarity judging means, the entire screen is swinging in a same direction, and therefore the screen swing must be corrected. Here, in the case on the basis of the similarity, motion vectors of all detecting regions are employed by the judgment result leading means 72, and are delivered to the vector determining means 73. To the contrary, if not similar, it is highly possible that an obstacle has entered the screen, and the detecting region containing the obstacle should not be used in correction, and therefore the reliability judging means 71 is used. In such constitution, only the camera shake is corrected, and a stable and easy-to-see image is obtained.

In the thirty-fifth, thirty-sixth and thirty-seventh embodiments, meanwhile, the number of detecting regions in the screen is four, but it is not limitative. Besides, the method of judging the reliability of the motion vectors of detecting regions is described in detail, but this is not necessarily to be exactly so, and in judgment, not only the state of the correlation value at that moment or the value of the vector, but also the state of the preceding correlation value, the vector value or judgment result may be used together.

Or, in the motion vector detecting device, all of the still state judging means, minimum judging means and similarity judging means may be employed.

Figure 73:
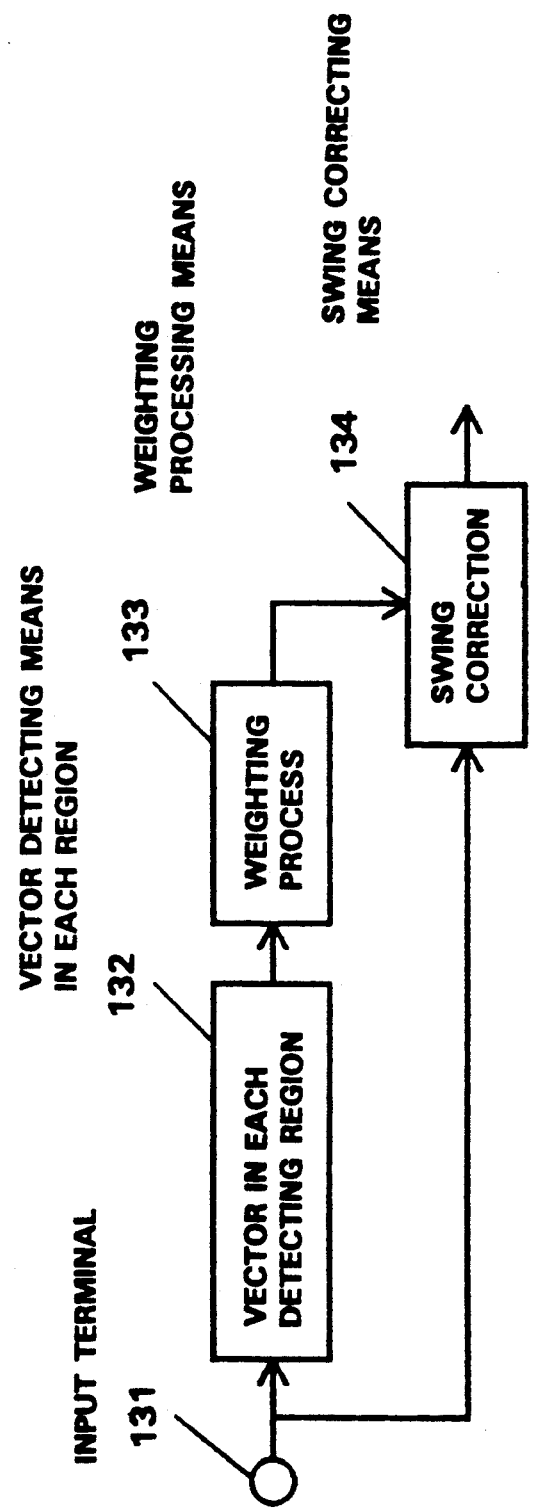
FIG. 73 is a block diagram showing the operation of a motion vector detecting device in a thirty-eighth embodiment of the present invention.

FIG. 73 is a block diagram of an image swing correcting device including a motion vector detecting device in a thirty-eighth embodiment of the invention. Numeral 131 is an image signal input terminal. Numeral 132 is a vector detecting circuit in each region, 133 is weighting processing means, and 134 is swing correcting means, of which function is the same as that of the swing correcting means 208 in FIG. 1.

Figure 74:
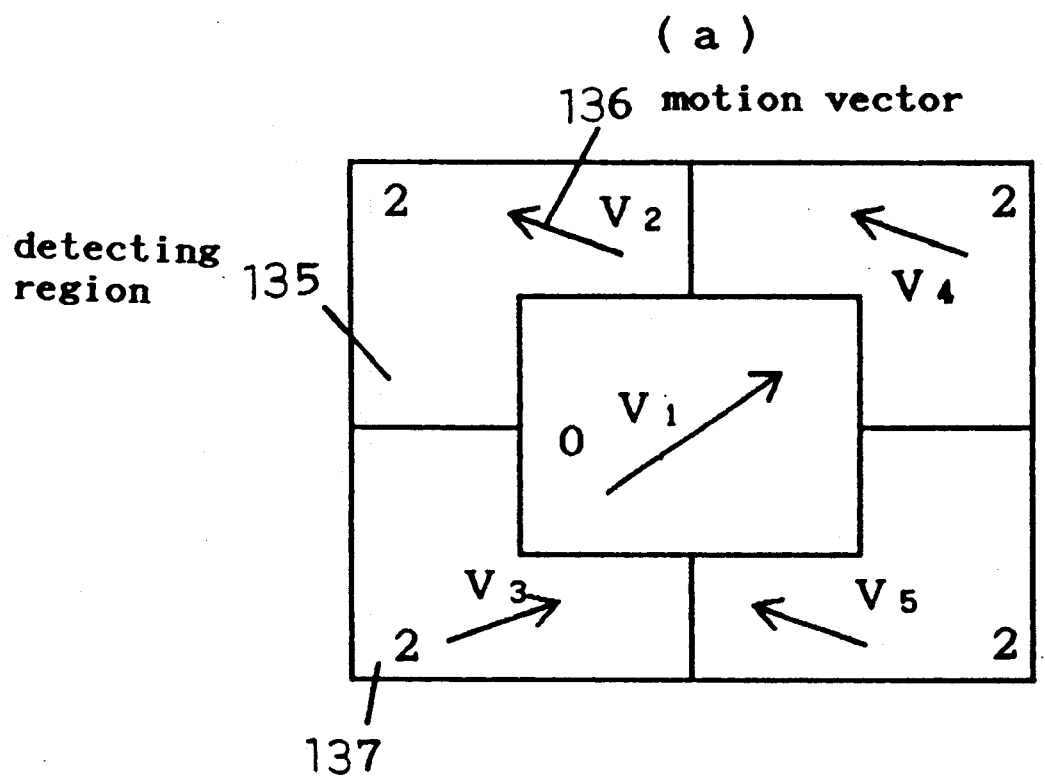
FIGS. 74(a), 74(b) are diagrams showing a detecting region in a screen.
Figure 74:
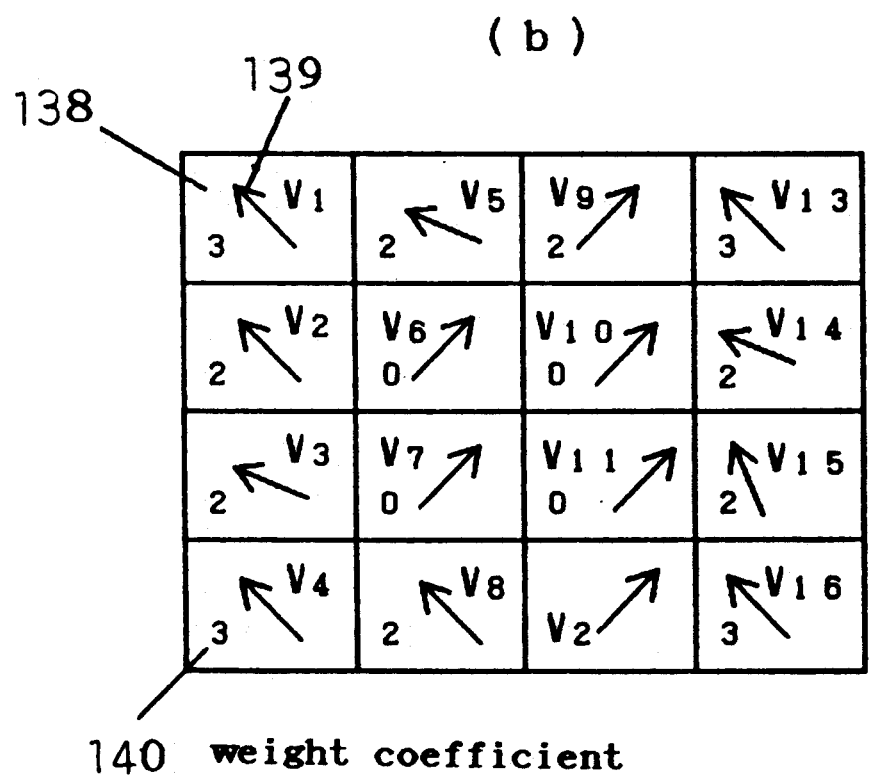

In the image motion vector detecting device of the thirty-eighth embodiment, first, an image signal consecutive in time for at least two fields is fed into the input terminal 131. In the vector detecting circuit 132 of each region, as shown in FIG. 74, plural vector detecting regions 135 or 138 are determined in the screen, and the detecting regions are divided into multiple subdivisions having representative points as explained in the prior art (FIG. 2). An image signal consecutive in time of two fields is entered. The difference from the signal at a position deviated by a specific quantity (i,j): imin<i<i- max, jmin<j<jmax between two fields with respect to representative points of each subdivision is obtained as the correlation value individually, and the sum of subdivisions is determined. The correlation value is obtained in the same formula as in the prior art.

$$\text{Correlation value} = \sum_{k=1}^{n} |\Delta L|(i,j)$$

where
$\Sigma|\Delta L|(i,j)$: absolute value of difference of signal between coordinates (i,j) and representative point
n: number of subdivisions in one detecting region Detecting the deviation (i',j') for giving the minimum value of correlation values, it is taken as the motion vector Vk (k=1, 2, ..., n; n: number of detecting regions) of each detecting region. The motion vector of each detecting region is delivered to the weighting processing means 133.

Figure 75:
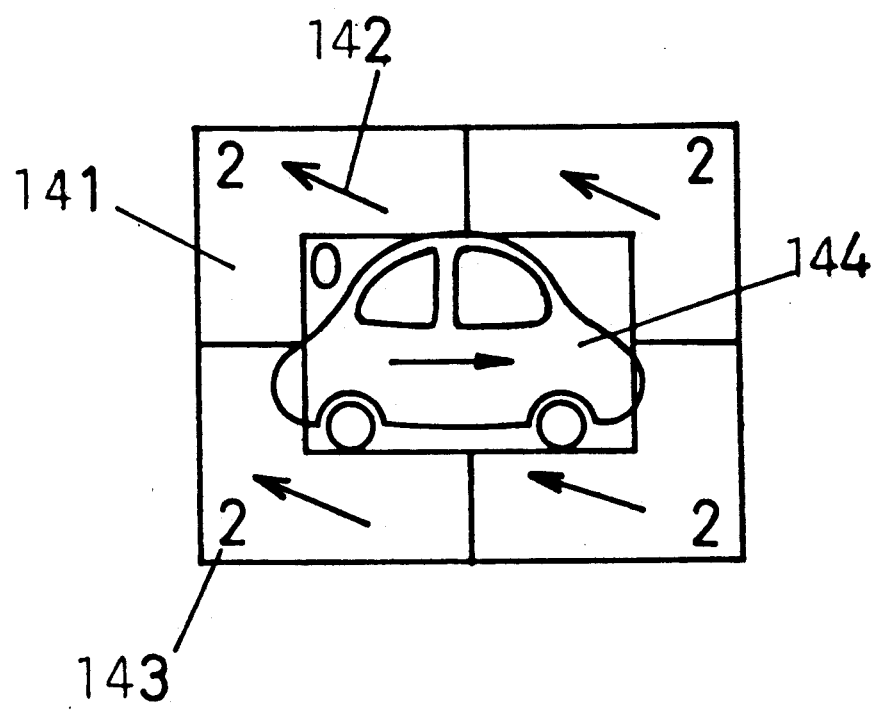
FIGS. 75(a), 75(b) are diagrams showing a moving object (an automobile) invading into the detecting region if in FIG. 74.
Figure 75:
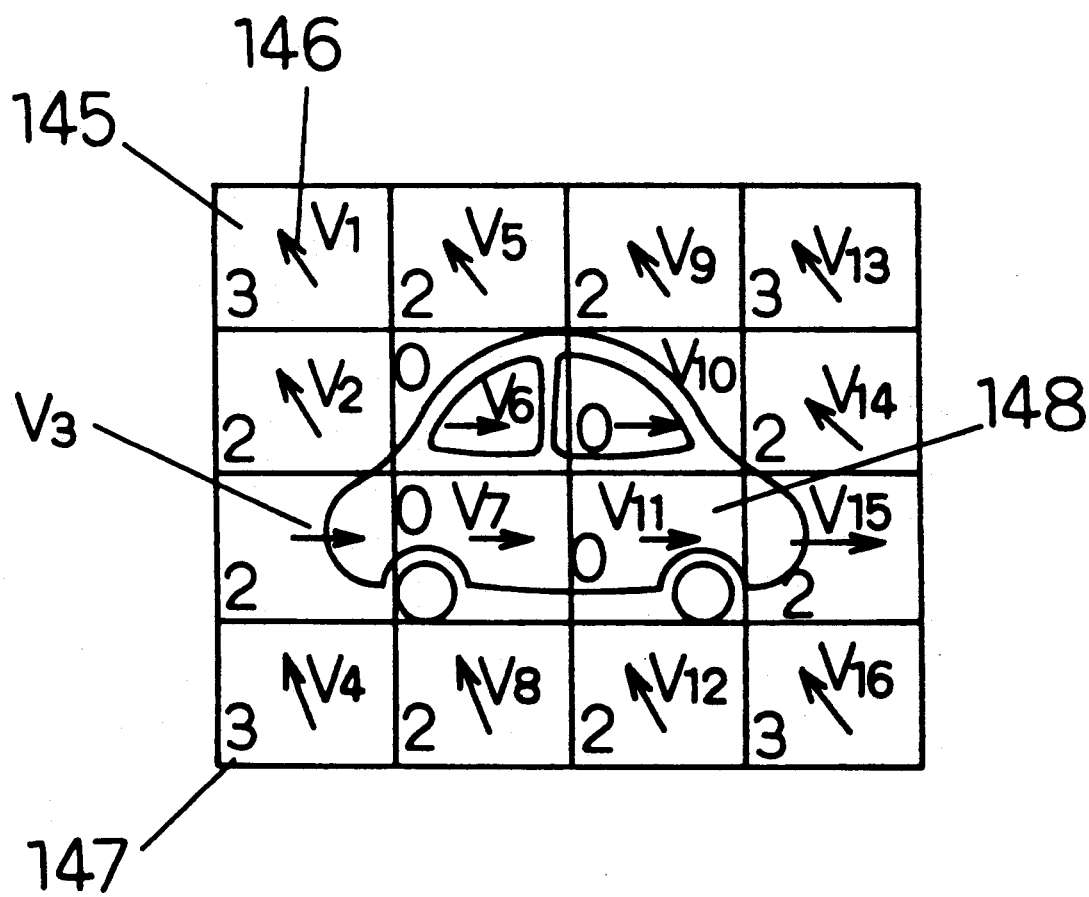

In the weighting processing means 133, by calculating the motion vector of each detecting region by using weight coefficient, the motion vector of the entire screen is delivered. The weighting processing means 133 may be expressed by a formula of weighting mean, for example, $$V = \sum_{k=1}^{n} (ak \cdot Vk) / \sum_{k=1}^{n} ak$$

where
n: number of detecting regions
ak: weight coefficient
Vk: motion vector of each detecting region
V: motion vector of entire screen Two practical examples are shown in FIG. 74(a), (b). Numerals 135, 138 are detecting regions, 136, 139 are motion vectors of detecting regions, 137, 140 are weight coefficients of detecting regions. In FIG. 74(a), the screen is divided into five detecting regions, and in FIG. 74(b), into 16 detecting regions. In both (a) and (b), the weight coefficient is 0 in the central part of the screen, and is larger at the end portions of the screen. Suppose, as shown in FIG. 75(a), (b), a moving object (a car) enters. Numerals 141, 145 are detecting regions, 142, 146 are motion vector of detecting regions, 143, 147 are weight coefficients of detecting regions, and 144, 148 are moving objects (cars). FIG. 75(a) corresponds to FIG. 74(a), and FIG. 75(b) to FIG. 74(b). In FIG. 75(a), the moving object is located nearly in the center. Since the weight coefficient of the central detecting region is 0, the motion vector of the moving object will not affect the motion vector of the entire screen. In FIG. 75(b), the motion vector of the moving object is detected in regions (V3, V6; V7, V10, V11, V15). Among them, since the weight coefficient is 0 in V6, V7, V10, V11, there will be no effect on the motion vector of the entire screen. As for V3, V15, since the value becomes relatively small due to weighting mean, and there is no notable effect.

Thus, according to the embodiment, the middle of the screen is the motion of the subject, and it is expected that the motion due to camera shake is present at the end portion of the screen, and when the weight coefficient is set larger at the end portion of the screen. At this time, the central part of the screen may not be always 0. When the motion vector is weighted and averaged on the basis of the weight coefficient, a motion vector similar to the vector of the camera shake may be obtained by a simple calculation.

Figure 76:
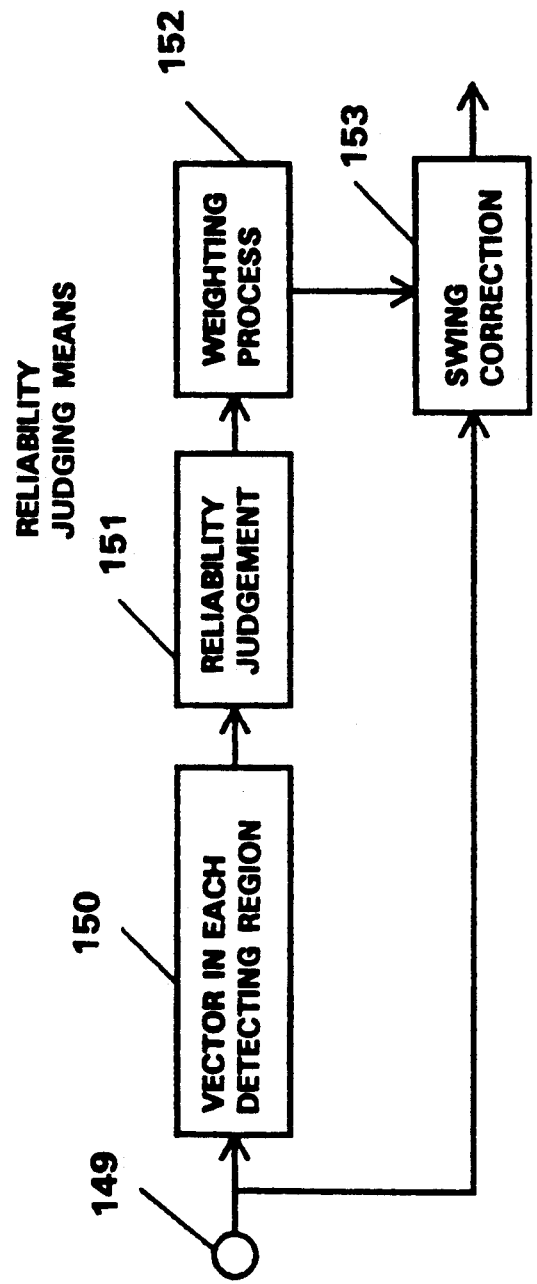
FIG. 76 is a block diagram showing the operation of a motion vector detecting device in a thirty-ninth embodiment of the present invention.

FIG. 76 is a block diagram of an image swing correcting device including a motion vector detecting device in a thirty-ninth embodiment of the invention. Numeral 149 is an image signal input terminal. Numeral 150 is a vector detecting circuit of each region, 151 is a reliability judging means, 152 is weighting processing means, and 153 is swing correcting means having the same function as the swing correcting means 208 in FIG. 1.

In the image motion vector detecting device of the thirty-ninth embodiment, first, an image signal consecutive in time for at least two fields is entered into the input terminal 149. In the vector detecting circuit 150 of each region, as in the thirty-ninth embodiment, the motion vector is determined. As shown in FIG. 77(a), plural vector detecting regions 155 are determined in the screen, and the detecting regions are further divided into multiple subdivisions having representative points explained in the prior art (FIG. 2). An image signal consecutive in time for two fields is entered. As for representative point of each subdivision, the difference from the signal at a position deviated by a specified quantity (i,j): imin<i<imax, jmin<j<jmax between two fields is determined as the correlation value, and the sum of the subdivisions is calculated. The correlation value is obtained in a same formula as in the prior art.

$$\text{Correlation} = \sum_{k=1}^{n} |\Delta L|(i,j)$$

where
$|\Delta L|(i,j)$: absolute value of the difference of the signal between coordinates (i,j) and a representative point
n: number of subdivisions in one detecting region Detecting the deviation (i',j') for giving the minimum of correlation values, it is determined as the motion vector of each detecting region (k=1, 2, ..., n; n: number of detecting regions). The vector detecting circuit 150 of each region determines the minimum, mean and maximum of the correlation values, and delivers them, together with the value of the motion vector of the vector reliability judging means 151. In the vector reliability judging means 151, from the minimum, mean and maximum of the correlation values of the detecting regions, the reliability of the vector is judged. The reliability judgment result and the motion vector of the detecting region are delivered to the weighting processing means 152.

The weighting processing means 152 calculates on the basis of the weight coefficient and motion vector in the regions judged to be reliable by the reliability judging means 151. The weighting processing means 152 may be expressed, for example, in the following weighting mean expression.

$$V = \sum_{k=1}^{n} (ak \cdot Vk) / \sum_{k=1}^{n} ak$$

where
k: the number of the detecting region judged to be reliable (excluding the numbers not reliable)
n: number of detecting regions
ak: weight coefficient
Vk: motion vector of each detecting region
V: motion vector of entire screen FIGS. 77(a) and (b) show practical examples. FIG. 77(a) is divided into 16 detecting regions, and the weight coefficient is given. Numeral 155 is a detecting region, 154 is a motion vector in each detecting region, 156 is a weight coefficient of each detecting region, and 157 is a moving object (a car). In (a), the motion vectors of the moving object (V3, V6, V7, V10, V11 V15) are detected. Of them, V6, V7, V10, V11 are 0 in the weight coefficient, and will not affect the motion vector of the entire screen. As for V3, V15, as shown in shaded area in (b), the reliability is negatively confirmed by the reliability judging means 151, and they will not be employed. Therefore, the weighting mean is calculated by the motion vectors of V1, V2, V4, V5, V8, V9, V12, V13, V14, V16, and the motion vector of the entire screen is determined.

Thus, according to the embodiment, the middle of the screen is the motion of the subject, and it is expected that the motion by camera shake is present in the end portion of the screen, and therefore the weight coefficient is increased in the end portions of the screen. Furthermore, by calculating the weighting mean of only the motion vector of the detecting regions judged to be reliable by the reliability judging means, the motion vector similar to the vector of the camera shake may be deduced by a simple calculation. Meanwhile, it is not necessarily required that the central portion of the screen be 0.

Figure 78:
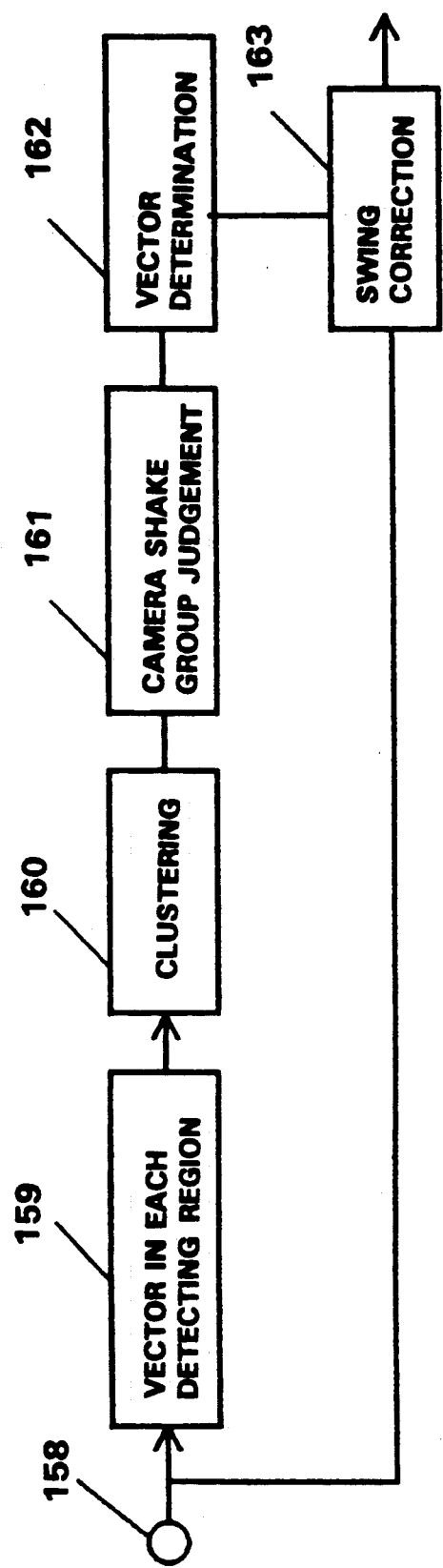
FIG. 78 is a block diagram showing the operation of a motion vector detecting means in a fortieth embodiment of the present invention.

FIG. 78 is a block diagram of an image swing correcting device including a motion vector detecting device in a fortieth embodiment of the invention. Numeral 159 is an image signal input terminal. Numeral 158 is a vector detecting circuit of each region, 160 is classifying(-clustering) means, 161 is camera shake group judging means, 162 is motion vector determining means, and 163 is swing correcting means, which functions the same as the swing correcting means 208 in FIG. 1.

In the image motion vector detecting means of the fortieth embodiment, first an image signal consecutive in time for at least two fields is entered in the input terminal 158. In the vector detecting circuit 159 of each region, as shown in 165 in FIG. 79(a), plural vector detecting regions are preliminarily determined in the screen, and the detecting regions are further divided into multiple subdivisions having the representative points as shown in the prior art (FIG. 2). An image signal consecutive in time for two fields is entered. As for the representative points of each subdivision, the difference from the signal at the position deviated by a specified quantity (i,j): imin<i<imax, jmin<j<jmax between two fields is determined as the correlation value, and the sum of subdivisions is obtained. The correlation value is determined in the following equation, as in the prior art.

$$\text{Correlation value} = \sum_{k=1}^{n} |\Delta L|(i,j)$$

where $|\Delta|(i,j)$: absolute value of the difference of the signal between coordinates (i,j) and a representative point n: number of subdivisions in one detecting region Detecting the deviation (i',j') giving the minimum value of correlation values, it is obtained as the motion vector Vk (k=1, 2, ..., n: n: number of detecting regions) of each detecting region. The motion vector of each detecting region is delivered to the classifying processing means 160.

The classifying means 160 classifies the motion vectors of the detecting regions. There are many classifying techniques, and any one may do, but an example of hierarchical classifying is explained in this embodiment. That is the motion vectors are grouped sequentially from the smallest distance between the direction of motion and the magnitude of motion vectors. Furthermore, those small in the distance between groups are combined to make up one group, and the number of groups is decreased. The distance between groups is expressed by the maximum distance among mutual motion vectors between groups, for example, as shown below.

$$Dmax = \max_{i,j} |Vi - Vj|$$

where

Vi (i=1, 2, ..., n): motion vectors in a certain group

Vj (j=1, 2, ..., m): motion vectors in a different group i, j: the numbers of detecting regions in a group The groups are merged sequentially from the smallest distance Dmax between groups. There are many groups initially, but as grouping is promoted, the number of groups decreases. Classifying is continued until those within a specific distance are regarded to belong to a same group. Or classifying may be stopped on the basis of the number of groups.

The camera shake group judging means 161 selects groups of camera shake motion vectors among plural groups. Motion vectors before invasion of the moving object may be regarded as a camera shake group.

The motion vector determining means 162 determines the motion vector of the swing correction by averaging the motion vectors in a group selected by the camera shake group judging means 161.

Figure 79:
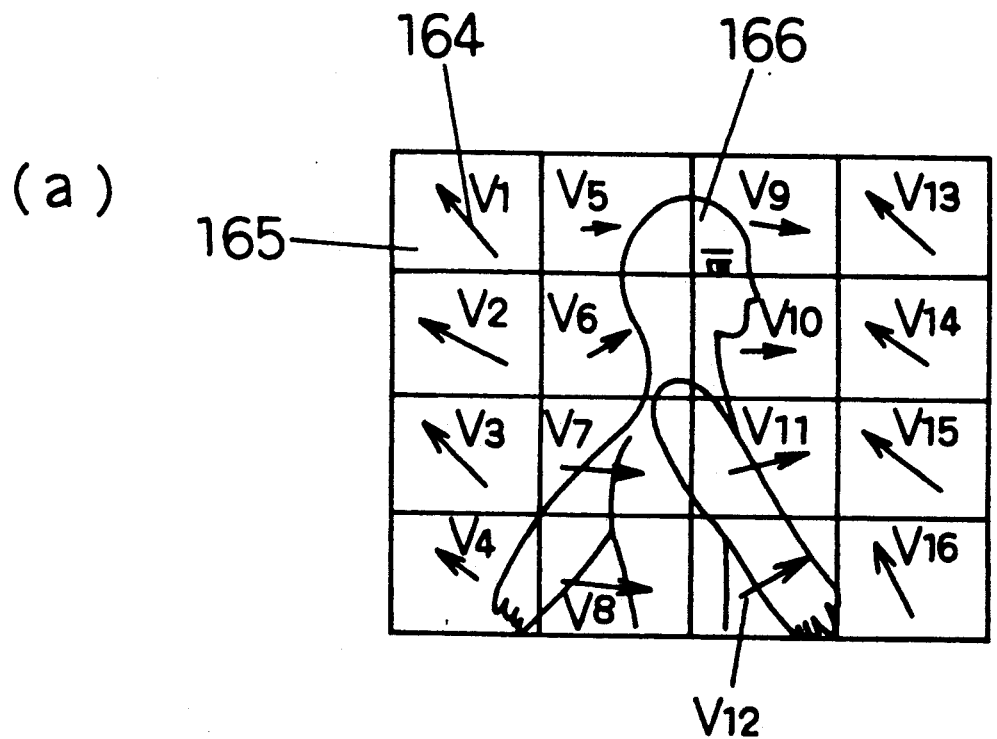
FIGS. 79(a) is a diagram showing a moving object (a man) invading in the detecting region, (b) is a diagram showing the clustering of motion vectors in each detecting region.
Figure 79:
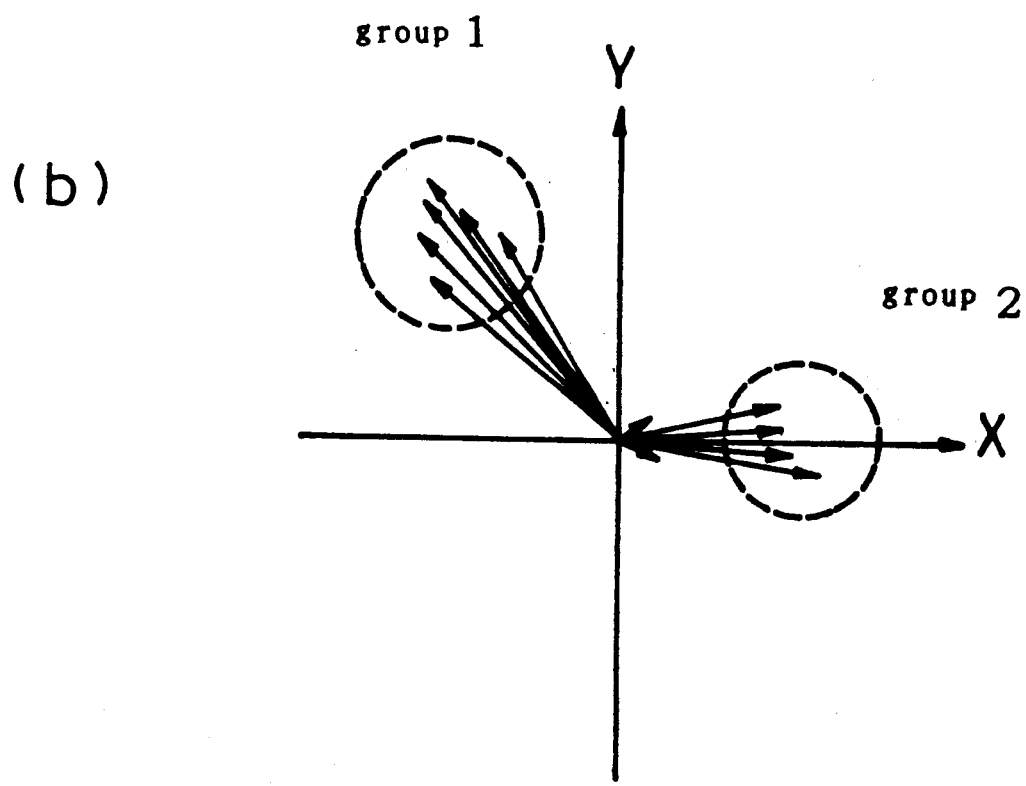

FIG. 79 (a) and (b) are practical examples. FIG. 79(a) divides the screen into 16 detecting regions. Numeral 164 is a motion vector of the detecting region, and 165 is a detecting region. Suppose a moving object (a man) 166 enters as in (a). The man is walking, while waving hand, from left to right of the screen. Therefore, the motion vector of the man is fluctuating, as the motion vectors of the man, V5, V6, V7, V8, V9, V10, V11, V12 are detected. On the other hand, as the camera shake motion vectors, V1, V2, V3, V4, V13, V14, V15, V16 are detected. Drawing these motion vectors by matching the start points results in FIG. 79(b). The motion vector is divided into two groups, as in (b), by using the classifying technique. Two groups are expressed in the detecting regions as shown in the spotted area (group 1) and the shaded area (group 2) in FIG. 80. Some of the detecting regions do not belong to any group. Which group should be used as the correction vector for camera shake may be judged by employing group 1 which is the motion vector before invasion of the man.

Thus, according to the embodiment, by classifying (clustering) motion vectors in detecting regions into plural groups on the basis of the direction or magnitude or their differential value, and employing one of the groups as the motion vector of camera shake, a motion vector similar to the vector of camera shake may be obtained.

Figure 81:
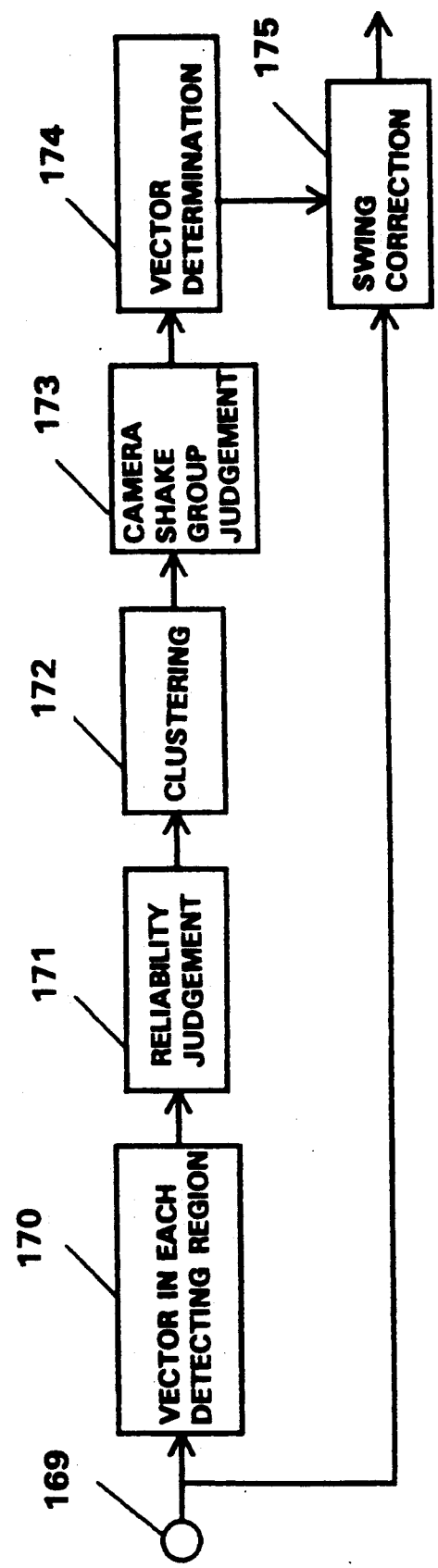
FIG. 81 is a block diagram showing the operation of a motion vector detecting device in a forth-first embodiment of the resent invention.

FIG. 81 is a block diagram of an image swing correcting device including a motion vector detecting device in a forty-first embodiment of the invention, in which numeral 169 is an image signal input terminal. Numeral 170 is a vector detecting circuit of each region, 171 is reliability judging means, 172 is classifying means, 173 is camera shake group judging means, 174 is motion vector determining means, and 174 is swing correcting means, which has the same function as the swing correcting means 208 in FIG. 1.

In the image motion vector detecting device of the forty-first embodiment, first, an image signal consecutive in time for at least two fields is entered into the input terminal 169. In the vector detecting circuit 170 of each region, the motion vector is individually obtained. As shown in FIG. 82(a), plural vector detecting regions 177 are preliminarily determined in the screen, and the detecting regions are further divided into multiple subdivisions having representative points explained in the prior art (FIG. 2). An image consecutive in time for two fields is entered. As for the representative point of each subdivision, the difference from the signal at a position deviated by a specified quantity (i,j): imin<i imax, jmin<j<jmax between two fields is determined as the correlation value, and the sum of the subdivisions is calculated. The correlation value is determined, as in the prior art, in the following equation.

$$\text{Correlation} = \sum_{k=1}^{n} |\Delta L|(i,j)$$

where $|\Delta L|(i,j)$: absolute value of the difference of the signal between coordinates (i,j) and a representative point
n: number of subdivisions in one detecting region Detecting the deviation (i',j') for giving the minimum of correlation values, it is obtained as the motion vector of each detecting region Kv (k=1, 2, ..., n; n: number of detecting regions). The vector detecting circuit 170 of each region determines the minimum, means and maximum of the correlation values, and delivers them, together with the value of the motion vector, to the vector reliability judging means 171. In the vector reliability judging means 171, from the minimum, means and maximum of correlation values of each detecting region, the reliability of the vector is judged. The result of reliability judgment and the motion vector of detecting region are delivered to the classifying means 172.

The classifying means 172 clusters (classifies) the motion vectors of detecting regions judged to be reliable by the reliability judging means 171. There are many classifying methods, and any one will do, and an example of hierarchical classifying is described in this embodiment. That is, those small in the distance between motion vectors (difference in direction and magnitude) are grouped together. Furthermore, those small in the distance between groups are merged to make up one group, and the number of groups is decreased. The distance between groups is expressed, for example, by the maximum distance among mutual motion vectors between groups as follows.

$$Dmax = \max_{i,j} |Vi - Vj|$$

where

Vi (i=1, 2, ..., n): motion vector in a certain group
Vj (j=1, 2, ..., m): motion vector in other group
i, j: the numbers of detecting regions in a group Groups are merged sequentially from the smallest distance between groups Dmax. Initially there are many groups, but as grouping is promoted, the number decreases. Classifying is continued until those within specific distance are regarded to belong to a same group. Or classifying may be stopped on the basis of the number of groups.

The camera shake group judging means 173 selects a group of motion vectors of camera shake, among plural groups. The motion vector before invasion of the moving object may be regarded as the group of camera shake.

The motion vector determining means 174 determines the motion vector of swing correction by averaging the motion vectors within the group selected by the camera shake group judging means 173.

Figure 82:
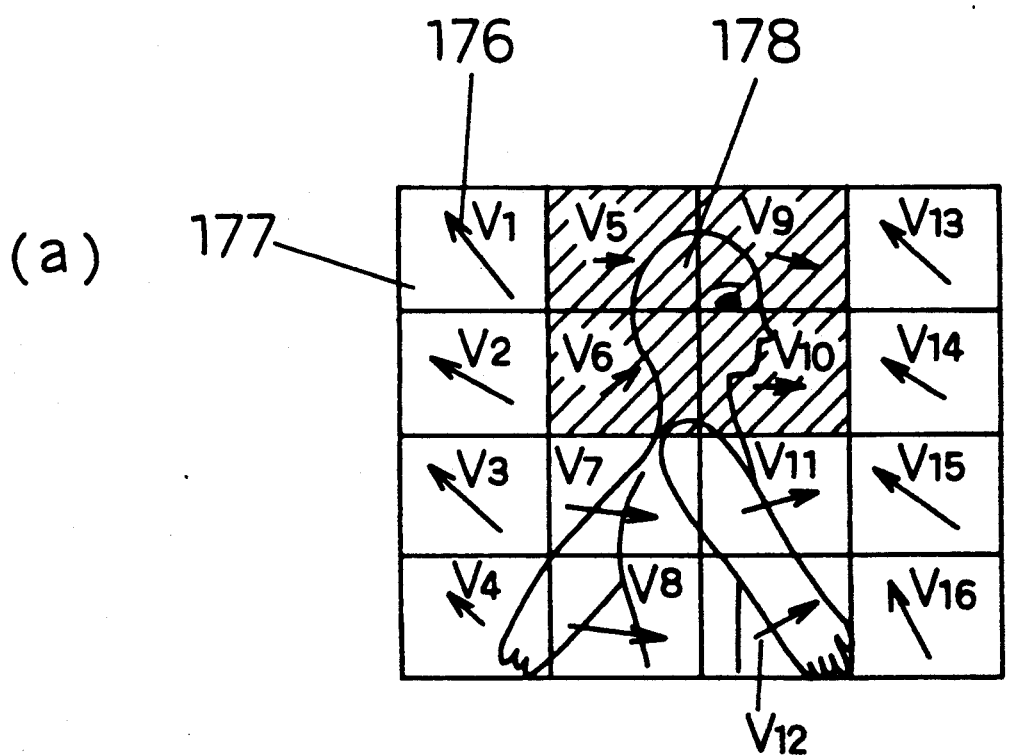
FIGS. 82(a) is a diagram of a moving object (a man) invading in the detecting region, (b) is a diagram showing clustered detecting regions.
Figure 82:
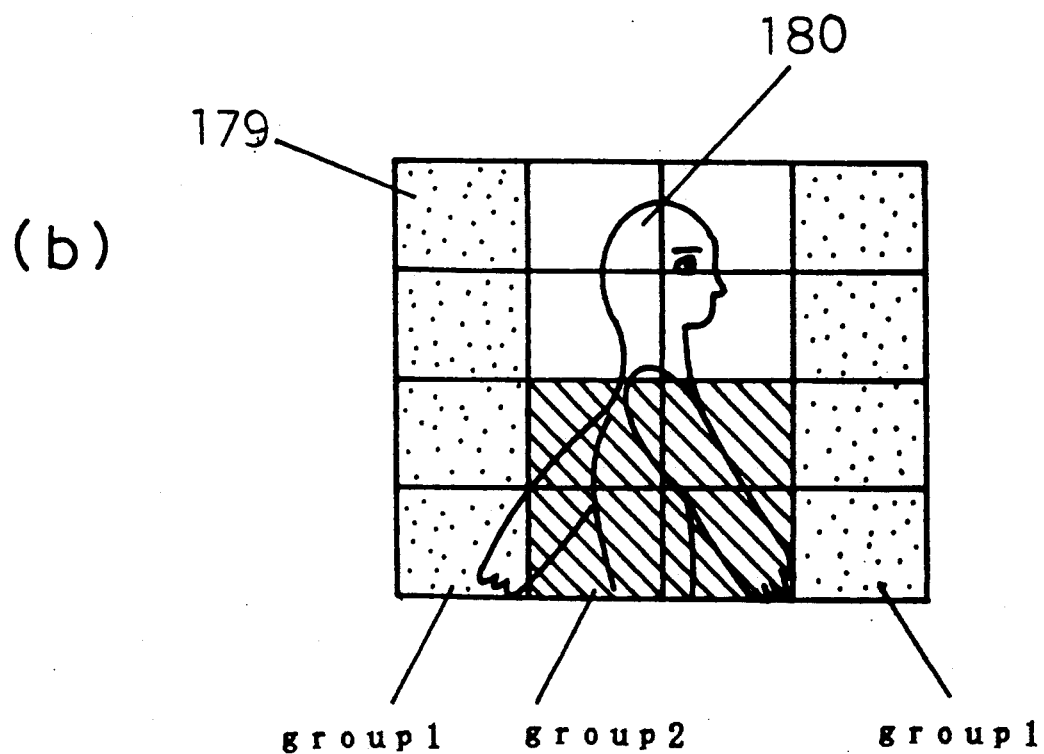

FIG. 82(a) and (b) show practical examples. In FIG. 82 (a), the screen is divided into 16 detecting regions, and a moving object (a man) has invaded. The man walks while waving a hand and enters the screen from left to right. As the motion vectors of the man, V5, V6, V7, V8, V9, V10, V11 V12 are detected. As the motion vectors of camera shake, V1, V2, V3, V4, V13, V14, V15, V16 are detected. As shown in the shaded area in FIG. 82(a), since the motion vectors V5, V6, V9, V10 are judged to be not reliable by the reliability judging means 171, classifying is effected by using the motion vectors excluding them. FIG. 82 shows a detecting region grouped by classifying. The region of the camera shake is shown in the spotted area (group 1), and the region of the man is the shaded area (group 2). To judge which group should be used as the correction vector for camera shake, group 1, which is the motion vector before invasion of the man, should be selected.

Thus, according to the embodiment, by classifying (clustering) only the motion vectors in the detecting regions judged to be reliable by the reliability judging means on the basis of the direction or magnitude of the motion vector in each detecting region and employing one of the groups as the motion vector of the camera shake, a motion vector similar to the camera shake vector may be deduced.

In this invention, as described herein, even if a moving object similar to each region or larger than that enters, although the vector could not be detected in the prior art, only the motion vector due to the shake of the video camera may be detected as the motion vector of the screen selectively from the motion vectors of the regions, and conventionally when a moving object similar to or even larger than the screen enters, a vector containing the motion of the moving object was detected by mistake, while the detecting is automatically interrupted and detecting of a wrong vector is prevented in the invention. The swing correcting device of the invention is very wide in the range of correction of shake due to the moving object and very rarely malfunctions if exceeding this range, where as the correcting range of swing due to a moving object was small in the prior art and malfunctions often occurred when exceeding the range and it was far from practicable. In addition, as compared with the prior art, the invention may be very easily realized by hardly increasing the circuits and others, and its practical effect is great.

Moreover, according to the invention, if a moving object similar to or even larger than each region should enter, although the moving object could not be detected in the prior art, the moving object may be detected very sensitively by making use of the correlation value between regions or the time variation value of the correlation values. Hence, only the motion vector due to shake of the video camera can be selectively detected as the motion vector of the screen out of the motion vectors of regions, and even when a moving object similar to or even larger than the screen should enter, the detection is automatically interrupted and detection of wrong vector is prevented, while the vector containing the motion of the moving object was detected by mistake conventionally.

Still more, in the invention, should the reliability judgment be wrong in the event of invasion of a moving object, only the still motion vector or the motion vector due to the shake of video camera may be detected as the motion vector of the entire screen selectively from motion vectors of detecting regions, and when a moving object invades, although a wrong vector as detected because the motion of the moving object was added conventionally, the detection is automatically interrupted, and detection of a wrong vector is prevented.

In the invention, furthermore, if the motion of the moving object and motion of the camera shake coexist, by setting the weight coefficient in each detecting region, since the presence of the motion vector due to camera shake is expected more in the end portion of the screen, the weight coefficient is increased in the detecting region in the end portion of the screen, and by calculating the weighted mean of the motion vector on the basis of this weight coefficient, a motion vector approximating the vector of camera shake may be deduced by a simple calculation.

By classifying the motion of the moving object and motion due to the camera shake by the classifying technique, the motion vector of the camera shake may be obtained more accurately.

What is more, when this method is applied by using only the detecting region judged to be reliable by the reliability judging means, the performance is further enhanced.

We claim:

1. An image motion detecting device, comprising:
   means for determining a motion vector in each detecting region of disposed plural detecting regions in a screen,
   judging means for determining a judgment result having a meaning from true to false, from each one of two or more pieces of reliability judgment information which is obtained by using a correlation value in said each detecting region,
   judgment value converting means for converting the judgment result having a meaning from true to false into a binary judgment value of true or false, and
   means for determining a motion vector of said screen by using the motion vector of each region on the basis of the binary judgment value of each detecting region.

2. An image motion detecting device according to claim 1, wherein the means for determining the motion vector in each detecting region includes:
   means for determining a correlation value in a specific deviation in each of the detecting regions in the screen; and
   means for determining a time variation value of the correlation values;
   wherein the means for determining the motion vector in each detecting region uses the correlation values from the detecting regions; and
   wherein the judging means includes means for judging a reliability of the motion vector in each detecting region by using the correlation values and the time variation value.

3. An image motion detecting device according to claim 1, wherein the means for determining the motion vector in each detecting region includes means for determining a correlation value of motion vectors among the plural detecting regions;
   wherein the judging means includes means for judging a reliability of the motion vector in each detecting region by using the correlation values; and
   means for changing a judgment condition of the means for judging the reliability based on the correlation values.

4. An image motion detecting device according to claim 3, wherein said means for changing a judgment condition changes the judgment condition to be less severe when the correlation of the motion vectors among the plural detecting regions is high.

5. An image motion detecting device according to claim 1, wherein the means for determining the motion vector in each detecting region includes means for determining a correlation value in a specific deviation in each of the detecting regions in the screen; and
   wherein the means for determining the motion vector in each detecting region uses the correlation values; and
   wherein the judging means includes means for judging a reliability of the motion vector in each detecting region by using a value of the motion vector in the detecting region, or the correlation value, or the combination of the motion vector value and the correlation value; and
   wherein the motion detecting device further includes:
   still state judging means for judging a still state of the motion vector for each detecting region by using the motion vector;
   means for leading out a final judgement result from the still state judging means and the means for judging the reliability; and
   wherein the means for determining the motion vector of the screen uses the final judgment result obtained by the means for leading out the final judgment result.

6. An image motion detecting device according to claim 1, wherein the means for determining the motion vector in each detecting region includes means for determining a correlation value in a specific deviation in each of the detecting regions in the screen;
   wherein the means for determining the motion vector in each detecting region uses the correlation values from the detecting regions;
   wherein the judging means includes means for judging a reliability of the motion vector in each detecting region by using a value of the motion vector in the detecting region, or the correlation value, or the combination of the motion vector value and the correlation value,
   wherein the motion detecting device further includes:
   minimum judging means for judging which motion vector has a relatively small value among the motion vectors of the detecting regions;

means for leading out a final judgement result from the minimum judging means and the means for judging the reliability; and wherein the means for determining the motion vector of the screen uses the final judgment result obtained by the means for leading out the final judgment result.

7. An image motion detecting device according to claim 1, wherein the image motion detecting device further includes:

state judging means which judges a state of the motion vector of the detecting regions based on a value of the motion vector in the detecting region, or the correlation value, or a combination of the motion vector value in the detecting region and the correlation value, wherein the state judging means is a reliability judging means for judging a reliability of the motion vectors in the detecting regions based on the motion vector value or the correlation value or a combination of the motion vector value and the correlation value.

8. An image motion detecting device according to claim 1, wherein the means for determining the motion vector in each detecting region includes means for determining a correlation value in a specific deviation in each of the detecting regions in the screen;

wherein the judging means includes means for judging a reliability of the motion vector in each detecting region by using a motion vector value, or the correlation value, or a combination of the motion vector value and the correlation value; and weighting processing means for determining the motion vector for the entire screen from weight coefficients set in each detecting region and the motion vector of the detecting regions which are judged to be reliable by the means for judging the reliability.

9. An image motion detecting device according to claim 1, wherein the means for determining the motion vector in each detector region includes means for determining a correlation value in a specific deviation in each of the detecting regions in the screen;

wherein the means for determining the motion vector in each of the detecting regions uses the correlation values; and wherein the judging means includes means for judging a reliability of the motion vector in each detecting region by using a motion vector value in the detecting region, or the correlation value, or the combination of the motion vector value in the detecting region and the correlation value;

wherein the image motion vector detecting device further includes classifying means for classifying the motion vectors of the detecting regions which are judged to be reliable by the means for judging the reliability, wherein the motion vectors in each detecting region are classified into groups on the basis of their magnitude, their direction or their differential value;

camera shake group judging means for selecting one of the groups classified by the classifying means; and wherein the means for determining the motion vector of the screen bases its determination on the motion vector of the group selected by the camera shake group judging means.

10. An image swing correcting device comprising:

image signal memory means or CCD for at least one field, and an image motion vector detecting device as defined in claim 1.

wherein a reading position of the image signal memory means or CCD is controlled on the basis of the motion vector detected by the image motion vector detecting device.

* * * * *